US008836965B2

(12) United States Patent
Yamada et al.

(10) Patent No.: US 8,836,965 B2
(45) Date of Patent: Sep. 16, 2014

(54) PRINTING SYSTEM, JOB PROCESSING METHOD, STORAGE MEDIUM, AND PRINTING APPARATUS

(75) Inventors: Michihiko Yamada, Kawasaki (JP); Kazuhiko Ushiyama, Edogawa-ku (JP)

(73) Assignee: Canon Kabushiki Kaisha, Tokyo (JP)

(*) Notice: Subject to any disclaimer, the term of this patent is extended or adjusted under 35 U.S.C. 154(b) by 1232 days.

(21) Appl. No.: 11/558,555

(22) Filed: Nov. 10, 2006

(65) Prior Publication Data

US 2007/0109586 A1 May 17, 2007

(30) Foreign Application Priority Data

Nov. 14, 2005 (JP) ................. 2005-328947
Oct. 17, 2006 (JP) ................. 2006-283146

(51) Int. Cl.
*G06K 15/00* (2006.01)
*G06F 3/12* (2006.01)
*H04N 1/32* (2006.01)
*H04N 1/00* (2006.01)

(52) U.S. Cl.
CPC .......... *G06F 3/1234* (2013.01); *H04N 1/32667* (2013.01); *H04N 1/32609* (2013.01); *G06F 3/1235* (2013.01); *H04N 2201/0094* (2013.01); *H04N 1/32635* (2013.01); *G06F 3/121* (2013.01); *G06F 3/1288* (2013.01); *H04N 1/00233* (2013.01); *H04N 2201/0098* (2013.01)
USPC ........................ 358/1.14; 358/1.15

(58) Field of Classification Search
None
See application file for complete search history.

(56) References Cited

U.S. PATENT DOCUMENTS

| 5,164,842 | A | * | 11/1992 | Gauronski et al. | ............ | 358/401 |
|---|---|---|---|---|---|---|
| 5,377,016 | A | | 12/1994 | Kashiwagi et al. | | |
| 5,511,150 | A | * | 4/1996 | Beaudet et al. | ............... | 358/1.14 |
| 6,058,249 | A | * | 5/2000 | Matsuda et al. | ............. | 358/1.14 |
| 6,421,135 | B1 | * | 7/2002 | Fresk et al. | ................... | 358/1.15 |
| 6,785,727 | B1 | * | 8/2004 | Yamazaki | ...................... | 709/229 |
| 6,906,813 | B1 | * | 6/2005 | Tuchitoi et al. | ............... | 358/1.14 |
| 7,148,991 | B2 | * | 12/2006 | Suzuki et al. | ................... | 358/1.5 |
| 7,190,469 | B1 | * | 3/2007 | Gomi | ........................... | 358/1.14 |
| 7,528,969 | B2 | * | 5/2009 | Koyano | .......................... | 358/1.1 |
| 7,595,903 | B2 | * | 9/2009 | Kizaki et al. | ................. | 358/1.15 |
| 7,630,092 | B1 | * | 12/2009 | Suzuki et al. | ................. | 358/1.14 |
| 8,368,910 | B2 | * | 2/2013 | Kakigi | ........................... | 358/1.14 |
| 2001/0006424 | A1 | | 7/2001 | Yokoyama | | |
| 2002/0105669 | A1 | | 8/2002 | Watanabe | | |
| 2003/0098989 | A1 | * | 5/2003 | Roos | ........................... | 358/1.14 |
| 2004/0008363 | A1 | * | 1/2004 | Suzuki et al. | ................. | 358/1.14 |

(Continued)

FOREIGN PATENT DOCUMENTS

| CN | 1530821 A | 9/2004 |
|---|---|---|
| EP | 1199677 A2 | 4/2002 |

(Continued)

*Primary Examiner* — Marcus T Riley
(74) *Attorney, Agent, or Firm* — Canon USA, Inc., I.P. Division

(57) ABSTRACT

In the event that the printing operations of a printing job have been interrupted by an interruption cause, and the cause of interruption for the interruption job is removed, resuming of the printing operations of the interrupted job is enabled with a resuming method corresponding to a user request, received from a user via a user interface, for a selection option that has been selected from multiple selection operations relating to resuming methods of the printing operations. This enables job resuming processing of a job regarding which printing has been interrupted to be suitably executed even under a printing environment such as a POD environment.

25 Claims, 29 Drawing Sheets

(56) References Cited

U.S. PATENT DOCUMENTS

| | | | |
|---|---|---|---|
| 2004/0239974 A1* | 12/2004 | Uchida et al. | 358/1.14 |
| 2005/0105117 A1* | 5/2005 | Oh et al. | 358/1.13 |
| 2006/0017960 A1* | 1/2006 | Kakigi | 358/1.14 |

FOREIGN PATENT DOCUMENTS

| | | |
|---|---|---|
| EP | 1379071 A1 | 1/2004 |
| GB | 2405731 A | 3/2005 |
| JP | 04-305777 A | 10/1992 |
| JP | 2002-283677 A | 10/2002 |
| JP | 2004-288032 A | 10/2004 |
| JP | 2005-121892 A | 5/2005 |
| KR | 2000-0007512 A | 2/2000 |
| KR | 10-0479536 | 4/2002 |
| KR | 0479536 B | 4/2005 |

* cited by examiner

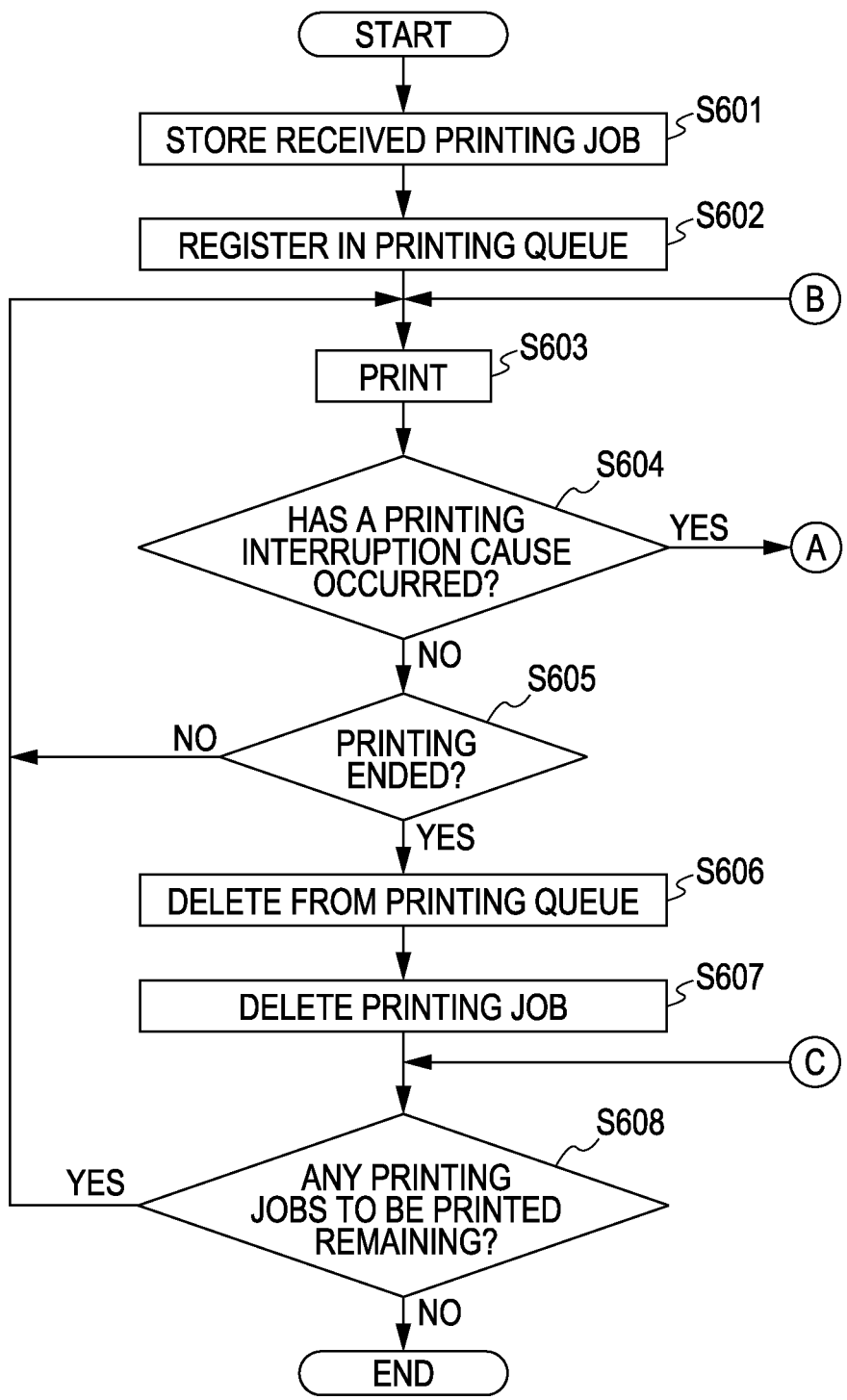

[SYSTEM CONFIGURATION EXAMPLE OF PRINTING SYSTEM 100]
SYSTEM CONFIGURATION WITH TWO POST-PRINTING DEVICE LINKED TO THE PRINTING APPARATUS 101, IN THE ORDER OF LARGE-CAPACITY STACKER AND SADDLE-STITCH BINDING DEVICE

PRINTING SYSTEM, JOB PROCESSING METHOD, STORAGE MEDIUM, AND PRINTING APPARATUS

BACKGROUND OF THE INVENTION

1. Field of the Invention

The present invention relates to a method of controlling the resumption of the printing of a print job after the printing has been interrupted.

2. Description of the Related Art

Office equipment manufacturers are currently entering the commercial printing market (Print On Demand market, abbreviated as "POD market"). In light of the current situation, realization of products which take into consideration a POD environment with regard to product design, and also which have sufficient convenience and flexibility to be acceptable in not only office-environment-based printing environments but also in POD-environment-based printing environments, is desirable. However, little consideration has been given to this issue until now.

For example, printing apparatuses, many of which are MFPs (Multi-Function Peripherals) designed with an office-environment-based printing environment in mind, have automatic job recovery functions. This is a function of automatically resuming a job after the cause of an interruption has been removed.

A configuration such as described below has been proposed in recent years as a specific operation of such an automatic job recovery function.

Let us say that for example, an interruption cause, such as running out of sheets, has occurred in a printing apparatus while printing a certain job X to be processed. In this case, the printing system temporarily stops the processing of the job X. Let us also say that there is another job Y besides this job X, standing by to be processed. In this case, printing of the job Y is automatically started while the job X is interrupted. Let us further say that the cause of interruption of the job X, which is in the interrupted state, is removed by, for example, the operator adding sheets.

Now, as described above, the cause of interruption of the interrupted job (job X in this example) has been removed, but at this point, the other subsequent job (job Y in this example) is still being printed. In this case, the printing apparatus continues printing of the job being executed (in this example, job Y) even though the cause of interruption of the interrupted job (job X) has been removed. At the point that the job being executed (job Y in this example) has finished, the printing apparatus automatically resumes processing of the interrupted job (job X in this example). In other words, even if the cause of interruption of job X has been removed, automatically resuming processing of job X occurs only after waiting for printing processing of the job Y to be completed.

Printing apparatuses and printing system configured so as to be capable of carrying out the above actions are currently being proposed. This point can be more fully understood by making reference to Japanese Patent Laid-Open No. 4-305777.

However, the function and control implemented in such printing apparatuses and printing systems do not necessarily meet the needs in POD-environment-based printing environments, though satisfactory in office-environment-based printing environments.

The reason is that in POD-environment-based printing environments, the greatest purveyor of such printing system will most likely be commercial printing firms. Such commercial printing firms take orders for printing from customers, and create printed articles which the customers order, using the printing system. Upon the printed articles being delivered to the customer, the commercial printing firm is paid by the customer.

In such a POD based printing environment, printing apparatuses and printing systems are not tools for assisting business in the office environment, but rather can be said to be business tools for producing products for which the business is paid by the customer.

Moreover, in a POD based printing environment there will most likely be demand for capabilities to process printing requests from customers in a shorter time, and at the same time to take and process a greater amount of printing requests. In other words, with such a POD based printing environment, overall productivity will most likely carry great importance.

Also, it is expected that various types of printing requests will come from a wide variety of customers, and jobs which the printing system under such a printing environment receives will include a great number of large-scale jobs (jobs which involve a great number of sheets to be printed). Further, cases wherein such large-scale jobs are concentrated in certain periods are expected. Taking this into consideration, with a POD based printing environment, there will be demand from the market such as the POD market for a printing system which can handle a variety of multiple jobs with high efficiency and productivity, while taking into consideration the deadlines from the customers.

Thus, it can be readily assumed that a POD-environment-based printing environment will be quite different from an office environment, both in usage cases and in user needs.

With the above in mind, let us reconsider the above example of the job recovery function in a printing system. While this job recovery function may be perfectly satisfactory in an office-environment-based printing environment, it most likely will have difficulty in handling user needs in a POD based printing environment. A specific example will now be given by expanding the above example, to further examine this issue.

For example, let us say that the job Y of which printing process was started due to the printing of the job X being interrupted, is a large-scale job which requires printing on a large number of sheets. In this case, with the printing system having the above-described job recovery function, the job X will have to stand by for a long time before printing thereof is resumed. In other words, regardless of how speedily the printing interruption cause is for the job X recovered from, printing of the job X cannot be resumed until printing of the job Y ends. It is readily conceivable that such a situation could occur even though the job X is almost completely finished. In an office environment, such usage cases themselves are scarce, so hardly any attention has been paid thereto. However, the situation in this example is of great concern in a POD-environment-based printing environment, where how efficiently and productively such multiple large-scale jobs can be handed is of great importance.

Still, even if a printing system capable of handling the above problem were configured, other problems can be expected as well.

For example, let is examine a configuration where the above problem is handled by an arrangement wherein the processing of the job Y, which has been started while printing of the job X is interrupted, is forcibly stopped upon the operator removing the interruption cause of the job X.

Such a configuration could affect the printing results of the job Y depending on the contents of the job Y, such as particular types of post-processing which the job Y might include.

In addition, there will most likely be cases in a POD environment wherein the system is running under predetermined scheduling, so as to process the widely-varied large-scale jobs from various clients in a proper order. In such a schedule environment, having the apparatus process situations under its own judgment may not be suitable.

As described above, applying a technology from the office environment to the POD environment, which is entirely different in terms of usage cases and user needs, can lead to completely new problems which could not be foreseen in the office environment.

SUMMARY OF THE INVENTION

The present invention provides a printing system, job processing method, storage medium, and printing apparatus, capable of addressing the above problems.

The present invention provides a printing system, job processing method, storage medium, and printing apparatus, capable of contributing to realization of products with future digital printing systems insight, which are satisfactory under not only office environments, but also printing environments such as POD environments.

The present invention provides a printing system, job processing method, storage medium, and printing apparatus, which take into consideration printing environments such as POD environments wherein how efficiently and with how high a productivity multiple jobs can be processed is important.

The present invention provides a printing system, job processing method, storage medium, and printing apparatus, which take into consideration usage environments and the intention of the operator even in cases herein, while a job to be processed has been interrupted another job is started, so that multiple jobs can be processed efficiently and with high productivity.

The present invention provides a printing system, job processing method, storage medium, and printing apparatus, which can handle not only recovery functions which are sufficient to deal with the office environment but also capable of handling usage cases and user needs which occur in a POD based printing environment where recovery functions are difficult to realize.

Further features of the present invention will become apparent from the following description of exemplary embodiments with reference to the attached drawings.

BRIEF DESCRIPTION OF THE DRAWINGS

FIG. 7A is a flow diagram for describing a control example of the embodiment.

DESCRIPTION OF THE EMBODIMENTS

A printing system, job processing method, recording medium, program, and printing apparatus, according to one embodiment of the present invention will now be described with reference to the appended drawings.

With the following embodiments, description will be made regarding the case of a system serving as a digital multi-function apparatus (MFP) including multiple functions (also referred to as modes) such as a copy function, printing function, facsimile function, and so forth, and the case of a printing system including the relevant apparatus, as an example. Note that a printing system, which will be described with the present embodiment, is also referred to as an image forming system.

Figure 1:
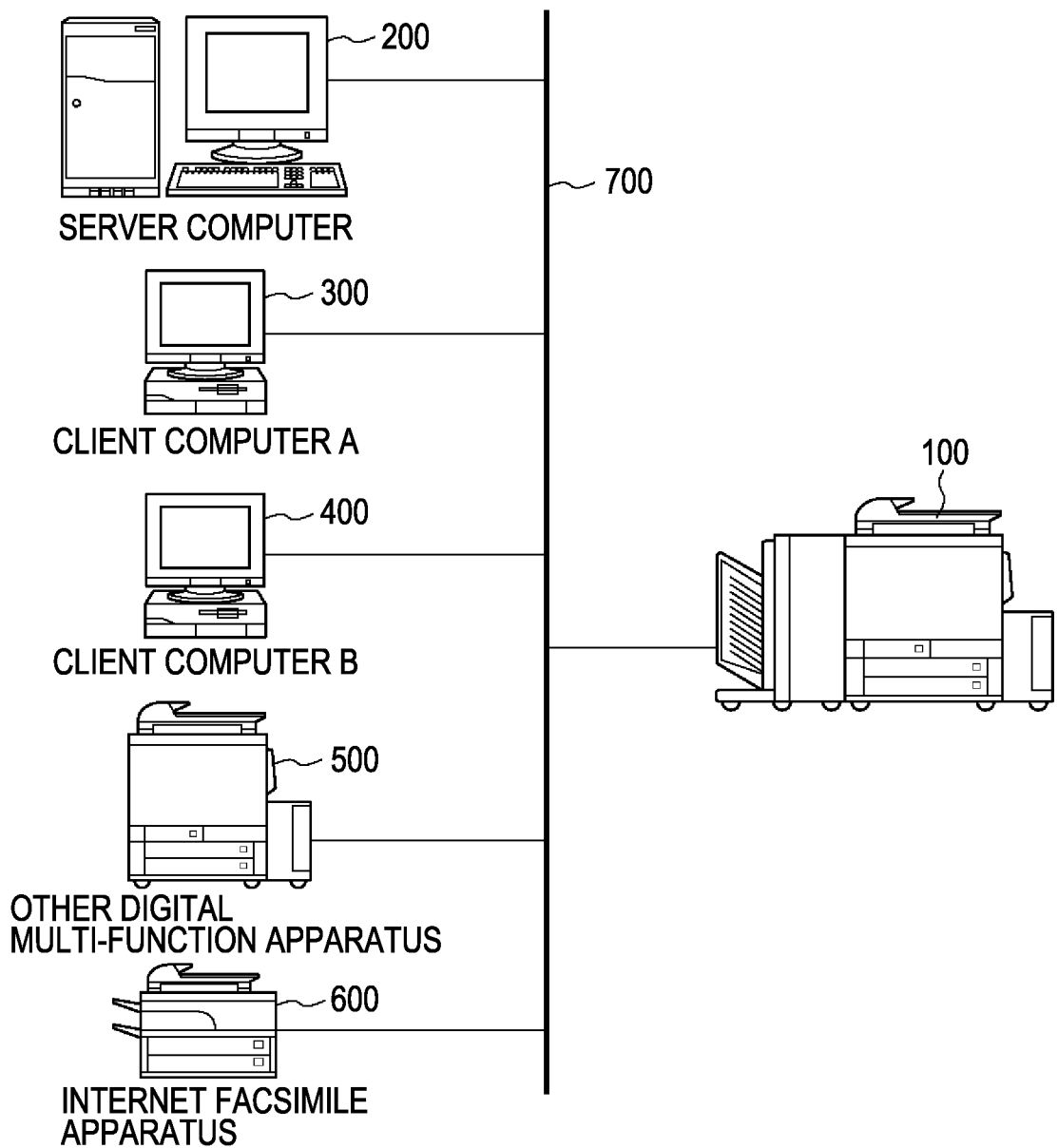
FIG. 1 is a diagram for describing the configuration of a network-compatible printing system according to a first embodiment of the present invention.

FIG. 1 is a diagram describing the configuration of a printing system corresponding to a network according to a first embodiment. In FIG. 1, a printing system 100 enables various types of data communication (transmission/reception of data) with another device via a communication medium 700 such as a network. Examples of another device with which the system 100 can perform data communication include a server computer 200, and client computers A, denoted by reference numeral 300, and B, denoted by reference numeral 400, such as a host computer and so forth. As for yet another device with which the system 100 can perform data communication, a digital multi-function apparatus 500, or an internet facsimile apparatus 600, serving as another system, which includes the same configurations and functions as the relevant system 100, can be employed. Note that data communication between the system 100 and another device is not restricted to a cable type, and may be a wireless type, or a type in which those are mixed.

The printing system 100 includes multiple modes (multiple functions) such as a copy mode, printing mode, facsimile mode, and so forth. The printing system 100 is configured so as to print printing job data scanned at the scanner unit 103 of the apparatus, and printing job data input from an external device at the printer unit 104 of the apparatus via a storage unit such as a hard disk of the apparatus. With the present embodiment, backup memory 109 is employed as this storage unit. The printing system 100 is configured so as to receive job data serving as a printed object from various types of external devices. As one example thereof, the present system 100 enables job data from an information processing device such as the client computer 300 or 400, or the like, for example. Also, printing job data scanned at the scanner unit included the digital multi-function apparatus 500 serving as another printing apparatus is arranged so as to be received from the apparatus 500. Also, the job data output from the internet facsimile apparatus 600 is arranged so as to be received as job data to be printed. Also, the printing system 100 is configured so as to execute various types of output processing or transfer processing of the above job data to another apparatus via the communication unit of the apparatus (e.g., computer interface unit 106).

Also, with the printing system 100, the scanner unit of the self-apparatus includes an automatic document feeder (so-called ADF) as a mechanical configuration, which can sequentially scan multiple originals from the top page side automatically. Also, the printing system 100 includes multiple sheet supplying units (sheet supplying cassettes) at the printer unit of the apparatus, which can store a different media type (e.g., recording paper size, a recording paper type, etc.) of recording paper for each of the respective sheet supplying units. Accordingly, the printing system 100 can perform printing on a desired type of recording paper by selectively feeding recording paper from a user's desired sheet supplying unit to supply this to the printer unit.

Further, the printing system 100 includes a finisher serving as a sheet-process processing apparatus for performing a sorting function, stapling function, punching function, and saddle-stitching function. For example, with the present printing system 100, the finisher capable of various types of finishing is arranged so as to be connected to a printing apparatus main unit 101. Moreover, an arrangement is made wherein printing processing of the printing data of a job to be printed within the memory 109 such as a hard disk which can accumulate the printing data of multiple jobs can be performed by the printer unit 104. Moreover, the relevant printing system 100 is configured so as to supply job sheets subjected to printing processing by the printer unit included in the printing apparatus 101 to the relevant finisher internal units. Moreover, the relevant finisher is configured so as to subject the sheets of the relevant job to finishing specified by a user for the purpose of a job to be processed. For example, the sorting function serving as one example of the finishing functions is a function for performing sorting processing of recording paper printed at the printer unit. The stapling function is a function for subjecting recording paper to stapling processing. The punching function is a function for subjecting recording paper printed at the printer unit to punching processing (also referred to as puncturing processing, or punch processing). The saddle-stitching function is a function for performing folding processing and bookbinding processing of recording paper printed at the printer unit. With the present embodiment, control as to various types of job in the printing system 100, and along therewith user interface control or operation control as to the respective units are performed by the control unit 108 in FIG. 2 reading out and referencing a computer-readable control program stored in memory 109 or the like.

Figure 2:
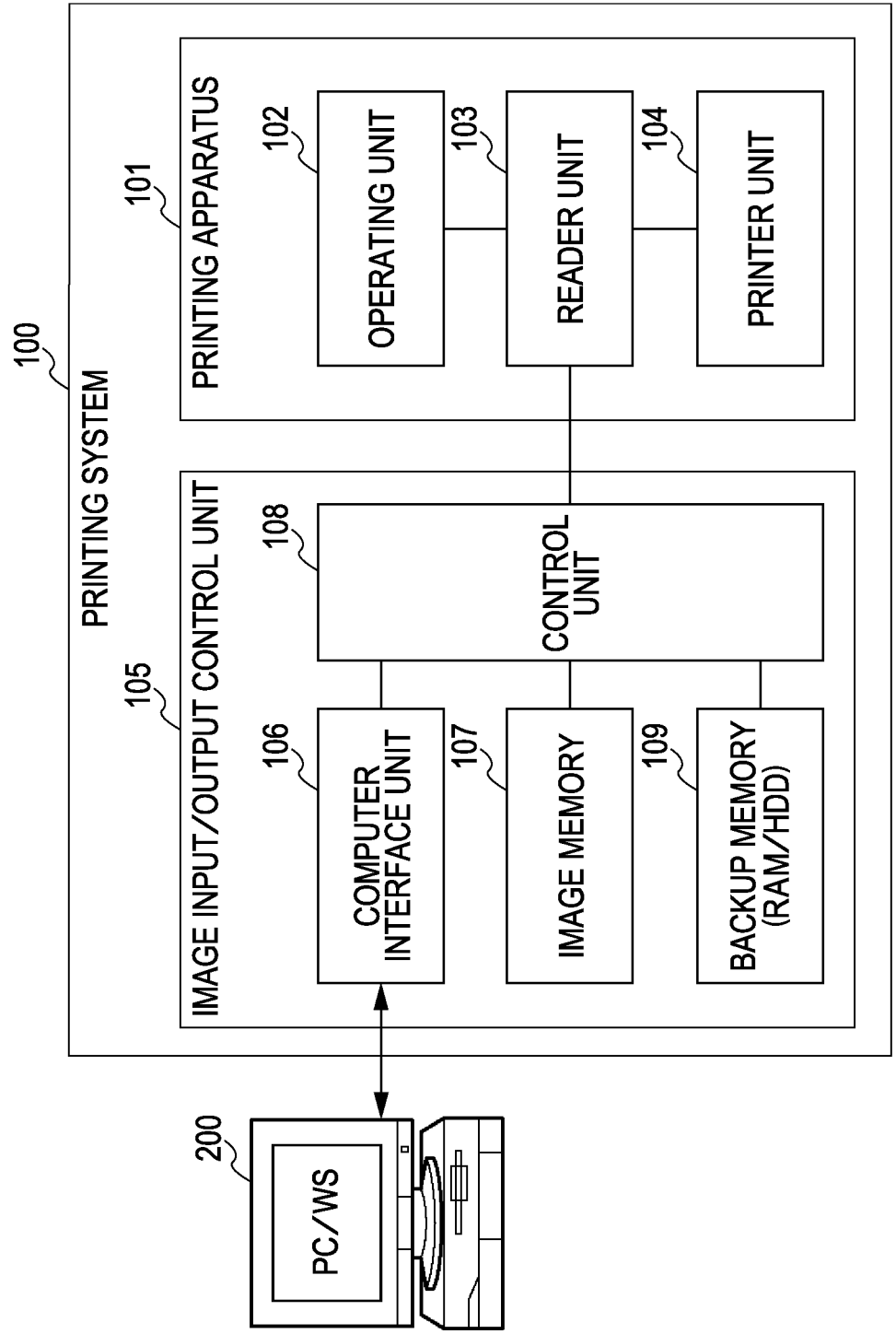
FIG. 2 is a diagram illustrating the detailed configuration of the printing system according to the embodiment.

FIG. 2 is a block diagram illustrating the detailed configuration of the printing system 100 according to the embodiment illustrated in FIG. 1. As illustrated in FIG. 2, the printing system 100 according to the present embodiment principally comprises a system main unit 101, and an image input/output control unit 105. The printing apparatus main unit 101 includes an operating unit 102, reader unit (scanner unit) 103, and a printer unit 104. Note that in reality the image input/output control unit 105 is also built in the inside of the casing of the printing apparatus main unit 101.

The operating unit 102 is used for operating the printing apparatus main unit 101 and the image input/output control unit 105. For example, the operating unit 102 includes a touch-panel-type liquid crystal display unit, and a mechanical hardware key, which let an operator perform various types of settings. Also, the reader unit 103 includes an automatic document feeder such as an ADF or the like as described above, and executes reading processing of an original image set on an original table to output the read image data to the printer unit 104 and the image input/output control unit 105. Further, the printer unit 104 records the image data from the reader unit 103 and the image input/output control unit 105 on a recording medium such as recording paper depending on printing processing conditions set as to job data. The operating unit 102 including this display unit is equivalent to one example of a user interface unit according to the present embodiment (hereafter, also referred to as UI unit). The UI units included in the information processing device such as the computers 200 through 400 and so forth, and various types of external devices such as such as other printing apparatuses such as the MFP 500, internet facsimile apparatus 600, and so forth are examples of a UI unit (keyboard, pointing device such as mouse, and so forth, display apparatus, operating panel, and so forth) according to the relevant embodiment. However, the UI unit is not limited to such examples.

The image input/output control unit 105 includes the control unit 108 connected to the reader unit 103, a computer interface unit 106 connected to a network 700, image memory 107, and backup memory (RAM/HDD) 110. The control unit 108 includes a CPU and program memory (not shown), and control the entirety of the printing system 100.

The computer interface unit 106 serves as an external communication unit, and interfaces between an external device (the respective devices connected to the communication medium 700 shown in FIG. 1) and the control unit 108. The printing system 100 performs data communication with an external device using the relevant unit 106. Note that examples of an external device include a print server (server computer) 200 and so forth made up of a personal computer or a workstation (PC/WS). The computer interface unit 106 renders code data (PDL) representing the image transferred from the server computer 200 into image data which can be recorded at the printer unit 104, and hands this to the control unit 108. Also, the computer interface unit 106 performs transmission/reception of various types of data (e.g., command data, status request information, status information, point-in-time data, etc.) other than image data as to an external device. Note that the control unit 108 controls the data flow among the reader unit 103, computer interface unit 106, image memory 107, and backup memory 109.

The backup memory 109 is a nonvolatile memory unit of which stored data is not erased even if power is turned off. This memory 109 is for saving important data which needs to be backed up in the printing apparatus main unit 101 and the image input/output control unit 105. That is to say, the backup memory 109 includes a storage region where multiple unprocessed job data (the series of multiple image data) can be stored and held. Thus image data and job data and so forth to be input from the reader unit 103 or an external device can be stored and held. Note that the backup memory 109 is made up of, for example, backup RAM, a backup hard disk, a rewritable optical disc, or the like. Note that the present example thus employs an arrangement wherein the printing system 100 itself includes nonvolatile large capacity memory which can accumulate multiple job data, but an arrangement is not restricted to this. For example, an arrangement may be made wherein a memory unit for storing multiple job data to be printed by the printing system 100 is included in an external device.

Additionally, this backup memory 109 is also configured so as to be used for preventing data from disappearance. However, this is not used for this meaning alone. For example, the relevant backup memory 109 is also configured so as to be used for handling needs such as printing desired data with desired timing and desired printing mode any number of times by a user.

As one example thereof, the present printing system 100 is configured so as to provide a box function using the memory 109. In this case, an arrangement is made as follows. For example, an arrangement is made wherein a user can select the box function via the user interface unit of an external computer or the printing system 100 itself. The user selects the box function, following which can input document data of a job to be processed or the like from the reader unit 104 or the external computer to the present printing system 100. The document data of the job input in a state in which the box function is selected is saved in the box which the user specified from multiple data storage boxes virtually provided within the memory 109. Further, the printing system 100 is configured such that a user can select the box function via the operating unit, and selects a desired box, and also can select desired data from the selected box. The control unit 108 controls the present printing system 100 so as to print the job data thus selected at the printer unit 104, or transmit to the external device based on the processing conditions set by the user via the operating unit of the apparatus 100. The memory 109 is also arranged so as to be used at the time of providing such a box function. With the present embodiment, the control unit 108 of the printing system 100 executes such various types of control.

As described above, the printing system 100 according to the present embodiment is configured so as to store multiple print job data in the backup memory 109, and sequentially process these. For example, even during printing operation of a certain print job being executed at the printer unit 104, print job data (image data) to be printed at the printer unit 104 can be received from an external device or the reader unit (scanner unit) 103 of the self-apparatus. Note that with the present embodiment, the control unit 108 included in the printing system 100 controls these various types of units included in the system 100.

Figure 3:
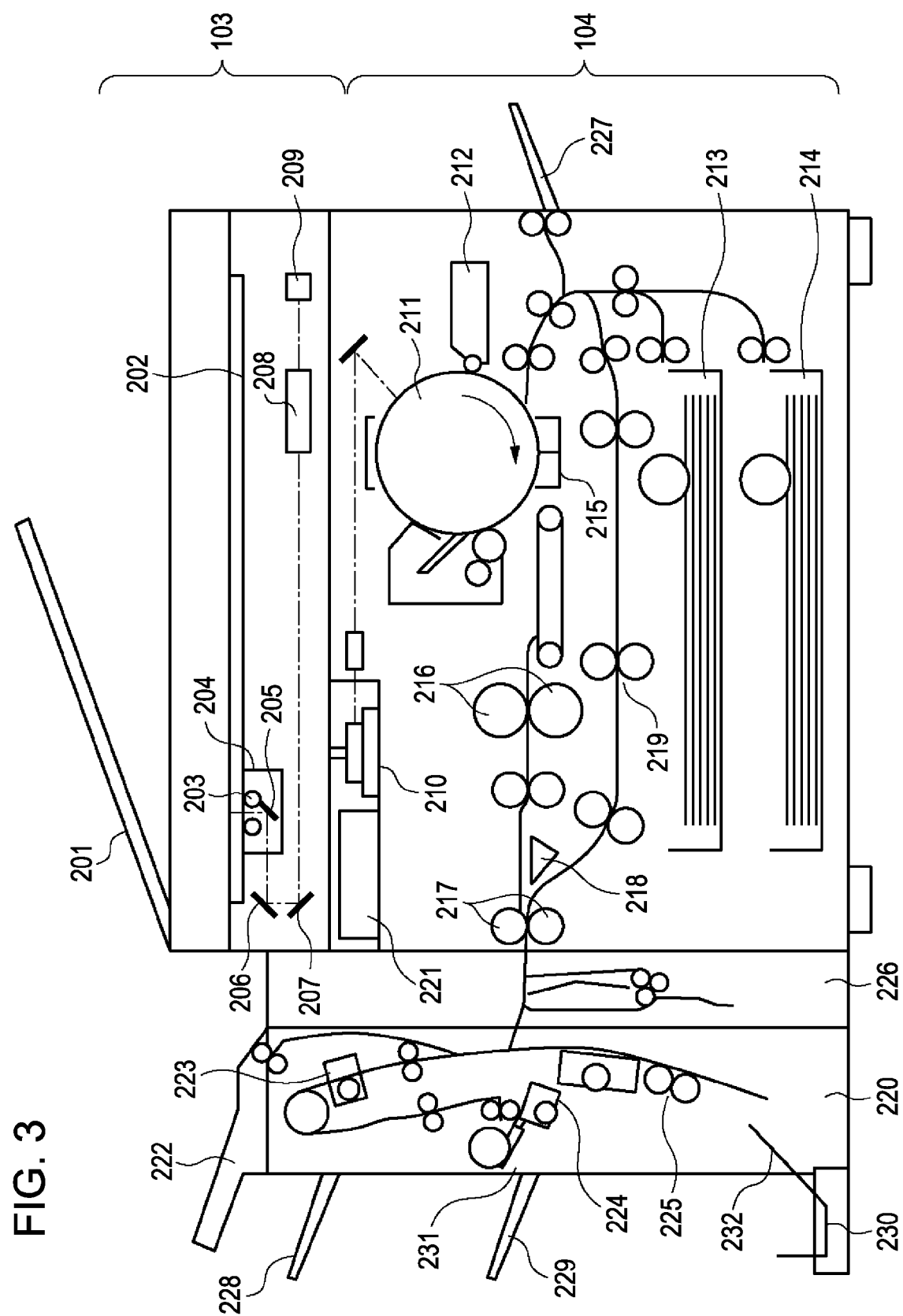
FIG. 3 is a cross-sectional view of the system configuration in an embodiment in which the finisher is mounted on the printing apparatus main unit 101 shown in FIG. 2.

FIG. 3 is a cross-sectional view of the system configuration in the case in which the finisher is mounted on the printing apparatus main unit 101 included in the printing system 100 shown in FIG. 2. In FIG. 3, an automatic document feeder 201 is for feeding originals on a platen glass 202 in order from the top one sheet at a time, and following completion of reading operation of the originals, discharging the original on the platen glass 202.

Upon an original being transported on the platen glass 202, a lamp 203 is turned on, and movement of a scanner unit 204 is started, thereby subjecting the original to exposure scanning. The reflected light from the original at this time is guided to a CCD image sensor (hereafter, referred to as CCD) 209 by mirrors 205, 206, and 207, and a lens 208. The image of the original scanned thus is read by the CCD 209. The read image is stored in the backup memory 109 as digital output image data.

A laser driver 221 drives a laser emitting light unit 210 depending on the output image data stored in the backup memory 109 to emit laser light according to the output image data. This laser light is cast upon a photosensitive drum 211, and the latent image corresponding to the laser light is formed on the photosensitive drum 211. The portion of the latent image of this photosensitive drum 211 is adhered with a developing agent by a developing apparatus 212. In the event of a color machine, developing apparatuses of four-color worth of yellow, magenta, cyan, and black are mounted, for example.

A recording sheet is fed from either of a cassette 213 or cassette 214 with timing in sync with start of casting of laser light, and transferred to a transfer unit 215. At the transfer unit 215, the developing agent adhered to the photosensitive drum 211 is transferred to the recording sheet. The recording sheet to which the developing agent is adhered is transferred to a fixing unit 216, and the developing agent is fixed upon the recording sheet by the heat and pressure of the fixing unit 216. The recording sheet, having passed through the fixing unit 216, is discharged by a discharge roller 217.

In the event of double-sided recording being set, following the recording sheet being transported to the discharge roller 217, the rotational direction of the discharge roller 217 is reversed, thereby guiding the recording sheet into a paper refeeding transportation path 219 by a flapper 218. The recording sheet guided into the paper refeeding transportation path 218 is fed to the transfer unit 215 with the above timing again, and recording of the surface of the opposite side of the relevant recording sheet is performed.

In the event that the system 100 includes a Z-folding unit 226, the control unit 108 controls the system 100 so as to convey the recording sheet subjected to printing by the printer unit 104 to the Z-folding unit. The control unit 108 controls the Z-folding unit 226 to subject the relevant printed articles to Z-folding in accordance with the printing processing conditions set by the operator for a job to be processed from the operating unit 102. Also, in the event that the system 100 includes a finisher 220, the control unit 108 controls the system 100 so as to supply the printed articles subjected to printing by the printer unit 104 into the relevant finisher 220. Moreover, the control unit 108 controls the relevant finisher 220 to execute sorting processing of the printed articles of a job to be processed depending on the printing processing conditions set by the operator for the job to be processed. Moreover, the control unit 108 controls the puncher 223 to execute punching processing (puncturing processing) of the printed articles of a job to be processed depending on the printing processing conditions set by the operator for the job to be processed. Moreover, the control unit 108 controls the relevant finisher 220 to execute saddle-stitching processing of the printed articles of a job to be processed depending on the printing processing conditions set by the operator for the job to be processed. For example, in this case, upon using a saddle stitcher 225, the center portions of the recording sheets are stitched, thereby subjecting the recording sheets to binding by folding the center portions thereof. Moreover, the control unit 108 controls the stapler 224 to execute stapling processing of the printed articles of a job to be processed depending on the printing processing conditions set by the operator for the job to be processed.

Further, with an inserter 222, preprinted recording sheets or a cover can be fed as inserting paper. According to such a configuration, preprinted recording sheets are not passed through the recording sheet route of the printer unit 104, so the sheets can be conveyed without damage. A job using no saddle stitcher 225 passes through a discharge opening 231, and discharges to either of movable tray 228 or 229. The movable trays 228 and 229 can be both moved vertically, and in the event of outputting to the movable tray 228, the movable tray 228 descends to the position of the discharge opening 231. On the other hand, in the event of a job using the saddle stitcher 225, recording sheets are passed through the discharge opening 232 to be discharged to a binding tray 230. The control unit 108 also executes control according to the above various types of operation.

Next, description will be made regarding the operating unit 102 included in the printing apparatus main unit 101 of the printing system according to the present embodiment with reference to "schematic view of operating unit" in FIG. 4.

Figure 4:
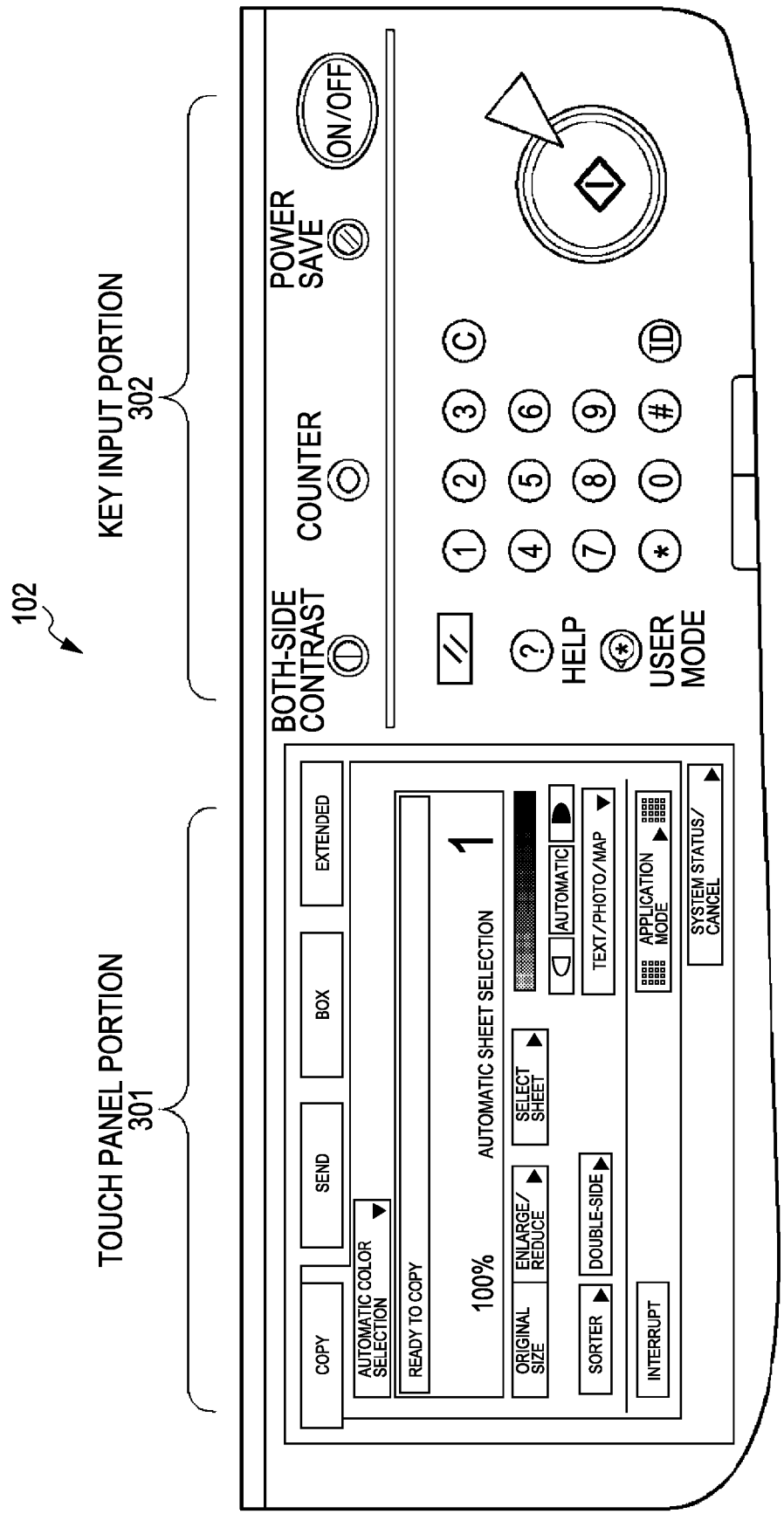
FIG. 4 is a schematic diagram of the operating unit of the printing system according to the embodiment.
Figure 5:
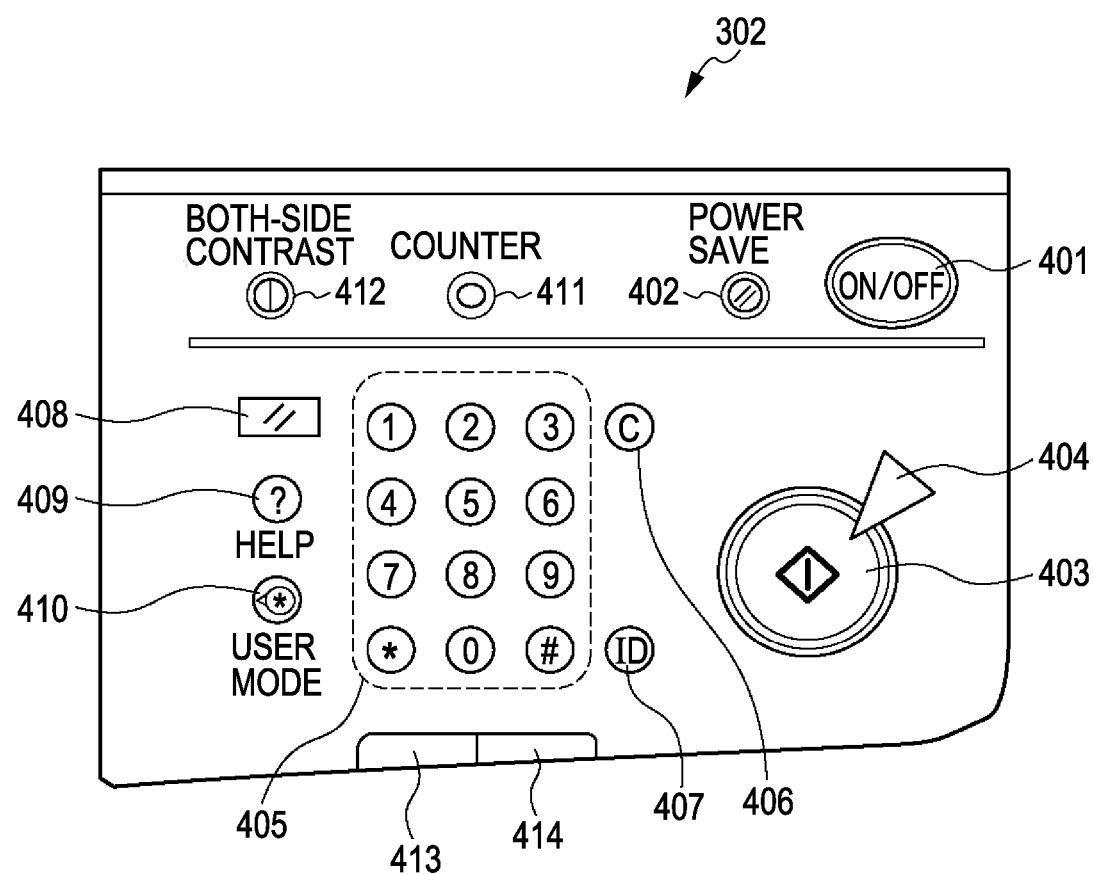
FIG. 5 is a schematic diagram of the key input unit of the printing system according to the embodiment.
Figure 6:
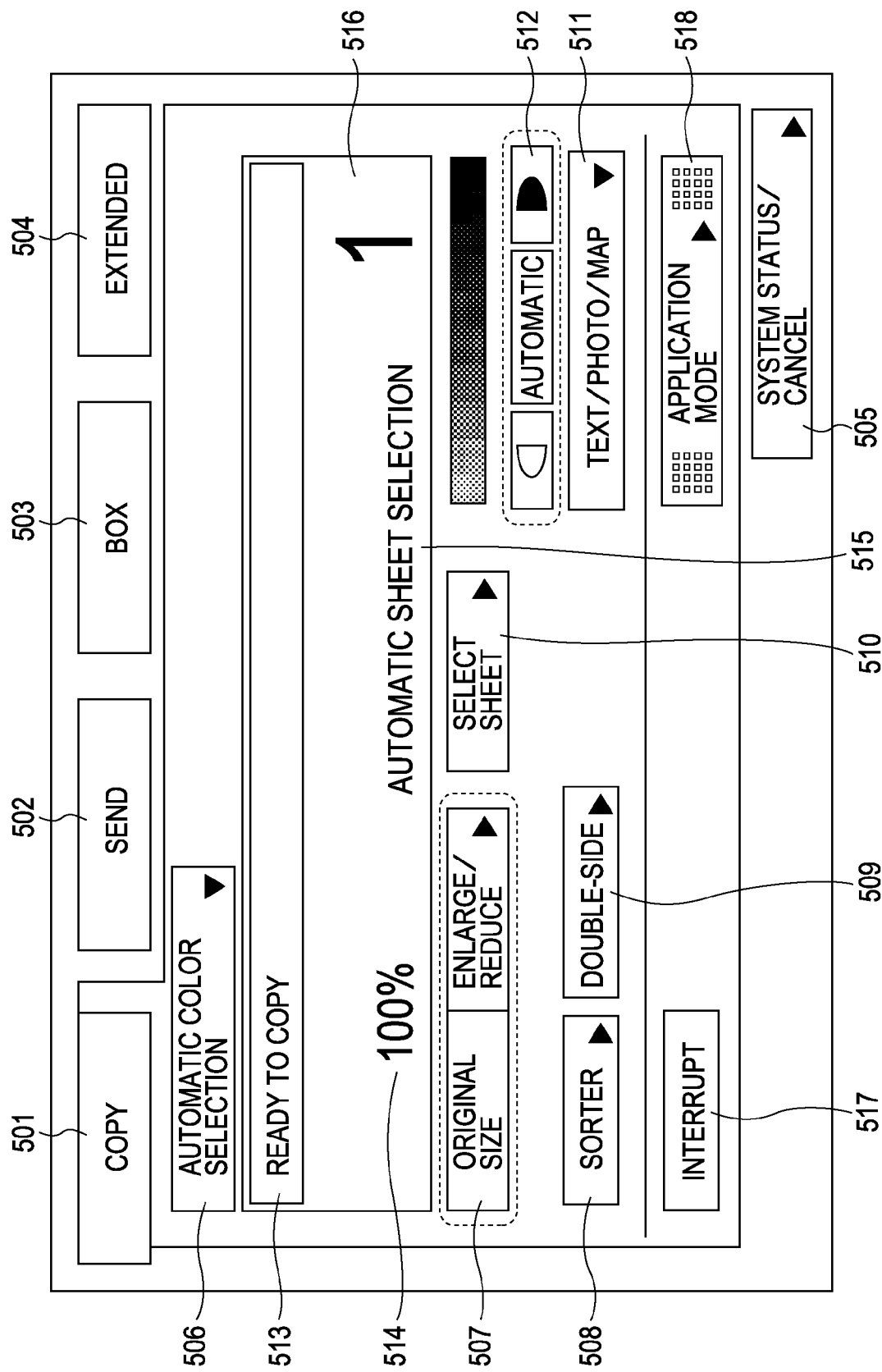
FIG. 6 is a schematic diagram of the touch panel unit (copy tab) of the printing system according to the embodiment.

FIG. 4 is a diagram illustrating one example of the operating unit 104 of the MFP, which comprises a key input portion 302 and a touch panel portion 301. Also, FIG. 5 is a schematic view illustrating the details of the key input portion 302, and FIG. 6 is a schematic view illustrating the details of the touch panel portion 301. The respective details will be described below.

The key input portion 302 illustrated in FIG. 5 is a key input portion which can perform operating settings.

An operating-unit power switch 401 is for switching a standby mode (ordinary operation mode) and a sleep mode, which can be controlled when a main power switch for performing power supply of the entire system is in an ON state. Note that the sleep mode is a state in which a main controller stops the program in an interruption standby state in preparation for network printing, facsimile, and so forth, thereby suppressing power consumption.

A power saving key 402 is a key for setting operation so as to lower the control temperature of a fixing apparatus at the time of the standby mode, and suppress power consumption, even though it takes time to get back to a printable state. Note that the control temperature can be also lowered by setting a power saving ratio.

A start key 403 is a key for instructing start of copying, transmitting, and so forth, and a stop key 404 is a key for interrupting that. A numeric keypad 405 is a keypad for inputting a numeric number of each type of settings, and a clear key 406 is a key for canceling the input numeric number thereof. An ID key 407 is a key for letting the operator input a predetermined password to authenticate the operator of the MFP.

A reset key 408 is a key for invalidating various types of settings, and returning the contents of the settings to a default state. A help key 409 is a key for displaying a guidance or help. A user mode key 410 is a key for changing the screen of a monitor unit 301 to a system setting screen for each user.

A counter confirmation key 411 is a key for displaying the number of output sheets stored in a software counter, which is provided within the MFP, for counting the number of printed sheets and so forth. With the display of the number of output sheets, the respective number of output sheets can be displayed depending on an operation mode such as copy/print/scan/facsimile and so forth, a color mode such as color/monochrome, or a paper size such as large/small. An image contrast dial 412 is a dial for adjusting the visible facility of a screen such as optically adjusting the backlight of liquid crystal display of the touch panel portion, or the like.

An execution/memory lamp 413 is a lamp for informing the operator of that a job is being executed, or memory is being accessed, by being flashed or the like. An error lamp 414 is a lamp for informing the operator of an error such as a case in which a job cannot be executed, or a serviceman call, or the like, or an operator call for informing a jam, short of consumables, or the like by being flashed or the like.

Next, one example of the touch panel portion 301 will be described with reference to FIG. 6. The touch panel portion 301 includes a touch panel display made up of an LCD (Liquid Crystal Display), and a transparent electrode affixed thereupon. Upon the portion of the transparent electrode which is equivalent to a key to be displayed on the LCD being touched by a finger, processing such as detecting the operation to display another operating screen or the like is programmed to be executed beforehand. FIG. 6 is an initial screen at the standby mode, which can display various types of operating screens depending on setting operations.

In FIG. 6, a copy tab 501 is a tab key for making the transition to the operating screen of copying operation. A send tab 502 is a tab key for making the transition to the operating screen for instructing transmitting (sending) operation such as facsimile, E-mail transmission, or the like. A box tab 503 is a tab key for making the transition to the operating screen for inputting/outputting a job to/from a box (storing means for storing a job for each user). An extended tab 504 is a tab key for making the transition to the operating screen for setting an extended function such as scanner setting and so forth. A system status/cancel key 505 is a key for displaying the status or situation of the MFP. Selecting any one of the above keys 501 through 505 enables the transition to be made to the corresponding operating mode screen.

FIG. 6 illustrates an operating screen example in the event that the copy tab 501 is selected. With this operating screen, a color selection key 506 is a key for selecting beforehand whether color copying, monochrome copying, or automatic selection is performed. A magnification setting key 507 is a key for making the transition to a screen for setting a magnification such as original, enlargement, reduction, and so forth. A post-processing setting key 508 is a key for making the transition to a screen for setting the existence, number, position of stapling, punching, and so forth. A double-side setting key 509 is a key for making the transition to a screen for selecting single-side printing or double-side printing. A sheet-size setting key 510 is a key for making the transition to a screen for selecting a sheet supply stage, sheet size, and media type. An image mode setting key 511 is a key for selecting an image mode suitable for an original image such as a text mode, photo mode, or the like. A density setting key 512 is a key for adjusting an output image densely or lightly.

A status display portion 513 is a display portion for performing simplified status display such as a standby state, during warming-up, jam, error, or the like. Also, a magnification display portion 514 displays the magnification set by the magnification setting key 506. Also, a sheet-size display portion 515 displays a sheet size or the like set by the sheet-size setting key 509. A number-of-sheet display portion 516 displays the number of sheets specified by the numeric keypad 405, or which sheet is now printing during operation. Further, an interrupt key 517 is used in the case of interrupting another job during copying operation. An application mode key 518 is a key for making the transition to a screen for setting various types of image processing such as page consecutive photographing, cover/inserting paper setting, reduced layout, movement of an image, or the like, layout, and so forth. Thus, the printing processing conditions of a job to be processed are controlled by the control unit 108 so as to be accepted from a user via the display portion.

Description will be made in detail below regarding various types of control as to the job accepted at the printing system 100. Let us say that a job processing method according to the present embodiment interrupts a job in the event that an interruption cause occurs, and also enables printing of another job other than the interrupted job to be performed. Subsequently, when the interrupt factor is cancelled, the job processing method according to the present embodiment allows the operator to select a resuming method of processing of the interrupted job. Note that with the present embodiment, control for executing the processing operation of such a job, and display control relating to display to be used for that, and so forth are principally performed by the control unit 108.

Also, in response to receiving the printing execution request of a job to be processed, the control unit 108 controls the present apparatus 101 so as to execute the printing operation of the relevant job. Also, the control unit 108 accepts the printing execution request of printing data of a job to be read by the reader unit 103 included in the printing apparatus 101 itself from the operator via the operating unit 102 included in the printing apparatus 101 itself.

Note that with the box function according to the present embodiment, the original image data of a job from the reader unit 103, and the original image data of a job from an external device which is accepted via the computer interface unit 106 become data to be printed. Thus, the control unit 108 also accepts the printing execution request of printing data of the box function from the operator via the operating unit 102.

Thus, let us say that the control unit 108 accepted the printing execution request of a job to be processed from the operator via the operating unit 102. In this case, the control unit 108 controls the system 100 to execute the series of printing operations in accordance with the printing processing conditions set for the job by the operator via the operating unit 102 at the time of inputting the relevant printing execution request for the relevant job.

On the other hand, let us say that the control unit 108 accepted the printing execution request of a job to be processed via the UI unit of an external device such as the PC 200 in FIG. 2 or the like from the operator of the external device. In this case, the control unit 108 accepts the printing processing condition data of the relevant job via the computer interface unit 106 as well as the printing data of a job to be processed. Thus, in the event that a printing execution request is executed by the external device, the control unit 108 controls the system 100 so as to execute the series of printing operations in accordance with the printing processing conditions set via the UI unit of the relevant external device for the relevant job.

With the present system 100 assuming that the various types of configuration requirements described with the above examples, with regard to the control unit 108, which is equivalent to one example of the control unit according to the present embodiment, a specific control example will be shown below to show what kind of control is executed.

Now, description will be made principally regarding control to interrupt the printing operation of the job along with a printing interruption factor of the job occurring following the start of the printing operation of a job of which a printing execution request has been made. Moreover, description will be made regarding controlling the system 100 to execute the printing operation of another job during the printing interruption of the relevant job. Moreover, description will be made regarding control relating to what kind of timing and under what kind of conditions the system 100 resumes execution of the printing operation of an interrupted job during printing.

With the present embodiment, the control unit 108 controls the system 100 to execute the processing of various types of flowcharts disclosed in the present embodiment (including the processing of the respective flowcharts illustrated in FIGS. 7A, 7B, 15, 17, 22, 25, and 28), thereby performing these various types of control at the system 100. Also, a computer-readable control program for executing the processing of various types of flowcharts disclosed in the present embodiment (including the processing of the respective flowcharts illustrated in FIGS. 7A, 7B, 15, 17, 22, 25, and 28) is stored in the memory 109 beforehand.

Moreover, the control unit 108 enables various types of display disclosed in the present embodiment relating to such processing (including the respective types of display illustrated in FIGS. 6, 8 through 14, 16, 18 through 21, 23, 24, 27, and so forth) to be executed using the user interface portion according to the present embodiment. A computer-readable control program for enabling these various types of display using the UI unit according to the present embodiment is also stored in the memory 109 beforehand.

The control unit 108 enables the system 100 to execute various types of control disclosed in the present embodiment including various types of control examples exemplified below by reading and referencing these control programs held in the memory 109. Hereinafter, a description will be made of the processing of the flowchart in FIG. 7A.

First, the control unit 108 determines whether or not a printing execution request of a job to be processed is accepted from the operator. In the event of determining that the printing execution request has been made, the control unit 108 stores the data relating to this printing job (the printing data of this job, and the various types of printing processing condition data set by the operator of this job) in the memory 109. This processing corresponds to the processing in S601 in FIG. 7A.

Subsequently, when the printing data of at least one page worth of the job of which a printing execution request has been made is stored in the memory 109, the control unit 108 enters (registers) the relevant job on a printing queue within the memory 109 as a job to be printed. This processing corresponds to the processing in S602 in FIG. 7A.

A supplementary explanation including specific examples of the processing relating to steps S601 and S602 will be made below.

For example, description will be made regarding a case wherein the control unit 108 accepts the printing execution request of a job to execute printing from an operator via the operating unit corresponding to one example of the UI unit according to the present embodiment.

For example, let us say that the user (equal to operator) sets the series of stack of originals made up of multiple originals of A4 size of 50 pages in the automatic document feeder (also referred to as ADF) 201 included in the reader unit 103.

At this time, the control unit 108 controls the touch panel portion (also referred to as display portion) included in the operating unit 102 to execute display of the printing setting screen illustrated in FIG. 6 as display for allowing the operator to set the printing processing conditions of the relevant job. Moreover, the control unit 108 accepts the various types of printing processing conditions of a job to be processed from the operator via display of the relevant setting screen.

Now, let us say that the user sets the number of print copies "5" via the numeric keypad 405 of the operating unit 102 as the total number of print copies necessary for the series of printing operations of the job.

Along with the operator setting the printing processing conditions of the job to be processed, the control unit 108 controls the display portion 301 to update display contents so as to confirm the setting contents by the operator. For example, in this case, the control unit 108 controls the display portion 301 to execute display such as illustrated in FIG. 8.

Figure 8:
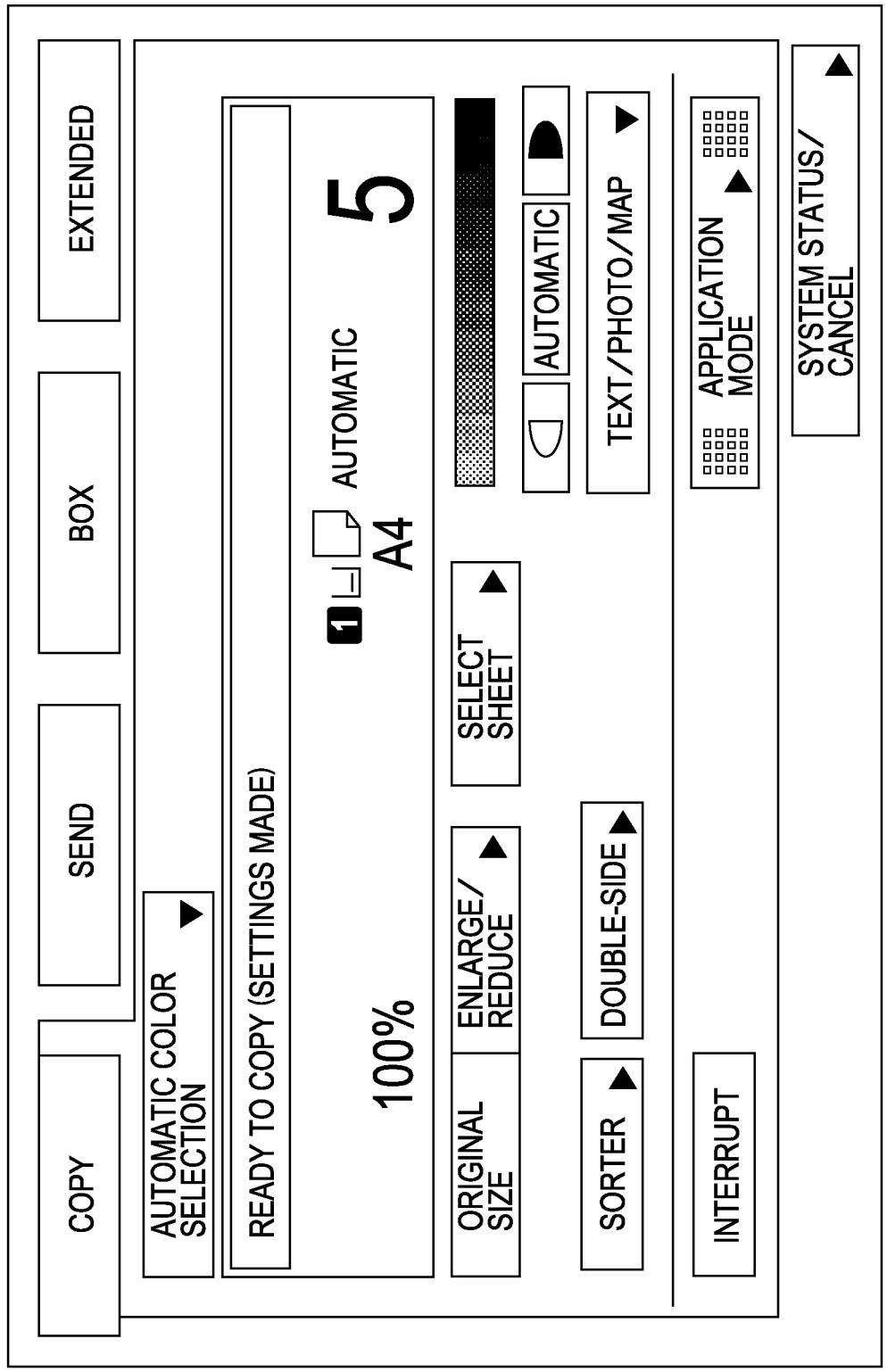
FIG. 8 is a diagram for describing a control example of the embodiment.

The display illustrated in FIG. 8 which the control unit 108 controlled the display portion 301 to execute is a control example wherein the following printing processing conditions are set by the user since this job to be processed is "a job necessary for printing execution of the series of printing data made up of 50 A4-size originals".

a. The number of print copies is "5 copies" in total
b. The size and type of sheets necessary for printing is "A4 size and also plain paper"
c. Printing magnification is "original (100%)"
d. The setting of finishing is "none"
e. Double-sided printing is "none" (execute single-sided printing)

Thus, with the present embodiment, an arrangement is made wherein the UI unit can execute display with which the user can confirm the printing processing conditions accepted for a job to be processed from the user prior to accepting a printing execution request from the user. This arrangement is also one example of arrangements for realizing improvement of operability with the present embodiment.

Thus, the control unit 108 enables the settings of the series of the printing processing conditions such as the various types of processing conditions (sized and type of sheets, enabling/disabling of double-sided printing, setting of the application mode, enabling/disabling of execution of finishing and type thereof) and so forth for the job to be processed to be executed by the user via the UI unit according to the present embodiment.

Moreover, the control unit 108 controls the memory 109 to hold the setting information from the user so as to manage this in relation to the printing data of the job as the series of the printing processing condition data of the relevant job.

The control unit 108 determines to have received the printing execution request of the job to be processed from the user by the user depressing key 403. Simultaneously therewith, in response to receiving this job processing start request, the control unit 108 controls the present system 100 to start execution of the series of the operations for the job necessary for achieving the printing operation of the job.

For example, the above job is a copying job necessary for original reading operations. Accordingly, in this case, the control unit 108 responds to depression of the key 403 by the user, controls the reader unit 103 to start the original reading operation of the stack of originals made up of 50 originals which has been set on the ADF.

Moreover, the control unit 108 sequentially stores the original image data (equal to printing data) of the job which has been subjected to this reading operation in the memory 109 each time one original document is read. Moreover, the control unit 108 continues the storing operation of the printing data of the relevant job in the memory 109 until reading of the final original of the stack of originals of the job is completed at the ADF. Moreover, the control unit 108 controls the printer unit 104 to print the printing data of the job in accordance with the printing processing conditions of the relevant job following the storing operating in the relevant memory 109. The control unit 108 responds to accepting the printing execution request of the job to be processed from the user, and controls the system 100 to execute such series of printing operation.

Note that with the present embodiment, a printing job to be processed is not limited to a job necessary for original reading operation by the reader unit 103 prior to execution of printing. For example, a job wherein the CPU of the external device transmits the request to the system 100 in response to the printing execution request being performed by the user from an external device (computer 300, computer 400, or the like) via the UI unit of the relevant external device, is also a job to be processed.

Thus, the presence of a job in which the printing execution request has been performed by an external device is confirmed by the control unit 108 on condition that the job data from the relevant external device has been received at the computer interface 106 of the system 100. Moreover, upon receiving the data of the relevant job, the control unit 108 stores the data of the job in the memory 109. Subsequently, when the printing data of at least one page worth of the job of which a printing execution request has been made at the external device is stored in the memory 109, the control unit 108 enters (registers) this job on the printing queue within the memory 109 as a job to be printed. Such processing corresponds to the processing to be executed in the processing in S601 and S602 in FIG. 7A. Moreover, the control unit 108 controls the printing apparatus 101 to execute the printing operation of the printing data of the job stored in this memory 109 in accordance with the printing conditions set by the user via the UI unit of the external device.

As described above, with the present embodiment, the control unit 108 controls the system 100 to handle a job of which a printing execution request has been performed via the UI unit of the system 100, and a job of which a printing execution request has been performed via the UI unit of an external device as a job to be printed.

Figure 9:
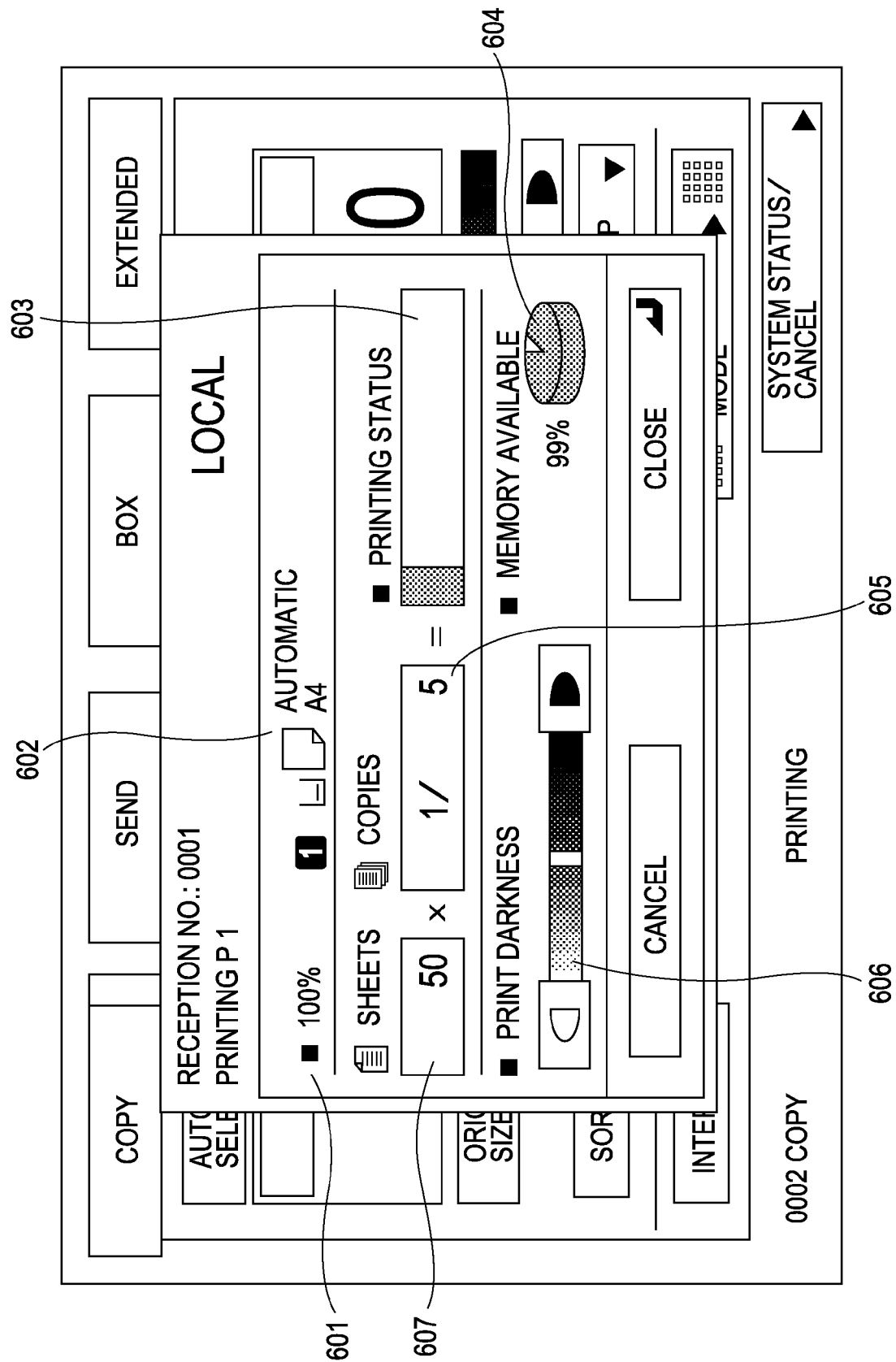
FIG. 9 is a diagram for describing a control example of the embodiment.

Note that the control unit 108 controls the display portion 301 to execute display associated with the processing situation of the job in the event that the processing of a job to be processed is started at the system 100. FIG. 9 is one example of this.

The screen illustrated in FIG. 9 which the control unit 108 controls the display portion 301 to execute is a job processing situation screen which informs the user of the progress situation of a job of which processing is being executed. The control unit 108 controls the screen illustrated in FIG. 9 to display, for example, how many pages and how many copies of the series of printing data need to be printed, and how far processing has progressed.

Note here that a printing job to be processed is "a job necessary for original reading operation by the reader unit 103 prior to printing". In this case, the control unit 108 determines the number of originals of the job by number-of-original counting operation using information from a sensor detecting sheets provided in the ADF included in the reader unit 103. For example, the control unit 108 performs control so as to count the number of originals fed from the original tray of the ADF based on the relevant sensor of the ADF, and display the number of count thereof on the number-of-print display portion 607 when the sensor detects that there is no sheet on the ADF. At this time, an arrangement may be made wherein during a process for feeding originals the number fed is displayed such as 1, 2, 3, and so on.

With this control example, the total number of originals of the above job to be processed is 50 pages (sheets). Accordingly, in the event that the reading operation of the entire originals of the relevant job has been completed by the reader unit 103, the control unit 108 controls the number-of-print display region 607 to display "50" such as illustrated in FIG. 9. This information of "50" is information for informing the user that this processing is processing wherein with printing operation of one bundle worth of the job being executed (printing operation of one copy worth), the number of print pages of printing data to be printed is 50 pages (50 sheets) in total.

Also, the control unit 108 controls the display portion 301 to display information for informing the user how many copies in total of the number of print copies the job being executed needs, and which copy is now being printed on the number-of-print display region 605 of the screen in FIG. 9. For example, with this example, the job to be processed is "a job requiring printing of the series of printing data made up of 50 pages for five copies worth in total". Moreover, let us say that the first copy is now being printed by the printer unit 104. Accordingly, the control unit 108 controls the region 605 to display "1/5".

Let us say that the job to be processed is "a job from an external device which needs no original reading operation by the reader unit 103 prior to printing". In this case, the control unit 108 confirms how many pages in total for the printing data of the job has been stored in the memory 109 from the external device. Thus, the control unit 108 determines the total number of original pages. Moreover, the control unit 108 confirms the series of the printing processing condition data stored in the memory 109 associated with the printing data of the job. Thus, the control unit 108 determines the number of print pages in total of the job. The control unit 108 enables the display portion 301 to execute display indicating the processing situation in the printer unit 104 of the job as a job processing situation screen such as illustrated in FIG. 9 based on those determined contents and the printing situation of the job.

Also, the control unit 108 controls the display region 603 illustrated in FIG. 9 to display the processing situation (progress situation) of the job being executed not only in a numerical expression but also in a progress display bar for allowing a user to understand that graphically and also intuitively. For example, the control unit 108 obtains the progress situation of the job being executed, and information from the respective units of the system 100 in real time. The control unit 108 controls the display portion 301 such that a display format is changed associated with the progress situation of the job, and the progress display bar to be displayed on the relevant region 603 is extended.

Thus, the control unit 108 controls the display portion 301 so as to reflect the progress situation of the job being executed upon the screen in FIG. 9 in real time. For example, printing of the first copy of this job is completed, and in the event of the printer unit 104 now executing printing the second copy, the control unit 108 controls the display region 605 to update the information thereof to display "2/5". Also, thus, as soon as the progress of printing operation proceeds, the control unit 108 controls the region 603 to update and display the progress bar to be displayed.

Also, an arrangement is made wherein the screen illustrated in FIG. 9 which the control unit 108 controls the display portion 301 to display includes the various types of display components cited below for allowing a user to explicitly confirm the various types of information of the job being printed by the printer unit 104.

1. (Printing magnification display region 601) the control unit 108 controls the region 601 to display information for informing a user of the printing magnification of the job being printed.

2. (Sheet size/direction/remaining amount display region 602) the control unit 108 controls the region 602 to display information for informing a user of the sheet size, and direction of sheets of the job being printed, the amount of remaining sheets of the feeder storing sheets thereof, and so forth.

3. (Memory remaining amount display region 604) the control unit 108 controls the region 604 to display information for informing a user of the amount of remaining memory of the memory 109 storing the printing data of the job being printed.

4. (Print density adjustment region 606) the control unit 108 controls the region 606 to display information for informing a user of the printing density of the job being printed, and also display a display key for accepting an instruction for changing the printing density of the job from the user.

Such various types of arrangements for realizing improvement of operability are mounted on the present system 100.

The control unit 108 ends display of the job processing screen illustrated in FIG. 9 in response to a "close" key on the screen being depressed by the user. In this case, the control unit 108 controls the display portion 301 to execute display for enabling the printing processing conditions of the job to be processed (such as illustrated in FIG. 8) to be accepted by the user. Moreover, the control unit 108 enables the printing execution request of a new job to be processed to be accepted from the user via the relevant display.

Note that at the point of accepting the printing start request of the job to be processed by the user in S601 in FIG. 7A, there is a case in which another job is being printed by the printer unit 104. Also, there is also a case wherein there are jobs in a printing waiting state, i.e., multiple jobs have been already entered, and have stood by for completion of printing of the previous job.

Thus, let us say that the printing execution request has been already performed by a job other than the job to be processed in S601, and also there is a job registered on the printing queue. In this situation, the control unit 108 controls the job of which printing start request has been accepted to stand by at the memory 209 as a printing waiting job. In this case, the control unit 108 controls the memory 109 to first execute the storing operation of the printing data of the job of which printing execution request has been performed while controlling the printer unit 104 to execute the printing operation of another job. Subsequently, as soon as the printing of another job is completed, the control unit 108 reads out the printing data of the job thereof and controls the printer unit 104 to execute printing operation thereof.

On the other hand, let us say that at the point of accepting the printing start request of the job to be processed, there is no job being printed, and also there is no job in a printing waiting state. In this case, the control unit 108 controls the printer unit 104 to execute the printing operation of the printing data of the job, in parallel with storing operation of the printing data of the job of which the relevant printing start request has already been done.

For example, the control unit 108 has confirmed that no job to be printed other than the job to be processed in S601 in FIG. 7A is registered on the printing queue within the memory 109. In this case, at the same time as the printing data of the first page of the job to be processed in S601 is being stored in the memory 109, the control unit 108 controls the printer unit 104 to start printing of the printing data of this job. Thus, the control unit 108 enables the system 100 to perform simultaneous parallel operation with the same job of storing operation printing data in the memory 109, and printing the printing data of the job in the memory 109.

Also, the control unit 108 controls the memory 109 to store the printing data necessary for printing the job to be processed in S601, and also has controls the job to be registered on the printing queue in S602. Moreover, the control unit 108 has controlled the printer unit 104 to start printing of the printing data in the memory 109 in S603. The printing operation of the relevant job is being executed by the printer unit 104 following such processing. During the execution period of this printing operation the control unit 108 allows the system 100 to accept the printing execution request of another new job. Moreover, the control unit 108 controls the system 100 so as to simultaneously execute a storing operation of the printing data of the job of which the printing execution request has been newly performed in the memory 109 while executing the relevant printing operation of the job already being printed.

For example, the printing operation of a job for executing printing the above printing data is made up of 50 pages, with the printing conditions being set as illustrated in FIG. 8. Note that this job corresponds to the "job of reception No. 0001" on the top in the job processing situation list display screen illustrated in FIG. 11. In this state, for example, the control unit 108 controls the display portion 301 to execute the display illustrated in FIG. 10. Moreover, the control unit 108 enables the printing conditions of a new job to be accepted via the display in FIG. 10 during printing of the job of reception No. 0001. This display in FIG. 10 indicates the case of the following printing conditions being set by the user for the new job.

a. The number of print copies is "10 copies" in total
b. The size and type of sheets necessary for printing is "A3 size and also thick paper"
c. Printing magnification is "original (100%)"
d. The setting of finishing is "none"
e. Double-sided printing is "none" (execute single-sided printing)

Figure 10:
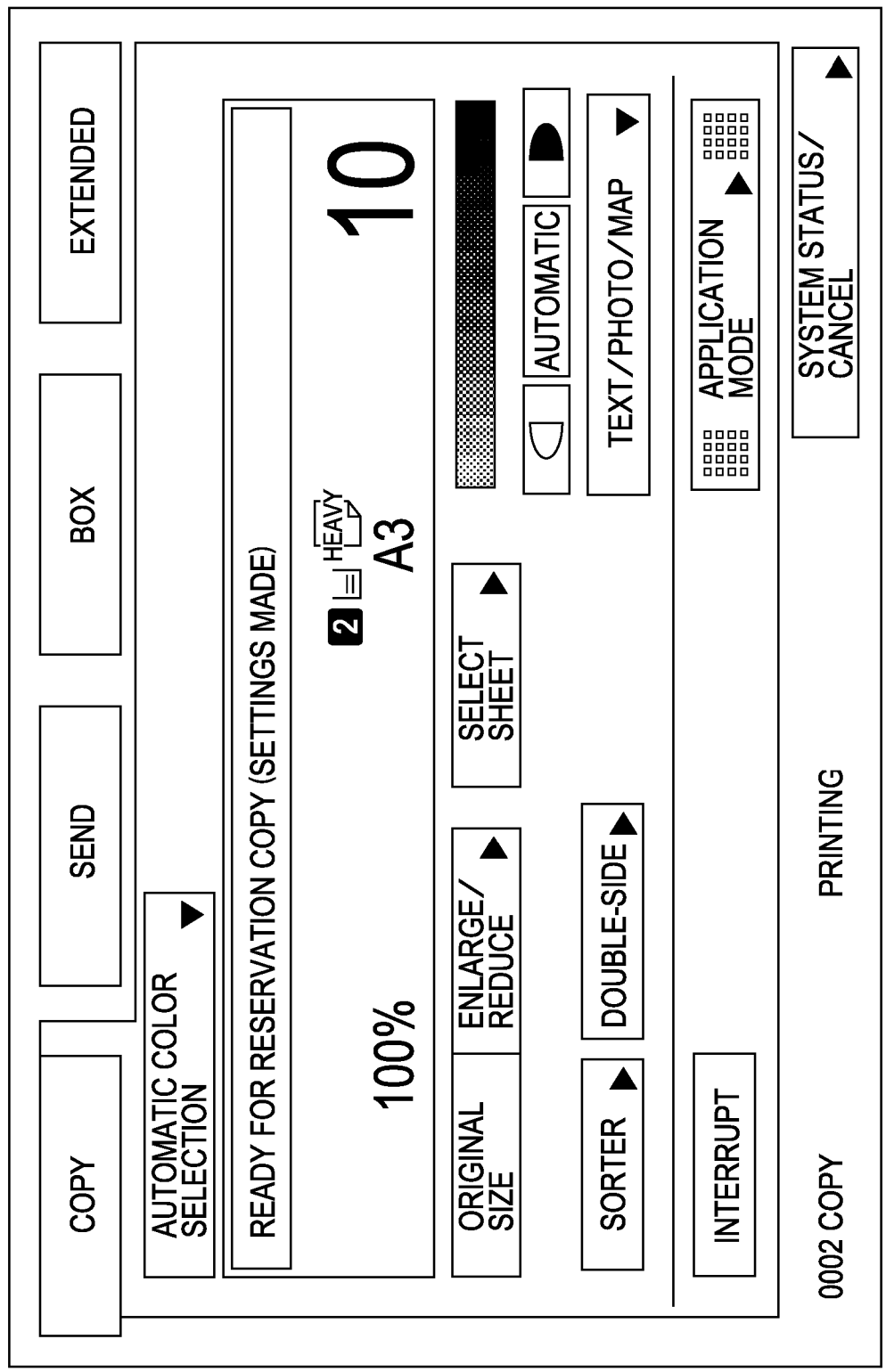
FIG. 10 is a diagram for describing a control example of the embodiment.
Figure 11:
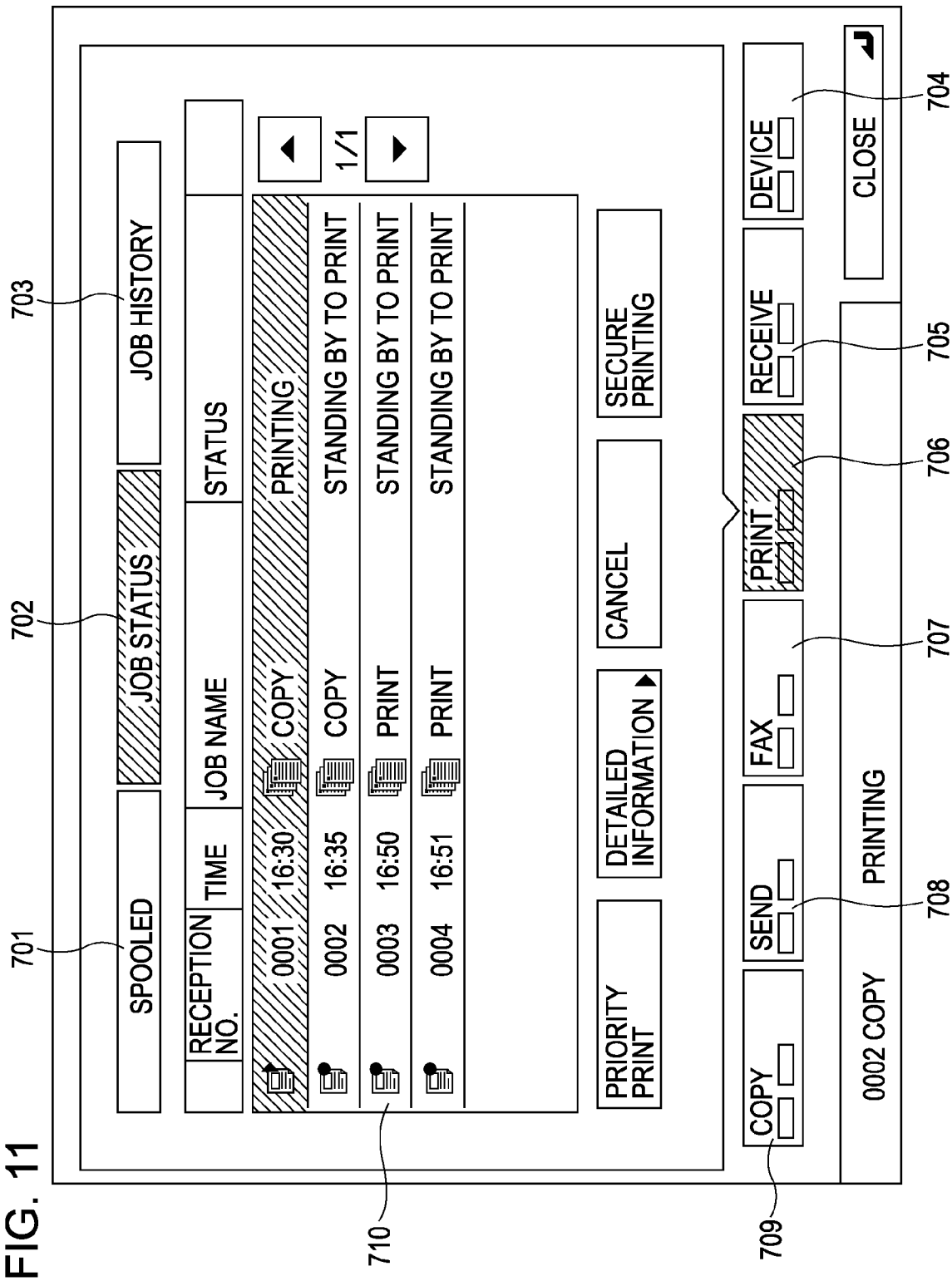
FIG. 11 is a diagram for describing a control example of the embodiment.

The job for which printing processing conditions are accepted from the user via the display in FIG. 10 corresponds to the "job of reception No. 0002" at the second from the top in the job processing situation list display screen illustrated in FIG. 11. Also, the user has set the series of originals made up of 100 A3-size sheets in the automatic document feeder 201. Moreover, let us say that following the above settings being performed for this job, the user has depressed the key 403. The control unit 108 determines to have received the printing execution request of the relevant job by the user depressing the key 403. Moreover, in accordance with this request, the control unit 108 controls the reader unit 103 to execute reading operation of the originals of this job made up of A3-size originals of 100 sheets in total, and sequentially store the printing data of the job subjected to the reading operation in the memory 109. The control unit 108 controls the memory 109 to store the job of reception No. 0002 while controlling the printer unit 104 to execute printing operation of the job of reception No. 0001 in parallel.

Now, let us say that the job of which printing execution request is newly performed during printing of the job of reception No. 0001 by the printer unit 104 is a job from an external device. That is to say, this job is a "job necessary for original reading operation by the reader unit 103 prior to start of printing". In this case, at the point of receiving the printing data of the job by the computer interface unit 106, the control unit 108 sequentially stores the printing data of the relevant job in the memory 109 according to page number along with the printing processing condition data of the job. The control unit 108 controls the system 100 so as to store the printing data of the job from this external device while printing the job of reception No. 0001 by the printer unit 104 in parallel.

Thus, the control unit 108 controls the printing execution request of a new job so as to be accepted while printing another job. When printing of the relevant job ends, the control unit 108 starts printing the new job.

Moreover, with the present embodiment, the control unit 108 obtains information relating to the processing situation of the job to be processed from various types of units included in the system 100 such as the reader unit 103, memory 109, printer unit 104, operating unit 102, and so forth while executing printing operation of the job being printed. Thus, the control unit 108 monitors the situation of the system 100 in real time while processing a job at the system 100.

With such a method, during printing of the job being printed the control unit 108 determines whether or not a printing interruption factor of the job occurs at the system 100. Subsequently, in the event of confirming that the printing interrupt factor of a job being printed has occurred, the control unit 108 controls the system 100 to interrupt the printing operation of this job being printed. Moreover, during the printing interrupt period of the relevant job, under particular conditions, the control unit 108 controls the system 100 so as to start the printing operation of another subsequent job of which printing execution has been requested.

Now, we will return to the description of FIG. 7A. The control unit 108 stores the printing data of a new job in the memory 109 in response to receiving the printing execution request from the user. This corresponds to the processing in S601. Simultaneously therewith, the control unit 108 confirms whether or not other jobs to be processed other than this job are already waiting in the memory 109. The control unit 108 executes this confirmation by referencing information of a management table for enabling information such as the accepted date and time, printing sequence, job name of a job to be printed which is managed within the memory 109 to be used by the control unit 108.

Let us say that as a result of performing the above confirmation, the control unit 108 has determined that there is no job to be printed other than the new job to be processed in S601. In this case, at the point of storing the printing data of one page worth of the new job in the memory 109, the control unit 108 controls the job to be registered on the printing queue, and at the same time, controls the printer unit 104 to start printing of the printing data of the pages of this job stored in the memory 109.

On the other hand, let us say that as a result of performing the above confirmation, the control unit 108 has determined that there is a job to be printed other than the new job to be processed in S601. In this case, at the point of storing the printing data of one page worth of the new job being stored in the memory 109, the control unit 108 controls the new job to be registered on the printing queue, but at this time, controls the new job to be registered behind the jobs which have already entered. Thus, the control unit 108 controls the job to stand by for completing the printing operation of each of the previously registered jobs. Moreover, as soon as the printing operation of each of the previously registered jobs is completed, the control unit 108 controls the memory 109 to execute readout operation of the printing data of this job, and also controls the printer unit 104 to start printing operation in accordance with the printing conditions set by the user for this job.

The above-described processing in S601 and thereafter correspond to the processing in S602 and the processing in S603.

As described above, the control unit 108 enables the printing execution request from the user via the user interface (UI) unit provided by the present embodiment such as the UI unit of the operating unit 102 or an external device to be accepted. Also even if the control unit 108 accepts multiple printing execution requests, the control unit 108 controls the memory 109 including an HD capable of storing the printing data of multiple jobs to store and hold the printing data of these jobs as necessary.

Moreover, the control unit 108 reads out and references the job information of the printing queue serving as an object to be managed and held in a management table format in the memory 109. The control unit 108 controls the system 100 based on this job information so as to sequentially subject these multiple jobs of which printing execution requests have been performed to printing processing in the same sequence as the reception sequence of the printing execution requests of the respective jobs.

Thus, the control unit 108 employs the job information of the printing queue for scheduling of the printing sequence of the respective jobs to be printed. Moreover, the control unit 108 employs the job information (reception No. and reception point-in-time of job, name of job, and information for determining the processing status of each job) of the respective jobs of which printing execution requests have been performed for display control described below as an example.

As described above, the jobs which have been accepted from the user via the UI unit disclosed in the present embodiment (including the UI unit of the operating unit 102 or an external device) are controlled by the control unit 108 so as to be held in the memory 109 associating the printing data with the job information for each job. This job information includes the series of printing processing condition data, job name, and document name set by the user necessary for printing operation of a job to be processed. Moreover, this job information includes the information of the acceptance number and acceptance point-in-time which the control unit 108 automatically provides for each job when receiving a job at the printing apparatus 101. Thus, the control unit 108 controls the memory 109 so as to perform association of the data.

The control unit 108 controls the memory 109 to store the data of such a job to be processed. Moreover, during execution of this storing operation, in parallel with this, the control unit 108 controls the system 100 to execute the printing operation of another preceding job which has been registered on the printing queue based on scheduling of the printing queue as described above.

As described above, if the system 100 has accepted multiple jobs, and while executing the printing operation of any one of the jobs, for example, a user has depressed the "system status/cancel" key 505 on the display screen illustrated in FIG. 6, then, in response to the user operation of the key 505, the control unit 108 controls the display portion 301 to execute the display illustrated in FIG. 11.

The control unit 108 controls the display portion 401 to display the screen illustrated in FIG. 11, which is a display screen which displays a list of the processing situations of jobs for which printing execution requests have been performed. In the event that there are multiple jobs for which printing requests have been made, this screen in FIG. 11 is a screen configured so as to display information for allowing the user to identify the printing processing sequence of these jobs, and also allowing the user to identify the current processing situations of the respective jobs.

For example, the display illustrated in FIG. 11 is a control example for a case where the control unit 108 controls the display portion 301 to execute a display for informing the user of the current job situations. The control unit 108 controls the job status display space 710 on the screen of FIG. 11 to display the following information.

1. Presently, the number of jobs for which printing execution requests have been made, which have been registered on the printing queue, is four in total.

2. These four jobs are subjected to scheduling so as to execute printing in the sequence of the job of reception No. 0001, job of reception No. 0002, job of reception No. 0003, and job of reception No. 0004.

3. The job of reception No. 0001 is the job for which the printing execution request was accepted from the user at 16:30, and the type of job is a "copy" job. Moreover, the printer unit 104 is now "printing" this job.

4. The job of reception No. 0002 which is the second printing execution object is the job for which the printing execution request was accepted from the user at 16:35, and the type of job is a "copy" job. Moreover, this job is now in a "standing by to print" state.

5. The job of reception No. 0003 which is the third printing execution object is the job for which the printing execution request was accepted from the user at 16:50, and the type of job is a "print" job. Moreover, this job is now in a "standing by to print" state.

6. The job of reception No. 0004, which is the fourth printing execution object, is the job for which the printing execution request was accepted from the user at 16:51, and the type of job is a "print" job. Moreover, this job is now in a "standing by to print" state.

As the display is arranged so as to inform the user of various types of information as described above, as illustrated in FIG. 11, in response to the user depression of the key 505, the control unit 108 controls the display portion 301 to display the information of the respective jobs in a list format.

The control unit 108 controls the display portion 301 to execute the display illustrated in FIG. 11, which also comprises various types of display keys 701 through 709 configured so as to respond to operation and depression by the user.

Figure 20:
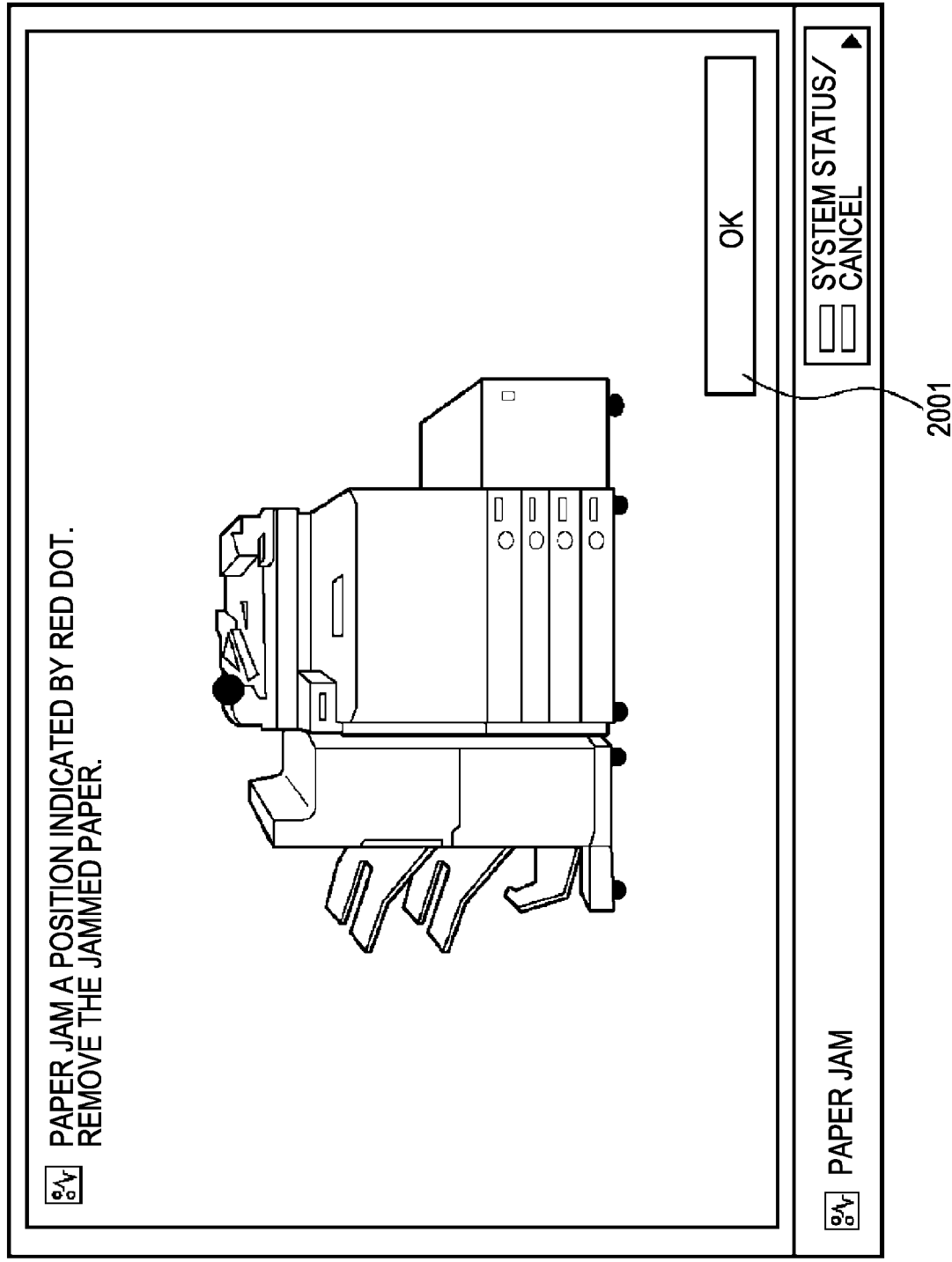
FIG. 20 is a diagram for describing a control example of the embodiment.
Figure 21:
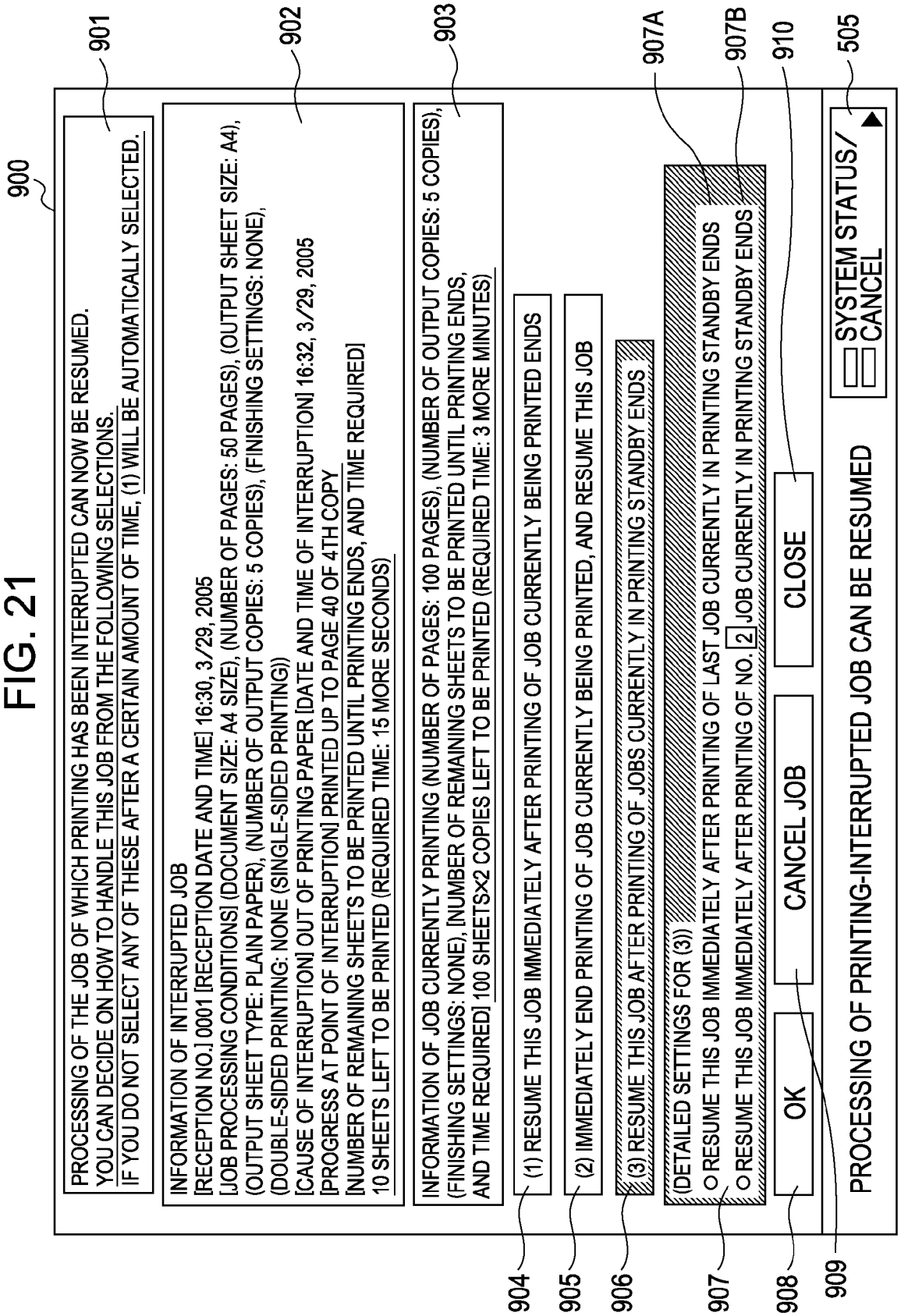
FIG. 21 is a diagram for describing a control example of the embodiment.
Figure 23:
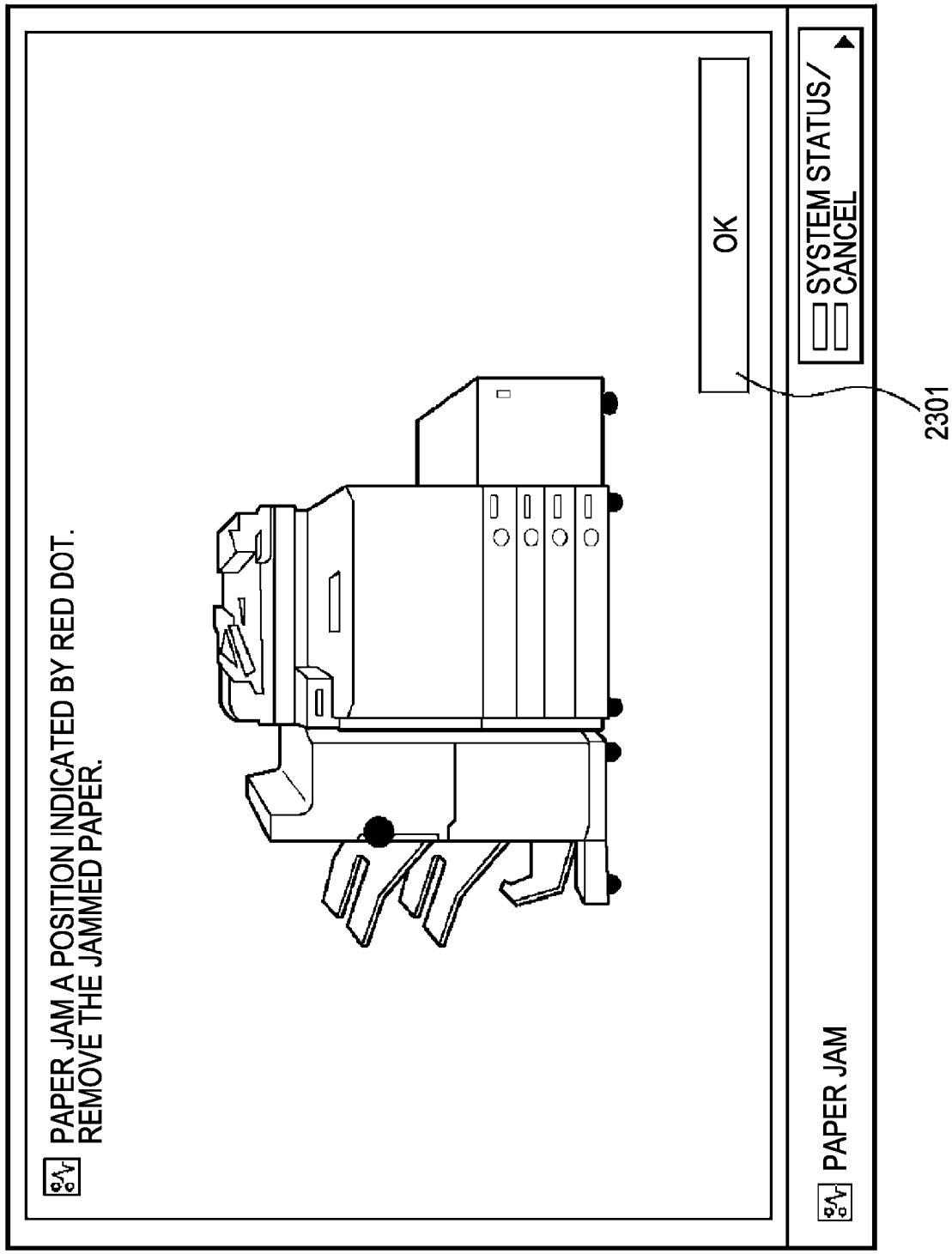
FIG. 23 is a diagram for describing a control example of the embodiment.
Figure 24:
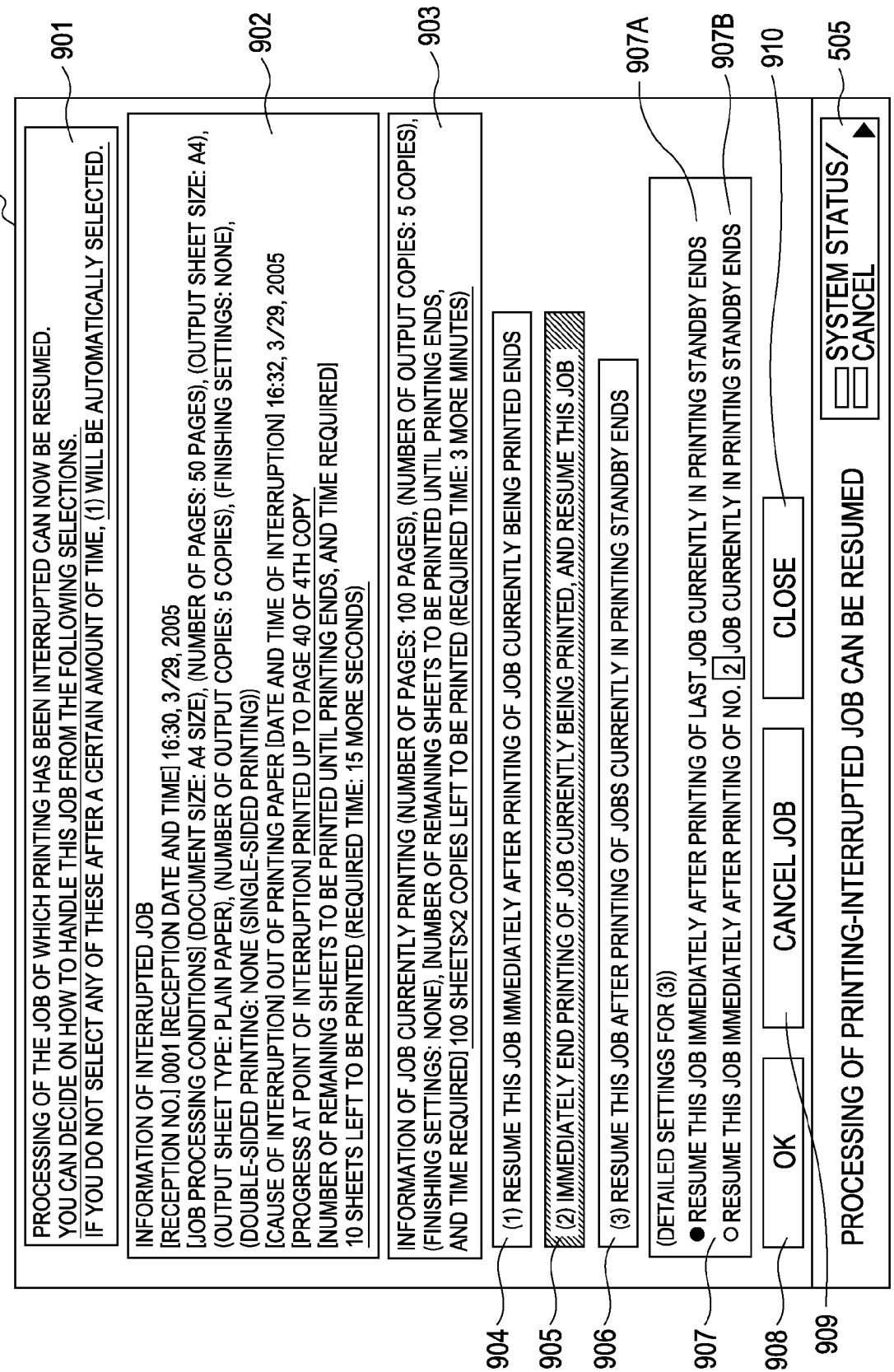
FIG. 24 is a diagram for describing a control example of the embodiment.

With the present embodiment, an arrangement is also made wherein the display in FIG. 20, display in FIG. 21, display in FIG. 23, and display in FIG. 24 are executable by the control unit according to the present embodiment, which is one of the characteristic points of the present embodiment.

Note that with the present embodiment, as one example, a display control program relating to the display control disclosed in the present embodiment is held in the memory 109 beforehand along with an operation control program for executing various types of operation relating to the processing of the respective flowcharts disclosed in the present embodiment by the system 100. Moreover, the control unit 108 reads and executes the display control program disclosed in the present embodiment from the memory 109.

As described above, with the present embodiment, upon accepting the printing execution request for a job to be processed via the UI unit from the operator according to the present embodiment, the control unit 108 controls the system 100 so as to start the printing operation of the job.

Also, when performing the printing operation of the job to be processed, the control unit 108 controls the memory 109 to store all pages of the printing data of the job to be processed. If this job is a copy job, the control unit 108 receives the printing data of the relevant job (original image data) via the reader unit 103, and controls the memory 109 to store this. Also, if this job is a job from an external device, the control unit 108 receives the printing data of this job via the computer interface unit 106, and controls the memory 109 to store this. Moreover, the control unit 108 controls the printer unit 104 to execute the printing processing of the printing data of the job via the relevant memory 109.

Also, the control unit 108 controls the memory 109 to store the printing data of the first page of the series of printing data made up of multiple pages of a job to be processed, simultaneously therewith, controls the printer unit 104 to start printing of the printing data of this first page on condition that other jobs are not registered on the printing queue. Subsequently, the control unit 108 sequentially controls the memory 109 to execute the storing operation of the printing data of the relevant job until the final page of the printing data of the relevant job is stored in the memory 109. Moreover, in parallel with the storing operation to the memory 109, the control unit 108 controls the printer unit 104 to execute the printing data of the relevant job.

Thus, the control unit 108 controls simultaneously in parallel the storing operation of the printing data of the job in the memory 109, and the printing operation for reading out the printing data of the job from the memory 109, and printing this in the page-number sequence. Thus, improvement of productivity in the system 100 is realized as much as possible.

With the above arrangements as a premise, for example, the control unit 108 sequentially feeds the sheets instructed by an operator via the UI unit as sheets necessary for printing operation of a job to be processed from the sheet supplier of the printing apparatus 101. Moreover, the control unit 108 controls the printer unit 104 to sequentially execute printing of the printing data of the job as to the relevant fed sheets. Thus, the control unit 108 controls the printer unit 104 to sequentially feed the sheets specified by the operator one sheet at a time to sequentially execute printing. The control unit 108 controls the system 100 to execute such series of printing operations for a job to be processed.

Now, description will return to the description of FIG. 7A. In step S603, the control unit 108 confirms whether or not a printing execution request has been input by the user via the UI unit according to the present embodiment, and also the printing data has been stored in the memory 109, and the jobs to be printed have been registered in the printing queue. For example, let us say that multiple jobs have been registered on the printing queue. In this case, of these jobs, the control unit 108 controls the system 100 to execute the printing operation of the first job registered at the earliest reception point-in-time.

For example, with reference to the control example illustrated in FIG. 11, the job of which printing should be completed earliest at the present moment is the job of reception No. 0001. Accordingly, the control unit 108 reads out the printing data of this job from the memory 109, and controls the printer unit 104 to print this. Let us say that this job is the job to be processed in the above S601 wherein printing settings have been made using the display in FIG. 8, and also a printing execution request has been input by the key 603 being depressed. That is to say, this job is a "job for printing the printing data of A4-size originals on recording sheets equivalent to A4-size plain paper". Also, now, let us say that the sheets equivalent to A4-size plain paper are stored in a sheet tray 213 equivalent to one example of the feeder. Accordingly, the control unit 108 performs control so as to feed the sheet necessary for printing of the printing data of the relevant job from the sheet tray 213. Moreover, the control unit 108 controls the system 100 to execute printing as of the sheet fed from this feeder.

As described above, even while controlling the printer unit 104 to execute the printing operation of the job to be processed in S603, the control unit 108 confirms whether or not a cause of printing interruption of the relevant job occurs at the system 100. This corresponds to the processing in S604. At this time, the control unit 108 sequentially obtains information from various types of sensors disposed in the respective units (reader unit 103, printer unit 104, memory 109, and operating unit 102) of the system 100, and executes the determination in S604 based on this information.

Subsequently, let us say that the control system 108 has confirmed in S604 that no cause of interruption of the relevant printing operation of the job has occurred. In this case, the control unit 108 controls the processing to proceed to S605 from S604.

In step S605, the control unit 108 determines whether or not the printing of the job started in S603 has been completed at the system 100 based on the information from the sensors of the above respective units.

Let us say that the control unit 108 has confirmed in S605 that the printing of this job has not been completed at the system 100. In this case, the control unit 108 returns the processing from S605 to S603, and controls the printer unit 104 to subsequently continue the printing operation of the relevant job to complete printing of the relevant job.

On the other hand, let us say that the control unit 108 has confirmed in S605 that the printing of the job in S603 has been completed at the system 100. In this case, the control unit 108 determines that the printing operation of the relevant job has ended, and controls the processing to proceed to S606 from S605.

In S606, the control unit 108 deletes the job of which end of printing has been confirmed in S605 from the printing queue. Subsequently, in S607, the control unit 108 deletes the relevant printing job from memory 109.

Also, simultaneously with the processing in S606 and S607 being executed, the control unit 108 updates the information in the printing queue. Specifically, for example, in the event that multiple printing jobs are in a printing waiting state at the memory 109, the control unit 108 moves up the printing sequence of the respective jobs one by one. Moreover, the control unit 108 determines whether or not there is a job to be printed other than the job of which end of printing has been confirmed in S605 based on the reference result of the printing queue within the memory 109. This processing is equivalent to the processing in S608.

Moreover, in the event of confirming that there is a job to be printed, the control unit 108 returns the processing from S608 to S603, and controls the printer unit 104 to start the printing operation of the relevant job. Note that at this time, the control unit controls the printer unit 104 to start printing of the next job registered on the printing queue, immediately following the job of which end of printing has been confirmed in S605. Thus, the control unit 108 controls the system 100 so as to continue to process a job to be printed in accordance with the acceptance sequence of the printing execution requests of the respective jobs.

On the other hand, in the event of determining in S608 that there is no job to be printed other than the job of which end of printing has been confirmed in S605, the control unit 108 makes a NO determination in S608, determines that there is no job to be processed at the system 100, and ends the processing.

As described above, for the sake of completion of the printing operation of a job to be processed, the control unit 108 controls the system 100 to execute the printing of the relevant job to be processed for which printing has been started in S603. However, let us say that the control unit 108 has confirmed in S604 that during printing of the job of which printing processing has been started in S603, a cause of interruption of the printing operation has occurred at the system 100. In this case, the control unit 108 controls the processing to be executed at the system 100 so as to proceed to the processing in step S609 in FIG. 7B from step S604.

If a cause of interruption of the relevant printing operation has occurred at the system 100, the control unit 108 makes a YES determination at the determination step in S604 in FIG. 7A, corresponding to the following exemplified case.

Case A that the Control Unit 108 Regards as Occurrence of a Cause of Printing Interruption: Occurrence of an Out-of-paper Error for the Job Being Printed Let us say that while printing the job the control unit 108 has confirmed on the basis of a sensor that there is no more paper in the feeder. In the present embodiment, this is referred to as an "out-of-paper" error or "no paper error".

Let us say that the control unit 108 has accepted, as cause of printing interruption of the above job of which printing operation has been started, information indicating a lack of paper for this job via the internal signal line from the feeder of the printing apparatus 101.

The control unit 108 handles the "out-of-paper error" of the relevant job serving as an error-generating object at the system 100 during printing of the job, which becomes the determination conditions of a YES determination in step S604.

Figure 7B:
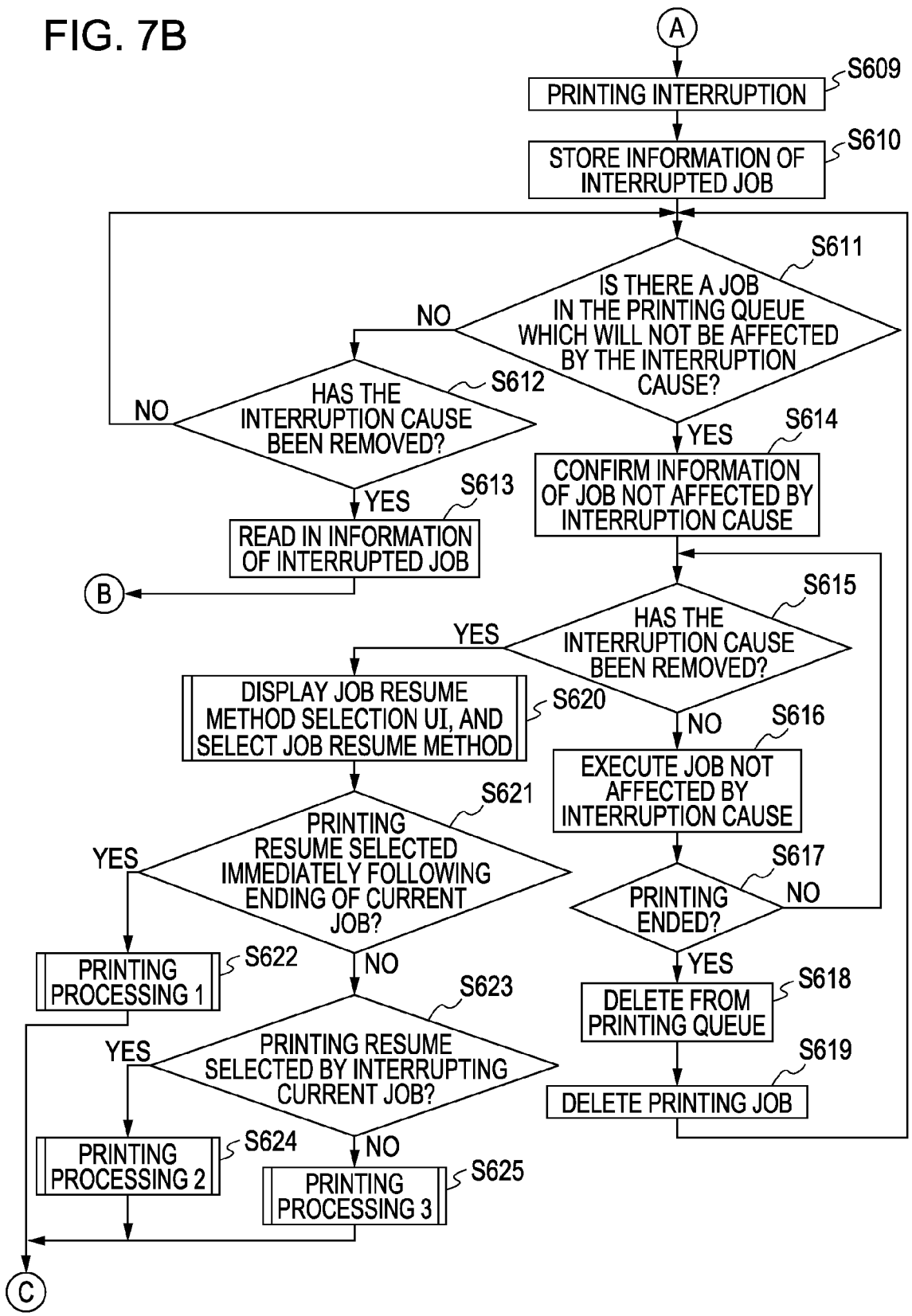
FIG. 7B is a flow diagram for describing a control example of the embodiment.

In this case, the control unit 108 determines that a cause of printing interruption has occurred in the, and controls the processing to proceed to S609 in FIG. 7B from S604 in FIG. 7A. Simultaneously therewith, the control unit 108 controls the display portion 301 to display information including notification for informing the user that there is no paper for the job to be processed in the system 100, and notification for prompting the user to supply the relevant sheets. With this case A, the control unit 108 controls the display portion 301 to execute the display illustrated in FIG. 14 which is configured so as to inform the user that there is no paper for the printing operation of the job to be processed.

As described above, on condition of confirming in S604 that during printing a cause of printing interruption of the job occurs, the control unit 108 interrupts the printing operation of the job in S609. Simultaneously therewith, the control unit 108 performs determination such as whether the type of cause of interruption is, for example, an "out-of-paper error" such as the case A, "original jams", "discharge destination error", or "printing interruption request from user" such as shown in later-described case B through case D.

Thus, upon confirming occurrence of a cause for printing interruption for the job being printed in S604, the control unit 108 determines what kind of cause of interruption for the job is. Note that the control unit 108 performs this determination based on various types of information such as the current status information of the system 100, including the printing processing condition data of the job to be processed, and the status information from the respective units included in the system 100 illustrated in FIG. 2.

Moreover, for example, as shown in case A, the control unit 108 determines that the type of cause of printing interruption for the job is an "out-of-paper" error.

Figure 14:
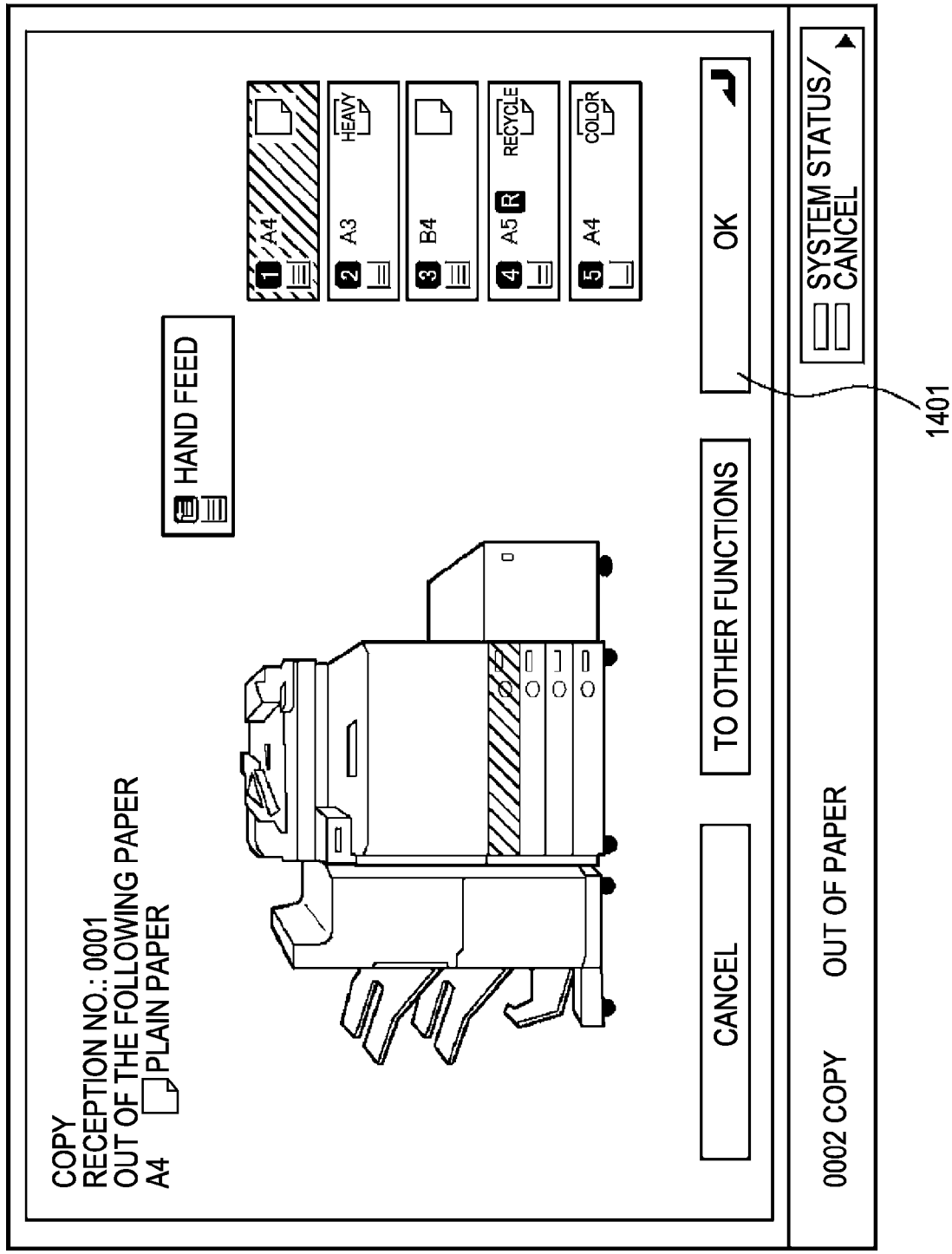
FIG. 14 is a diagram for describing a control example of the embodiment.

The control unit 108 controls the operating unit 102 to execute display for informing the user of information based on the determined type of cause of printing interruption based on the determination result (determination result). With this case A, the control unit 108 controls the operating unit 102 to display a display screen such as illustrated in FIG. 14 configured so as to show that the printing of the job is interrupted, and that "sheet supply by operator" is requested as an intervention operation by the operator for canceling the cause of interruption.

Thus, the control unit 108 controls the UI unit to execute the display configured so as to show notification for canceling the cause of printing interruption of the job of which printing has been interrupted in S609 by the user, and the cancel method thereof as processing to be performed in S609.

Thus, with the present embodiment, the control unit 108 controls the system 100 to execute the display such as shown above along with interruption of the printing operation of a job to be processed in S609.

The system 100 according to the present embodiment includes an arrangement wherein control is performed so as to execute the display based on the type of cause of printing interruption as described above in S609. After which the system is able to print a job that is not influenced by the detected cause of interruption.

Case B: Occurrence of an Original Jam Error of the Job Being Printed at the Reader Unit 103

As described above, the system 100 according to the present embodiment is configured so as to handle a copy job as a job to be processed. That is to say, the present embodiment is configured so as to handle "a job requiring an original reading operation by the reader unit 103 following a printing execution request by the user and before starting printing by the printer unit 104" as a job to be processed. The job such as shown above is, in other words, equivalent to "a job of which printing can be started by the printer unit 104 following a printing execution request being made by the user, and execution of original reading operation by the reader unit 103".

Incidentally, "an external job of which printing execution request has been made at an external device", and "a job to be processed in the box function included in the system 100'", are jobs not equivalent to "a job requiring original reading operation by the reader unit 103 prior to start of printing by the printer unit 104". In other words, these jobs are at least jobs equivalent to "a job of which printing can be started by the printer unit 104 following a printing execution request has been made by the user without executing original reading operation by the reader unit 103".

Thus, with the present embodiment, the control unit 108 controls the system 100 so as to accept multiple types of job.

An arrangement can be made wherein the control unit 108 can confirm information whether or not an error relating to original reading operation of a job necessary for original reading operation at the reader unit 103 has occurred based on the information from the sensors included in the ADF of the reader unit 103.

Let us say that a job to be accepted in S601 is "a job requiring original reading operation by the reader unit 103 prior to start of printing by the printer unit 104". This is referred to as Condition 1. Moreover, let us say that there is no other job registered on the printing queue other than the relevant job to be accepted in S601. This is referred to as Condition 2.

In the event of satisfying these two conditions, each time the printing data of one page worth of the relevant job is stored in the memory 109, the control unit 108 controls the printer unit 104 to execute printing of the printing data of the job.

Thus, if the above two conditions are satisfied, the control unit 108 controls the printer unit 104 to execute the printing operation of a given job in parallel with storing the printing data of the same job in memory unit 109.

That is to say, the above situation is a situation wherein during execution of reading operation of the series of originals made up of multiple pages of a job to be processed by the reader unit 103 the printing operation of the relevant job is executed by the printer unit 104.

In this case, even while controlling the printer unit 104 to execute the printing operation of the relevant job, the control unit 108 confirms whether or not an error relating to the original reading operation of the relevant job occurs at the reader unit 103. For example, as one example of this error, an original jam serving as an error-generating object during conveying operation of originals by the ADF included in the reader unit 103 is equivalent to this.

The control unit 108 handles the "original jam" of the relevant job serving as an error-generating object at the system 100 during printing of the job of which printing has been started in S603 as cause of printing interruption which becomes the determination conditions of YES determination in S604.

Thus, let us say that the control unit 108 has detected that an error relating to the reading operation of originals necessary for the printing operation of the relevant job to be processed has occurred at the reader unit 103 during printing. In this case, the control unit 108 determines that a cause of printing interruption has occurred, and controls the processing to proceed to S609 in FIG. 7B from S604 in FIG. 7A. Simultaneously therewith, the control unit 108 controls the display portion 301 to display information including notification for informing the user that an error has occurred, and notification for prompting the user to cancel the relevant error of the reader unit 103. With the present embodiment, as one example of this, the control unit 108 controls the display portion 301 to execute the display illustrated in FIG. 20 indicating that an original jam has occurred during original reading operation necessary for a job to be processed.

With this case B, a job to be processed is "a job requiring an original reading operation following accepting a printing execution request from the user via the UI unit". Moreover, this is an example wherein confirmation is made by the control unit 108 that during execution of original reading operation in parallel with the printing operation of this job the original jam of the job corresponding to an error relating to the original reading operation has occurred at the reader unit 103. Accordingly, with the case B, the control unit 108 controls the display portion 301 to execute the display illustrated in FIG. 20 configured so as to inform the user of occurrence of the relevant original jam.

With this case B also, on condition of confirming in S604 that during printing of a job a cause of printing interruption of the job has occurred, the control unit 108 interrupts the printing operation of the job in S609. Moreover, upon confirming occurrence of this, the control unit 108 determines what kind of cause of interruption the type of cause of printing interruption for the job is. Thus, with this case B, as described above, the control unit 108 determines that the type of the cause of printing interruption is an error of the reader unit 103.

The system 100 according to the present embodiment includes an arrangement wherein control is performed so as to execute the display based on the type of cause of printing interruption as described above in S609, following which the printing of a job unaffected by the relevant cause of interruption can be started.

Case C: Occurrence of a Discharge Destination Error of the Job Being Printed

With the system 100 according to the present embodiment, as illustrated in FIG. 3, the printed articles of a job to be processed can be output to multiple discharge destinations including the tray 228 and tray 229 which can load the printed articles subjected to printing by the printer unit 104. Whether or not a paper jam has occurred at this discharge destination can be confirmed by the control unit 108 based on the information from the sensors included in the post-processing apparatus (e.g., finisher 220 in FIG. 3).

Let us say that confirmation is made by the control unit 108 that during printing of a job the sheet jam occurs at the discharge destination of the post-processing apparatus included in the system 100. Also, let us say that during printing of the job the discharge destination necessary for the output destination of the printed articles of the job becomes full of the printed articles (tray full), so that the output of the printed articles as to the relevant discharge destination cannot be continued, and control unit 108 confirms this occurrence.

The control unit 108 handles such "an error at the discharge destination" serving as an error-generating object at the system 100 during execution of printing of a job of which printing has been started in S603 as cause of printing interruption which becomes the determination conditions of YES determination in S604.

In this case, the control unit 108 determines that cause of printing interruption has occurred in the job of which printing has been started in S603, and controls the processing to proceed to S609 in FIG. 7B from S604 in FIG. 7A. Simultaneously therewith, the control unit 108 controls the display portion 301 to display information including notification for informing the user that the sheet jam of printing on which the printing data of the job to be processed is printed has occurred at the discharge destination of the system 100, and notification for prompting the user to cancel the relevant sheet jam. With the present embodiment, as one example of this, the control unit 108 controls the display portion 301 to execute the display illustrated in FIG. 23 indicating occurrence of sheet jam at the discharge destination of the job to be processed.

For example, with this case C, upon confirming in S604 that during printing of a job an error has occurred at the output destination of the printed articles of the job, the control unit 108 interrupts the printing operation of the job being printed in S609. Simultaneously therewith, the control unit 108 controls the display portion 301 to execute the display illustrated in FIG. 23 configured so as to inform the user of occurrence of "sheet jam at the discharge destination".

With this case C also, on condition of confirming in S604 that during execution of the printing operation of a job of which printing has been started in S603 at the system 100, a cause of printing interruption of the job has occurred, the control unit 108 interrupts the printing operation of the job in S609. Moreover, upon confirming occurrence of this cause of printing interruption in S604, the control unit 108 determines what kind of cause of interruption the type of cause of printing interruption for the job is. With this case C, as described above, the control unit 108 determines that the type of the cause of printing interruption is "an error at the output destination determined based on the printing processing conditions from the user as the output destination of printed articles".

Moreover, the control unit 108 controls the operating unit 102 to execute display for informing the user of the determined type of cause of printing interruption based on the determination result. With this case C, the control unit 108 controls the operating unit 102 to display a display screen such as illustrated in FIG. 23 configured so as to show that the printing of the job is interrupted, and that "removal of sheet jam at the discharge destination by operator" is requested. Thus, with case C also, the control unit 108 controls the UI unit to execute the display configured so as to show notification for canceling the cause of printing interruption of the job of which printing has been interrupted in S609 by the user, and the cancel method thereof as processing to be performed in S609.

The system 100 according to the present embodiment includes an arrangement wherein control is performed so as to execute the display based on the type of cause of printing interruption as described above in S609, following which the printing of a job unaffected by the relevant cause of interruption can be started.

Case D: a Case in Which a Temporary Print Stop Request is Input by a User Via the UI Unit With the present embodiment, an arrangement is made wherein a list of processing situations as illustrated in FIG. 11 is displayed on a touch sensitive screen, which enables a user to select one of the situations (e.g. job 0001) by touching the screen.

Let us say that the job being printed now has been selected by the user using a method such as described above. In this state, let us say that an operation key (e.g., an unshown hardware key included in the operating unit 102, or an unshown display key (software key) serving as a display object by the display portion 301) configured so as to explicitly input an instruction to temporally stop the job being printed has been depressed by the user. Then, the control unit 108 determines that the temporary stop request has been made by the user based on the key operation, and interrupts the printing operation of the relevant job.

As described above, the control unit 108 handles the "printing temporary stop request by the user" as to the relevant job serving as an error-generating object at the system 100 during printing of the job of which printing has been started in S603 as cause of printing interruption which becomes the determination conditions of YES determination in S604.

If the control unit 108 has detected that the printing interruption request of the relevant job to be processed has been made by the user via the UI unit according to the present embodiment during execution of printing, the control unit 108 determines that cause of printing interruption has occurred, and controls the processing to proceed to S609 in FIG. 7B from S604 in FIG. 7A.

With this case D also, if it is confirmed in step S604 that during printing of a job a cause of printing interruption of the job has occurred, the control unit 108 interrupts the printing operation of the job in S609. The control unit 108 also determines what kind of cause of interruption the type of cause of printing interruption for the job is. With this case D, as described above, the control unit 108 determines that the type of the cause of printing interruption is "a temporary printing stop request from the user".

Moreover, the control unit 108 controls the operating unit 102 to display a screen for informing the user of the determined type of cause of printing interruption based on the determination result as before.

Thus, with case D also, the control unit 108 controls the UI unit to execute the display configured so as to show notification for canceling the cause of printing interruption of the job of which printing has been interrupted in S609 by the user, and the cancel method thereof as processing to be performed in S609.

The system 100 according to the present embodiment includes an arrangement wherein control is performed so as to execute the display based on the type of cause of printing interruption as described above in S609, following which the printing of a job unaffected by the said cause is enabled.

Cases A through D have been described as cause of printing interruption with the present embodiment, but the present embodiment is not restricted to these. Thus, the present embodiment is arranged so as not to be restricted to the specific contents and type of cause of printing interruption.

With the above arrangement as a premise, let us say that the control unit 108 has confirmed that during printing of a job, the cause of printing interruption of the job has occurred at the system 100. Then, the control unit 108 controls the processing to proceed to S609 in FIG. 7B from S604.

In step S609 in FIG. 7B, the control unit 108 controls the system 100 to interrupt the printing operation of the job being printed.

At this time, in the event that printing as to the sheets which have already been fed from the feeder can be performed at the point of occurrence of this cause of interruption, the control unit 108 controls the printer unit 103 to continue printing as to the relevant printing sheets, and discharge all of the sheets to the discharge destination of the system 100. At the point of completion of the discharge operation of the sheets subjected to printing at the job of which printing has been interrupted from the inside to the outside of the machine, the control unit 108 interrupts the printing operation of the relevant job.

Thus, with the present embodiment, even in the event that the cause of printing interruption of the job being printed occurs, the control unit 108 controls the system 100 so as not to retain sheets subjected to normal printing in the inside of the apparatus of the system 100 wherever possible. Moreover, the control unit 108 controls the system 100 to discharge the sheets subjected to normal printing to the discharge destination of the system 100, where printed articles can be extracted by the user. Moreover, then, the control unit 108 interrupts (stops) the printing operation of the relevant job.

The above arrangement is one example of an arrangement for realizing productivity improvement effects with the present embodiment, which enables the printing of job wherever possible even in the event of printing interruption occurring, and also enables a job to be processed wherever possible without wasting unnecessary sheets.

Now, let us say that the type of cause of printing interruption in step S604 is "sheet jam on the sheet transportation path within the printer unit 104". In this case, the control unit 108 immediately interrupts (stops) the printing operation by the printer unit 104 at the point of occurrence of the interruption. In this case, the control unit 108 stops the operation of the printer unit 104 in a state in which the sheet is retained within the apparatus of the system 100. In other words, in the event of cause of printing interruption corresponding to this type occurring in S604, the control unit 108 inhibits the feeding operation of a new sheet from the feeder, and the conveying operation of a sheet within the apparatus immediately following occurrence.

The above arrangement is one example of an arrangement for realizing effects wherein when sheet jam occurs at the inside of the printer unit 104, a problem such as triggering occurrence or multiple sheet jam at the inside of the printer unit 104 can be prevented with the present embodiment wherever possible.

With the interruption processing in step S609, the control unit 108 enables the printing data of the interrupted job to be used at the time the printing is resumed in response to cancellation of the cause of interruption by the intervention of the user. The control unit 108 then allows the system 100 to resume processing.

Specifically, the control unit 108 controls the memory 109 to retain all pages of the printing data of an interrupted job in S609 so as to use this data at the time of resuming the printing of the job.

Now, let us say that the interrupted job in step S609 is "a job requiring printing of multiple copies". In this case, the control unit 108 controls the system 100 so as to print the printing data of the same page repeatedly for the required number of copies. Also, the control unit 108 controls the printing apparatus 100 so as to accept a job requiring printing of only one copy, and also requiring subjecting the printed articles of one stack worth thereof to finishing.

Accordingly, the control unit 108 controls the memory 109 to retain the printing data of all pages of the job of which printing has been interrupted including the printing data corresponding to the pages which have already been printed in S603 immediately before the cause of printing interruption has occurred so as to use this data at the time of resuming printing. Moreover, the control unit 108 controls the memory 109 to retain the series of printing processing condition data of the interrupted job as information that enables the control unit 108 to determine what kind of printing processing conditions the printing operation of the job of which printing has been interrupted requires. Moreover, the control unit 108 controls the memory 109 to also retain the data indicating the progress situation of the job as information that enables the control unit 108 to determine how far the processing of the job progressed until immediately before interruption of the printing operation in S607. The control unit 108 obtains this data indicating progress situations using the same obtaining method as the method for obtaining information necessary for displaying the job processing situation screen illustrated in FIG. 9 by the display portion 301.

The control unit 108 controls the memory 109 to retain these various types of information as job information necessary for resuming printing of the interrupted job in S609 along with the printing data necessary for resuming printing of the job, associating the job information with the printing data.

Thus, with the present embodiment, the control unit 108 executes in S610 in FIG. 7B the processing for controlling the memory 109 to store the job information of the job for which printing has been interrupted in S609, as described above.

Note that with the following respective steps of the respective drawings: S610 and S613 in FIG. 7B according to the present embodiment, later-described S707 in FIG. 15, S903 in FIG. 17, S806 in FIG. 22, and S1009 in FIG. 25, "interrupted job" is described. This "interrupted job" described in the present embodiment means "the job of which printing has been interrupted in the processing in S609 in FIG. 7B". In other words, this "interrupted job" described in the present embodiment means "a job of which printing operation has been interrupted by the control unit according to the present embodiment via the system 100 on condition of occurrence of cause of printing interruption" with the present embodiment.

Figure 17:
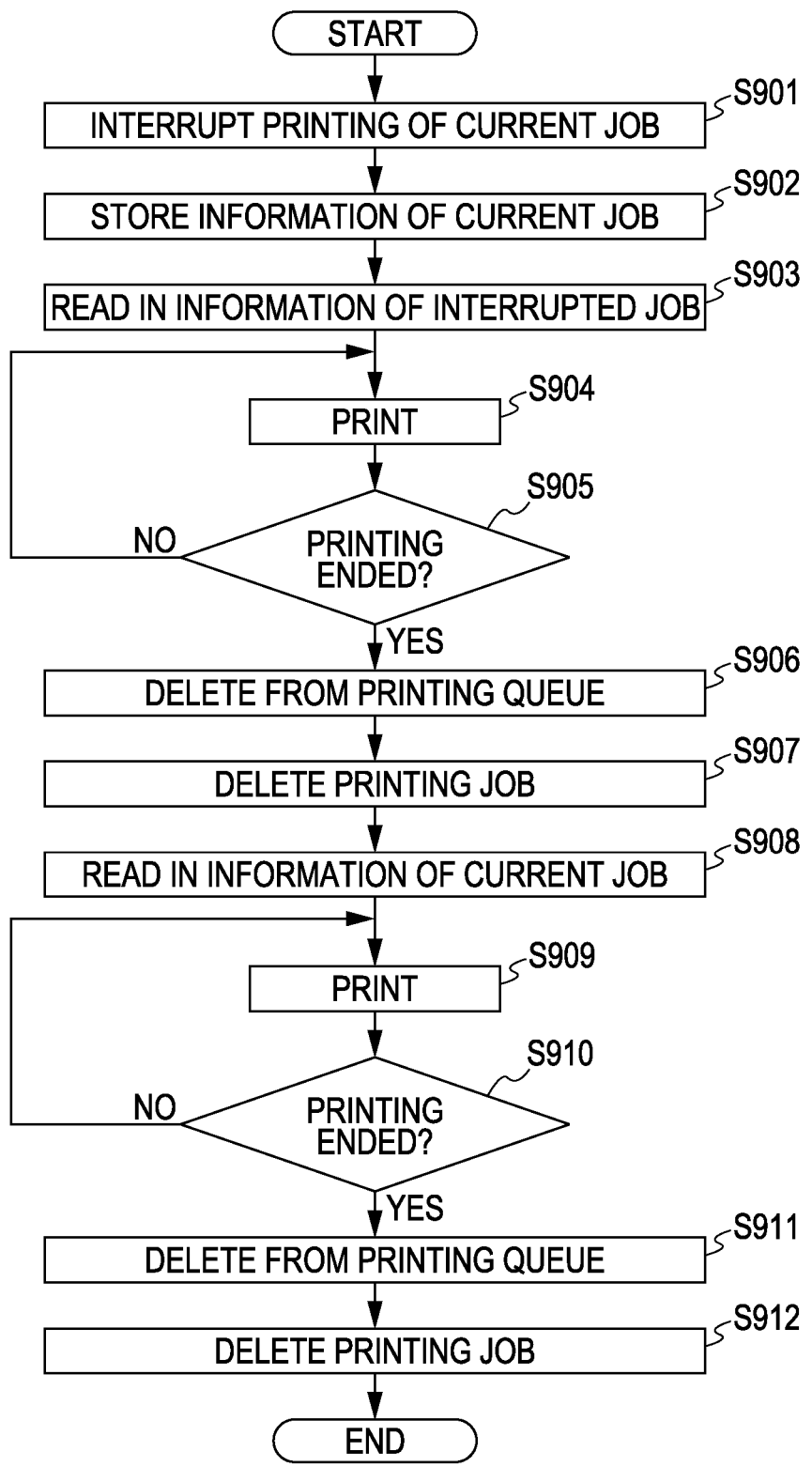
FIG. 17 is a flow diagram for describing a control example of the embodiment.
Figure 22:
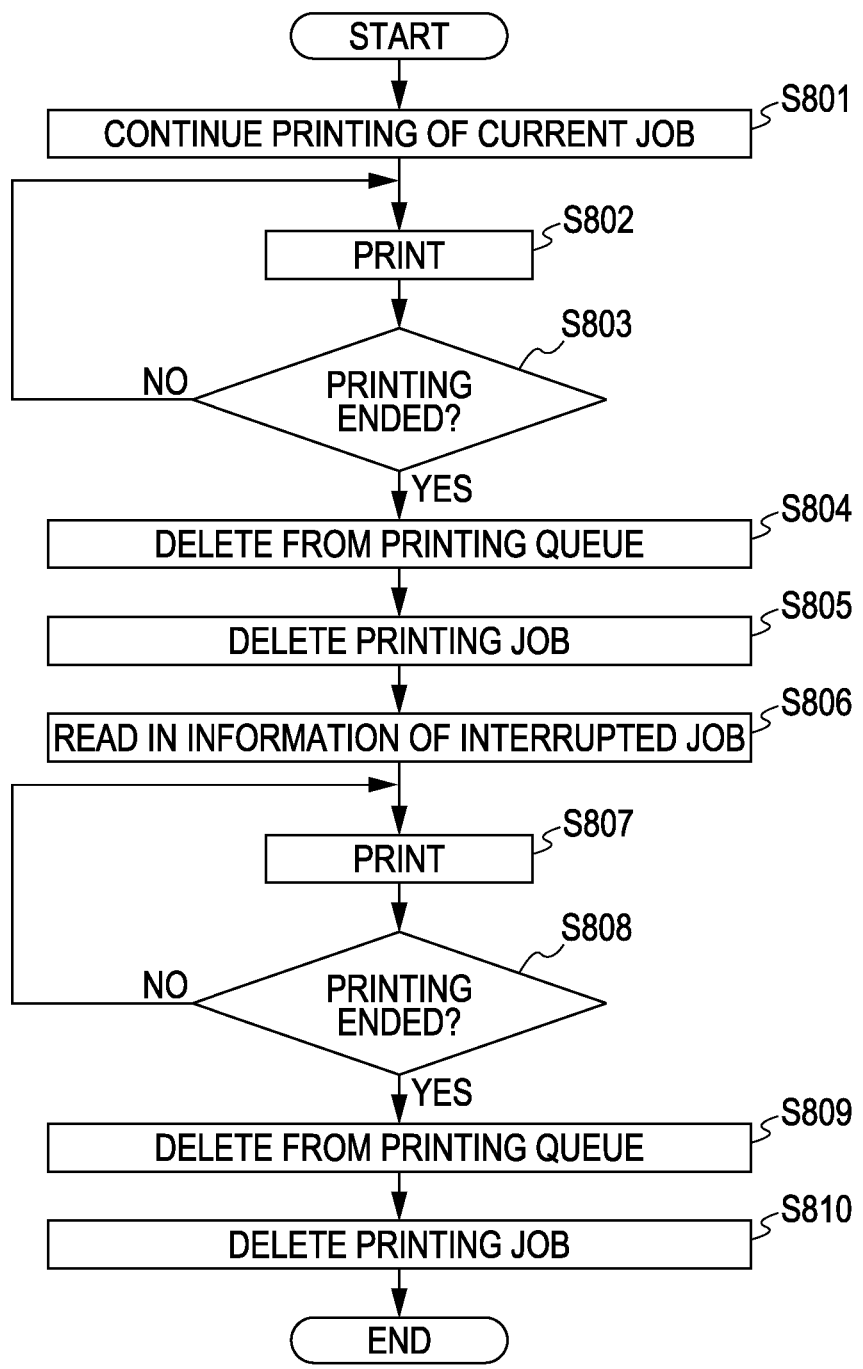
FIG. 22 is a flow diagram for describing a control example of the embodiment.
Figure 25:
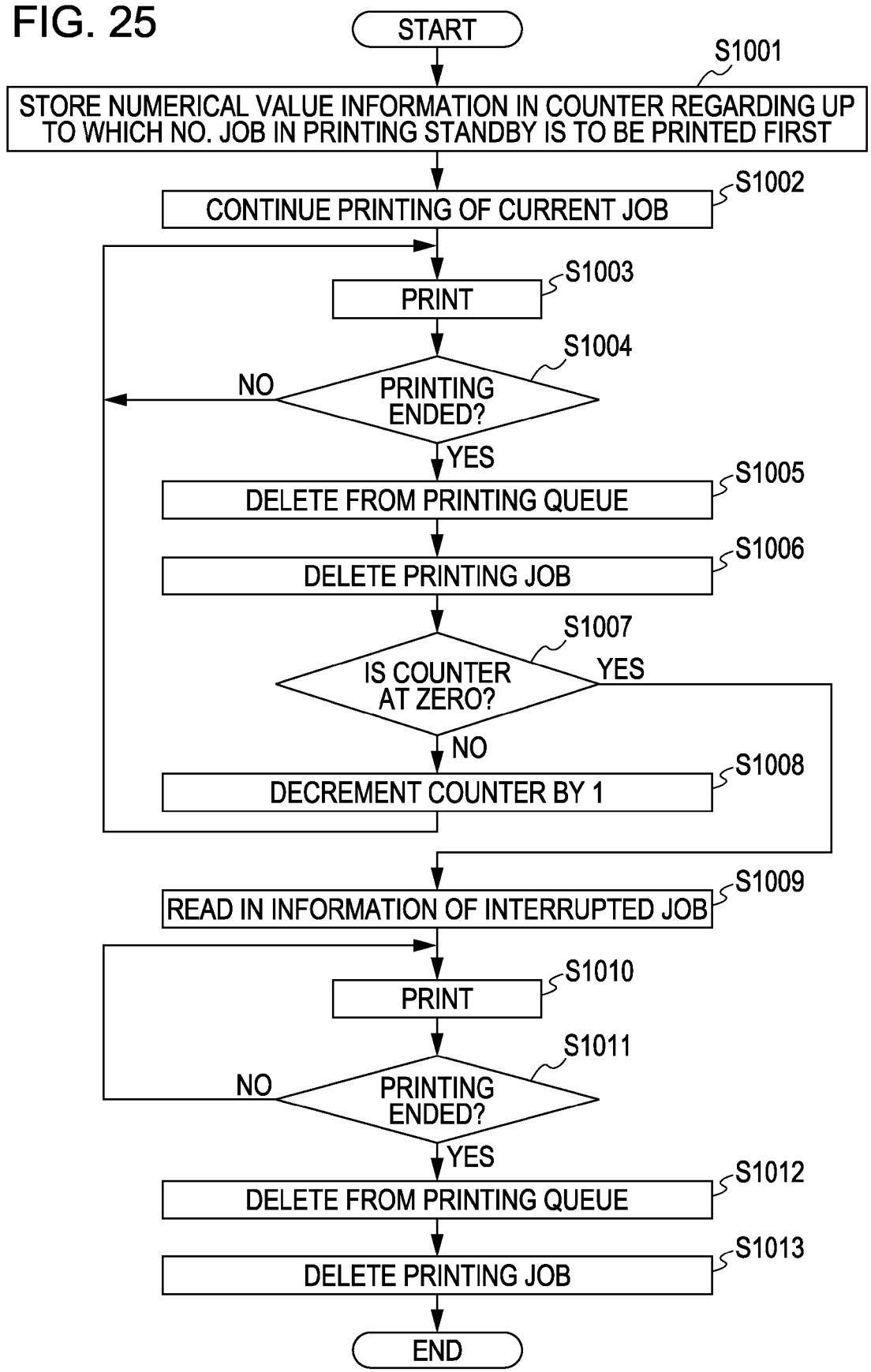
FIG. 25 is a flow diagram for describing a control example of the embodiment.

Incidentally, with the respective steps of the respective drawings of S621 and S623 in FIG. 7B, later-described S701, S702, and A711 in FIG. 15, S901, S902, and S908 in FIG. 17, S801 in FIG. 22, and S1002 in FIG. 25, "current job" is described. This "current job" means "a job of which printing has been started in S616 in FIG. 7B, which differs from the job of which printing has been interrupted in S609 in FIG. 7B, and corresponds to another job to be printed". In other words, this "current job" described in the present embodiment means "a job of which printing operation becomes executable during the interrupted state period of the job of which printing operation has been interrupted on condition of occurrence of cause of printing interruption". That is to say, the "current job" described in the present embodiment means "a job of which printing operation is allowed to be started by the control unit according to the present embodiment at the system 100 on condition of execution of printing interruption operation in S609 of the job of which printing has been interrupted". Further in other words, this "current job" means "a job of which printing operation is started by the control unit according to the present embodiment during the printing interruption (temporary stop) period instead of preventing printing of the job of which printing has been interrupted in S609 at the system".

With the above explanation as a premise, the arrangement of the system 100 according to the present embodiment will be described in detail below.

The control unit 108 controls the memory 109 to retain the information of the job of which printing has been interrupted in S610 in FIG. 7B (also referred to as job information), following which the control unit controls the processing to proceed to S611 from S610.

Note that this "information of job" includes "the printing data (original image data) to be printed upon sheets necessary for resuming printing of the job", "the printing processing condition data of the job", and "the progress data for determining how far the processing of the job has advanced at the time of printing interruption". Moreover, the control unit 108 controls the memory 109 to retain information serving as display objects in the display list in FIG. 11 such as "acceptance number", "document number", "type of job" and so forth of the job as well in S610 as job information necessary for control disclosed in the present embodiment performed by the control unit 108.

In S611 in FIG. 7B, the control unit 108 confirms whether or not there is "a job to be printed which is not affected by the cause of printing interruption of the interrupted job" in the memory 109 by reading out and referencing the information of the above printing queue managed by the memory 109.

Moreover, in the event of determining in S611 that there is a job to be printed which is unaffected by the cause of printing interruption of the interrupted job, the control unit 108 controls the processing to proceed to S614 from S611.

On the other hand, in the event of determining in S611 that there is no job which is unaffected by the cause of printing interruption of the interrupted job, the control unit 108 controls the processing to proceed to S612 from S611.

The control unit 108 controls the system 100 so as to start the printing of a job which is unaffected by the cause of printing interruption during the printing interruption period (printing temporary stop) of the interrupted job. Note that "job of which printing has been interrupted" corresponds to the "interrupted job" of which printing has been interrupted in S609, as described above. On the other hand, this "job receiving no influence by the cause of printing interruption" corresponds to the "current job" of which printing has been started in S616, as described above.

In other words, with the present embodiment, the control unit 108 controls the system 100 to suspend resumption of the printing of the interrupted job, and start the printing of another job.

As described above, the system 100 according to the present embodiment includes an arrangement wherein the printing of another job unaffected by the cause of printing interruption of the interrupted job is enabled to be started during the printing temporary stop period of the interrupted job.

The meaning of this arrangement is that even in a state in which the cause of printing interruption of the job of which printing has been interrupted is not cancelled at the system 100, the printing of "a job requiring another printing corresponding to a job of which printing can be completed normally" is enabled to be started.

Now, description will be made below regarding a specific example relating to what kind of job the control unit 108 determines is one unaffected by the cause of printing interruption of the interrupted job, and how this is controlled so as to start printing in S616. With the following cases, the control unit 108 controls the system 100 to start the printing of another subsequent job unaffected by the cause of printing interruption of interrupted the job during the printing interruption period (printing temporary stop period) of the interrupted job.

Now, hereafter, the control examples of Case 1 through Case 4 will be disclosed as four control examples corresponding to the cases of four types of cause of printing interruption of the above case A through case D.

Case 1: First Case Wherein the Control Unit 108, Which has Recognized in Step S611 that a Job Exists Within the Printing Queue Which is not Affected by the Printing Interruption, Starts Printing the Job.

This Case 1 is if the type of cause of printing is an "out-of-paper" error.

In this Case 1, the control unit 108 searches the printing queue for whether or not there is a job which uses paper of a different size or a different type for printing from the sheet used for the interrupted job. Moreover, the control unit 108 controls the printing system 100 such that printing can be started of a job which does not need sheets of the same size and type of the sheets necessary for the interrupted job but rather requests sheets of a different size or type, during the printing-interruption period.

In this case, the control unit 108 confirms the size and type of the sheet necessary for the printing operations of each job. This is performed by the control unit 108 reading out and referencing the printing processing conditions data from the memory 109, where the printing processing conditions data of the jobs have been held as job information at the time of entry of the job to the printing queue in step S602.

Further, the control unit 108 confirms whether or not there is another job in the printing queue which uses sheets of another size or type from that used by the interrupted job.

Let us say that for example, during printing of a job with reception No. 0001, the sheets necessary for the printing operations of this job have run out, and upon this determination being made in step S604, the control unit interrupts the printing operations of this job in step S604. As described above, this job with reception No. 0001 is a job which requires sheets of a sheet size A4 and a sheet type of plain paper for the printing operations thereof.

In this case, in step S611 the control unit 108 confirms whether or not there is a job queued and standing by for printing which requires sheets of a type other than A4 for printing. Or, in this case, in step S611 the control unit 108 confirms whether or not there is a job queued and standing by for printing which requires sheets of a type other than plain paper for printing.

In other words, in this case, the control unit 108 determines in step S611 that jobs which require sheets with a size of A4 size and a type of plain paper for the printing operations thereof, are to be excluded from selection. That is to say, in this case, in step S611 the control unit 108 searches for jobs which do not require sheets with a size of A4 size and a type of plain paper for the printing operations thereof, as jobs to be selected, from the printing queue. Such determining conditions that relate to sheets necessary for the printing operations of jobs to be processed will be called the first condition, and whether or not there are jobs to be printed which satisfy the first condition present in the memory 109 is what the control unit 108 confirms in step S611.

Upon having confirmed whether or not there is a job which satisfies the first condition, in step S611 the control unit 108 further confirms whether or not the sheets for such a job are set in the sheet supplying unit of the printing system 100. Such determining conditions that relate to whether or not the sheets are set in the sheet supplying unit of the printing system 100 will be called the second condition.

A specific example of this will be given, still employing the above-described example. Let us say that for example, during printing of a job with reception No. 0001 at the printer unit 104, a printing request for a job with reception No. 0002 has been received as the next job entered in the printing queue. As described above, the job with reception No. 0002 is a job which requires sheets of a size A3 and type of recycled paper for the printing operations thereof. That is to say, this job with reception No. 0002 is a job which does not fall under a job which requires sheets of a size of A4 size and a type of plain paper for the printing operations thereof.

In step S611, the control unit 108 determines that the job with reception No. 0002 is not affected by the cause of printing interruption of the job with reception No. 0001 that has been subjected to printing interruption in step S609 due to an out-of-paper error. Further, confirmation of whether or not sheets necessary for the printing operations of the job with reception No. 0002 are set in the sheet supplying unit of the printing system 100, is also performed in step S611.

With the present embodiment, the sizes of sheets and types of sheets at each of the multiple sheet supplying units which the printing system 100 has can be registered by the user beforehand, suing the operating unit 102. The control unit 108 obtains registration information regarding sheets in the sheet supplying units made by the user, from the operating unit 102. Also, the printing system 100 according to the present embodiment has sensors for detecting the size of sheets for each sheet supplying unit, and also for detecting presence or absence of sheets in each sheet supplying unit. The control unit 108 obtains information regarding presence of sheets, the size thereof, and so forth, in each sheet supplying unit, from each of the sensors, and acquires this as status information. Based on this information, the control unit 108 confirms what size and what type of sheet is set in each sheet supplying unit of the printing system 100, as sheet supplying unit status information of the printing system 100.

Along with the sheet supplying unit status information, the control unit 108 also confirms whether or not sheets necessary for performing the printing operations of the job with reception No. 0002 have been set in a sheet supplying unit of the printing system 100, as described above.

Let us say that the control unit 108 determines that sheets necessary for performing the printing operations of the job with reception No. 0002 are set in a sheet supplying unit of the printing system 100. This means that the above second condition has also been satisfied.

Having made the above determinations, the control unit 108 determines that the job with reception No. 0002 is a job which is not affected by the cause of printing interruption of the job with reception No. 0001, and based on this determination result, the flow proceeds from step S611 to step S614.

In this case, in step S611 the control unit 108 excludes jobs from selection which require for the printing operations thereof sheets of the same size and of the same sheet type as that required for the printing operations of the interrupted job. At the same time, in this case the control unit 108 in step S611 deems jobs which do not fall under this category, i.e., are not jobs which require for the printing operations thereof sheets of the same size and of the same sheet type as that required for the printing operations of the job regarding which printing has been interrupted in step S609, to be selectable. Further, in this case, in the event that determination is made in step S611 that there is a job in the printing queue which is such a selectable job, the control unit 108 makes a "YES" determination in step S611, and the flow proceeds from step S611 to step S614. On the other hand, in this case, in the event that determination is made in step S611 that there are no jobs in the printing queue which are such selectable jobs, the control unit 108 makes a "NO" determination in step S611, and the flow proceeds from step S611 to step S612.

The above-described case is an example of a case with the present embodiment wherein the control unit 108 determines in step S611 that there is a job in the printing queue which is not affected by the cause of printing interruption.

Now, in the earlier-described example, the job with reception No. 0002 which has job information displayed in the status list display screen was a job which does not require the same sheet size as the job with reception No. 0001. Accordingly, in step S611 the control unit 108 deems the job with reception No. 0002 as the next job after receiving the job with reception No. 0001. In such a case, in step S616 the control unit 108 permits the printing system 100 to start printing operations of the job with reception No. 0002 while the job with reception No. 0001 remains interrupted.

However, let us say that the job with reception No. 0002 is a job which requires the same sheet size and sheet type as the sheets required for the printing processing of the job with reception No. 0001. In this case, the control unit 108 determines in step S611 that job No. 0002 is a job affected by the cause of printing interruption of the interrupted job No. 0001.

In the event that this determination has been made, the control unit 108 forbids the printing system 100 to start printing operations of the job with reception No. 0002 while the job with reception No. 0001 is interrupted.

Now, in the above case, let us say that a job with reception No. 0003 which is displayed in the status list display screen in FIG. 11 is a job which requires sheets of a size other than the A4 size sheets for printing operations, or a job which requires sheets of a type other than the plain paper for printing operations. Further, let us say that the control unit 108 has confirmed in step S611 the presents of status information indicating that sheets meeting these conditions are available in a sheet supplying unit of the system 100. In this case, the control unit 108 determines in step S611 that the job with reception No. 0003 is a job which is not affected by the cause of printing interruption of job No. 0001.

In this case, the control unit 108 permits the printing system 100 to start printing operations of job No. 0003 while the job with reception No. 0001 remains interrupted.

Thus, the control unit 108 leaves jobs which do not satisfy the conditions in step S611 in the printing standby state, and enables executing of jobs which satisfy the conditions in step S611 while the cause of job regarding which printing has been interrupted in step S609 remains in a printing-interrupted state.

This improves productivity as much as possible, even when a job is interrupted.

The present embodiment is capable of handling the following case as well.

Case 2: Wherein the Control Unit 108, Which has Recognized in Step S611 that a Job Exists Within the Printing Queue Which is not Affected by the Cause of the Printing Interruption, Starts Printing of the Job Which is not Affected by the Printing Interruption During the Interruption Period of the Printing-interrupted Job.

This Case 2 is for describing one example of control corresponding to the control exemplified in the above Case B. That is to say, this Case 2 is an example of control which the control unit 108 effects under the condition that the type of cause of printing interruption of the job regarding which printing has been interrupted is an "original document jam".

Let us say for example that in this Case 2, the job regarding which printing has been interrupted by the control unit 108 in step S609 is a job which requires a document reading operation by the reader unit 103.

In the event of processing such a job, upon receiving a printing execution request by the user pressing the start key 403, the control unit 108 executes the series of printing operations illustrated below with the printing system 100 in steps S601 through S603 in FIG. 7A.

Upon receiving a printing execution request from the user for this job, the control unit 108 causes the ADF provided to the reader unit 103 to execute the feeding operation of each original document in the stack of originals. The control unit 108 further effects control such that the reader unit 103 performs a reading operation of each original fed to the original reading position, the image data of the original read by the reader unit 103 is stored in the memory 209, and the image data of the original of the job is read out from the memory 209 and printed by the printer unit 104.

Now, the control unit 108 has recognized that the job to be processed is a job which requires a document reading operation by the reader unit 103 (first condition). Let us also say that this job is not the only job to be printed i.e., at least one more job is already being printed, or is standing by to be printed, (second condition). Upon these two conditions being satisfied, the control unit 108 effects control such that reading operations of the job are performed by the reader unit 103, and simultaneously (in parallel) with the reading operations, printing operations of the job are performed by the printer unit 104, i.e., the control unit 108 controls the printing system 100 so as to be capable of executing parallel operations.

Now, in this example, let us say that the printing system 100 is currently carrying out parallel processing at the reader unit 103 and printer unit 104, and that in this state, an original document jam occurs in step S604 at the ADF of the reader unit 103, which becomes the cause of printing interruption of the job. The control unit 108 interrupts printing operations of the job in step S609. Further, in step S611, the control unit 108 identifies the cause of printing interruption to be an "original document jam", and moreover in step S611 determines that a job which is not affected by this type of cause of printing interruption is a job which does not require original reading operations at the reader unit 103 in order to perform printing at the printer unit 104. Thus, in step S611, the control unit 108 identifies what type of cause of printing interruption is the cause of printing interruption of the job regarding which printing has been interrupted in step S609, and what conditions make up a job which would not be affected by this cause of printing interruption. Also in step S611, the control unit 108 confirms whether or not there is a job which is not affected by the cause of printing interruption identified by the determination results, in the printing queue in the memory 109.

For example, a job from an external device, wherein printing data is input from the computer interface unit 106, would be such a job. Also, a job to be printed which is already saved is the memory 109, such as a job in the box function, would be such a job. The reason is that a box job is a job of which the printing data is saved in the memory 109 before receiving a printing execution request from the user via the UI unit.

Thus, in this Case 2, in step S611 the control unit 108 determines that a job which does not require original document reading operations to print, such as an external job or a box job, is a job which is not affected by the cause of printing interruption, i.e., a selectable job.

In the event that the control unit 108 confirms in this Case 2 that there is no such job which does not require original document reading operations to print in the memory 109, the flow proceeds from step S611 to step S612.

On the other hand, in the event that the control unit 108 confirms in this Case 2 that there a job which does not require original document reading operations to print in the memory 109, the flow proceeds from step S611 to step S614. After this step S614, in step S616 for example, the control unit 108 starts the printing operations of this job, while the job regarding which printing has been interrupted remains interrupted.

Thus the present embodiment is configured so as to be capable of flexibly handling various needs by enabling processing of varied and multiple types of jobs, such as copy jobs, external jobs, box jobs, and so forth. This is also an example of an advantage of the configuration of the present embodiment, which improves productivity as much as possible even in cases where there is an interrupted job.

With the above configuration in mind, the present embodiment is capable of handling the following case as well, for example.

Case 3: Wherein the Control Unit 108, Which has Recognized in Step S611 that a Job Exists Within the Printing Queue Which is not Affected by the Printing Interruption, Starts Printing of the Job Which is not Affected by the Printing Interruption During the Interruption Period of the Printing-interrupted Job.

This Case 3 is for describing one example of control corresponding to the control exemplified in the above Case C. That is to say, this Case 3 is an example of control which the control unit 108 effects under the condition that the type of cause of printing interruption of the job regarding which printing has been interrupted is an "error at a discharge destination".

For example, a control example that would be encompassed by this case 3 is a case wherein a discharge destination, which the user has specified as a processing condition of the job via the UI unit as the output destination of the printed article of the job of which printing has started in step S603, is the tray 229 of the finisher 220 shown in FIG. 3. Thus, this job to be printed in step S603 is a job which requires the tray 229 for output of the printed articles. Now, let us say that the tray 229 has become fully loaded with the printed articles while printing the job. In response to this, the finisher 220 notifies the control unit 108 of a tray full error. Upon receiving this information from the finisher 220, the control unit 108 determines in step S604 that a cause of printing interruption has occurred with this job, the flow proceeds from step S604 to step S609, and in step S609 the control unit 108 interrupts the printing operations of the job.

In this Case 3, the control unit 108 identifies the type of cause of printing interruption for the job to be a "discharge destination error". Based on this cause of printing interruption, in step S611 the control unit 108 determines that a job which is not affected by this cause of printing interruption is a job which requires output of printed articles to an output destination other than the tray 229 which is the output destination required by the interrupted job. The control unit 108 also searches in step S611 for whether or not there is a printing standby job in the memory 109 which satisfies this condition.

For example, in this Case 3, the control unit 108 determines in step S611 that a job that requires the tray 228 for output of the printed articles, and job that requires the tray 230 for output of the printed articles, are both selectable jobs. If such jobs do exist, outputting the printed articles of these jobs to the output destinations specified for the jobs would not interfere with normal loading of the printed articles. Thus, even in the event that output of printed articles to the tray 229 cannot be continued, output of printed articles to other output destinations can be performed. Accordingly, in this Case 3, the control unit 108 determines in step S611 that "a job which requires an output destination other than the tray 229 for output of printed articles" is a selectable job. That is to say, the control unit 108 determines in step S611 that a job which satisfies this condition is a job which is not affected by the cause of printing interruption of the.

Let us say here that there is a job in printing standby in the memory 109 which is a different job from the interrupted job, but which requires for output of printed articles the tray 229 which is the same output destination with the interrupted job. In this case, the control unit 108 determines in step S611 that this job which has the same output destination as the interrupted job is not an option.

With this configuration, in the event that the control unit 108 confirms in step S611 that there are no selectable jobs standing by for printing, the flow proceeds from step S611 to step S612. On the other hand, in the event that control unit 108 confirms in step S611 that there is a selectable job standing by for printing, the flow proceeds from step S611 to step S614.

Thus, with this Case 3, in step S611 the control unit 108 determines that a job satisfying the condition that printing can be completed without being affected by the discharge destination error of the interrupted job is a selectable job.

Also, with this Case 3, in the event that the control unit 108 determines in step S611 that there are no jobs in the memory 109 regarding which printing can be completed without being affected by the discharge destination, the flow proceeds from step S611 to step S612.

On the other hand, in the event that the control unit 108 determines in step S611 that there is a job in the memory 109 regarding which printing can be completed without being affected by the discharge destination error, the flow proceeds from step S611 to step S614. After this step S614, in step S616 for example, the control unit 108 starts the printing operations of this job at the printer unit 104, while the job regarding which printing has been interrupted remains interrupted.

As described above, if we say that in step S609, the type of cause of printing interruption which has occurred in step S604 is an "error at a discharge destination", under this condition, in step S611 the control unit 108 searches for whether or not there is a printing standby job satisfying the condition that printing can be completed without being affected by the discharge destination. The control unit 108 then controls the printing system 100 so as to be capable of executing printing operations of the job regarding which printing can be completed during the printing interruption period of the interrupted job.

Thus the present embodiment is configured so as to be capable of flexibly handling various needs by flexibly dealing with post-printing processes. This is also an example of an advantage of the configuration of the present embodiment, which is to improve productivity as much as possible even in cases there is a job regarding which printing has been interrupted.

Note that while the discharge destination error given as the type of cause of printing interruption in this Case 3 is "a discharge destination loaded full with printed articles", the cause of printing interruption in this Case 3 is not restricted to this type, and the following causes of printing interruption are also encompassed therein:—a case wherein there are no more sheet processing members necessary for bundling multiple printed sheets into a bundled printed article (consumables regarding finishing, such as staples, paste, and so forth); a case wherein such sheet processing members become jammed in the post-processing device; and a case wherein printing sheets are jammed in the post-processing device, and encompassed in "discharge destination error" as used here.

In cases where a job is interrupted in step S609 due to such a type of discharge destination error, the control unit 108 controls the printing system 100 so as to be capable of starting printing in step S616 for a job in the memory 109 confirmed in step S611 under the condition that the printing operations of the job can be completed in a state wherein the error is not recovered from.

Case 4: Wherein the Control Unit 108, Which has Recognized in Step S611 that a Job Exists Within the Printing Queue Which is not Affected by the Printing Interruption, Starts Printing of a Job Which is not Affected by the Printing Interruption Cause During the Interruption Period of the Printing-interrupted Job.

This Case 4 is one example of control in the above Case D. That is to say, this Case 4 is an example "a case wherein a user has explicitly input, via a UI unit, an interruption request for temporarily stopping printing operations".

For example, let us say that the control unit 108 receives from the operator, via the UI unit described in the present embodiment, a request equivalent to an explicit instruction from a user to temporarily stop printing operations of the job. The "UI unit" as used with the present embodiment means the operating unit 102, or one of the external UI units 200, 300, 400, 500, or 600, illustrated in the example shown in FIG. 1. Upon receiving such an explicit printing interruption request from the user, the control unit 108 makes a "YES" determination in step S604, and interrupts the printing operations of the job currently being printed in step S609.

In this Case 4, the control unit 108 determines that a job regarding which an explicit printing interruption request has not been made from a user, is a job which is not affected by the cause of printing interruption.

Now, let us say that with this Case 4, there are three jobs standing by for printing in the memory 109, besides the job regarding which printing has been interrupted in step S609. The control unit 108 takes the earliest of the three printing standby state jobs, that is regarding which the printing execution request was made the earliest, as a selectable job in step S611 with priority, and controls the printing system 100 so as to be capable of starting printing of that job in step S616.

Or, let us say that there is a job standing by for printing in the memory 109, besides the job regarding which printing has been interrupted in step S609, and that the user has also made an explicit printing interruption request regarding this job as well such that this job is currently in a temporarily stopped state regarding printing. The control unit 108 determines for this job also, as with the job which has been interrupted in step S609, that it is "a case wherein a user has explicitly input a printing interruption request". Accordingly, in the event that such a job is present in the memory 109, the control unit 108 determines in step S611 that this job is not a selectable option.

Thus, in this Case 4, in step S611 the control unit 108 determines that "a job in printing standby, regarding which a user has not explicitly input, via a UI unit, a printing interruption request (temporary printing stop request)" is a job which is not affected by the cause of printing interruption, i.e., is a selectable job.

In the event that with this Case 4, the control unit 108 determines that "a job in printing standby, regarding which a user has not explicitly input, via a UI unit, a printing interruption request (temporary printing stop request)" does not exist in the memory 109, the flow proceeds from step S611 to step S612.

On the other hand, in the event that with this Case 4, the control unit 108 determines that "a job in printing standby, regarding which a user has not explicitly input, via a UI unit, a printing interruption request (temporarily printing stop request)" exists in the memory 109, the flow proceeds from step S611 to step S614.

After this step S614, in step S616 for example, the control unit 108 starts the printing operations of this job at the printer unit 104 while the job regarding which printing has been interrupted in step S609 remains interrupted.

As described above, if we say that in step S609, the cause of printing interruption which has occurred in step S604 is an "explicit input from a user, via a UI unit, of a printing interruption request (temporary printing stop request)", in step S611 the control unit 108 searches for whether or not there is a printing standby job as a job regarding which a user has not explicitly input a printing interruption request and regarding which a printing execution request has already been accepted, as a job which is not affected by the cause of printing interruption.

The control unit 108 then controls the printing system 100 so as to be capable of executing printing operations of the unaffected job during the printing interruption period of the job regarding which printing has been interrupted due to a user having explicitly input a printing interruption request.

Thus the present embodiment is configured so as to be capable of flexibly handling various needs of users, including demands to temporarily stop printing. This is also an example of an advantage of the configuration of the present embodiment, which is to improve productivity as much as possible even in cases there is a job regarding which printing has been interrupted.

As described above, control relating to processing of the flowcharts disclosed with the present embodiment, such as FIGS. 7A and 7B, including control such as described above in Cases 1 through 4, is carried out in the present embodiment by the control unit 108 executing computer-readable programs stored in the memory 109.

With the present embodiment, in step S609 the control unit 108 identifies the type of the cause of printing interruption upon occurrence of the cause of printing interruption in step S604. Based on the identified type of cause of printing interruption, in step S611 the control unit 108 executes identification of jobs not affected by the cause of printing interruption. Further, in step S616, the printing system 100 is controlled so as to be capable of starting printing of a job, not affected by the cause of printing interruption even though the printing-interruption state in step S609 is not removed.

It should be noted that while such configurations are disclosed with the present embodiment, configurations do not need to be restricted to these. For example, a configuration may be made which is capable of handling only one of the Cases 1 through 4. Or, a configuration may be made wherein a case other than the Cases 1 through 4 can be handled through a configuration capable of executing processing the same as or equivalent to the processing illustrated in exemplary form in FIGS. 7A and 7B. While configurations are made so as to be able to handle such a variety of modifications and adaptations, the configuration is to include a configuration relating to the UI control disclosed in the present embodiment illustrated in exemplary form in FIGS. 16, 21, and 24.

In step S601 and step S602 in FIG. 7A the control unit 108 stores the printing data and printing processing conditions data in the memory 109. In step S603 of FIG. 7A, the control unit 108 following the printing order of the printing queue managed in the memory 109 and starts execution of the printing operations of the job to be processed at the printer unit 104.

In step S604, the control unit 108 determines whether or not a cause of printing interruption has occurred at the printing system 100 in step S603 with the job of which printing is being started during printing thereof, this determination being made as described above.

In the event that a determination of "NO" is made in step S604, the control unit advances the flow from step S604 to step S605 based on the determination results.

In step S605, the control unit 108 determines whether or not all printing operations necessary for the job being printed have been completed in step S603 at the printing unit 104, based on the determination criteria such as the printing processing conditions which the user has set for the job and the processing status of the job in the printing system 100, and so forth.

In the event that a "NO" determination is made in step S605, the control unit returns the flow from step S604 to step S603 based on the determination results. Thus, the control unit 108 controls the printing system 100 so as to continue performing printing operations of the job until completion thereof.

On the other hand, in the event that a determination of "YES" is made in step S605, the control unit 108 advances the flow from step S605 to step S606 based on the determination results.

In step S606, the control unit 108 deletes the job regarding which completion of printing has been determined in step S605 from the printing queue. Subsequently, in step S607, the information of this printing job is also deleted from the memory 109. At this time, the control unit 108 deletes from the memory 109 various types of data used for the printing operations regarding which determination was made in step S605 (image data to be printed on the printing medium, and attribute data such as printing conditions data and the like thereof), for example, as information of the printing job to be deleted in step S607. Subsequently, the flow proceeds from step S607 to step S608.

In step S608, the control unit 108 determines whether or not there is a job to be printed in the memory 109 besides the job regarding which determination was made in step S605, by making reference to information of the printing queue described above.

In the event that a "YES" determination is made in step S608, the control unit 108 returns the flow from step S608 to step S603 based on the determination results. Thus, the control unit 108 enables the printing system 100 to execute printing operations of another job to be printed, which is a job recognized in step S608 as a job in printing standby in the memory 109 to be printed by the printing system 100. The control unit 108 controls the printing system 100 so as to execute processing according to the flowcharts in FIGS. 7A and 7B with regard to this job, as well. The control unit 108 continues to control the printing system 100 so as to repeat the processing according to the flowcharts in FIGS. 7A and 7B for all jobs regarding which printing execution requests have been made by the user.

Subsequently, upon determination being made that there are no jobs to be printed in the printing system 100, the control unit 108 makes a "NO" determination in step S608, and based on the determination results, the control unit 108 ends all of the processing according to the flowcharts in FIGS. 7A and 7B.

With the above configuration in mind, in the event that a "NO" determination is not made in step S604, meaning occurrence of a cause of printing interruption with the job being printed in step S603 has been confirmed, upon which control unit 108 makes a "YES" determination in step S604, the flow proceeds from step S604 to step S609 in FIG. 7B.

In step S609, the control unit 108 controls the printer unit 104 so as to interrupt the printing operations of the job being printed in step S603 in light of the occurrence of the cause of printing interruption which has been confirmed in step S604, as described above. Subsequently, the flow proceeds from step S609 to step S610.

In step S610, the control unit 108 keeps the information of the job regarding which printing has been interrupted in step S609 in the memory 109 in a state correlated with the printing data of the job, even during the printing interruption period thereof. The control unit 108 then controls the memory 109 in step S610 such that the information of the job being held in the memory 109 can be read out in later processing which requires the information (e.g., steps S611 through S615, S620, S622, S624, S625, and so forth).

Examples of information of the job to be held in step S610 include information identified by the control unit 108 regarding the type of cause of printing interruption, i.e., what type of cause of printing interruption has caused the job, regarding which printing has been interrupted in step S609, to be interrupted.

In step S611, the control unit 108 compares this information relating to the cause of printing interruption of the job regarding which printing has been interrupted, with the information of each of the jobs in printing standby in the printing queue in the memory 109. As described above, in step S611 the control unit 108 determines whether or not there is a job in printing standby in the memory 109 which will not be affected by the cause of printing interruption of the job regarding which printing has been interrupted in step S609, based on the comparison results.

In the event that confirmation is made in step S609 that a job is present in the memory 109 regarding which printing can be started without being affected by the cause of printing interruption of the job regarding which printing has been interrupted in step S609, the control unit 108 makes a "YES" determination in step S611, and the flow proceeds from step S611 to S614.

On the other hand, in the event that confirmation is made in step S609 that no job is present in the memory 109 regarding which printing could be started without being affected by the cause of printing interruption of the job regarding which printing has been interrupted in step S609, the control unit 108 makes a "NO" determination in step S611, and the flow proceeds from step S611 to S612.

In the present embodiment, the processing in step S612 is processing which is executed by the control unit 108 during the printing interruption period (period during which printing is temporarily stopped) of the job regarding which printing has been interrupted in step S609.

In the processing in this step S612, the control unit 108 determines whether or not the cause of printing interruption of the job regarding which printing has been interrupted in step S609 has been removed from the printing system 100. The control unit 108 makes the determination in step S612 based on the information from the units of the printing system 100 (related units such as the operating unit 102, reader unit 103, printer unit 104, memory 109, etc.), information of the job being held in step S610 as described above, and so forth.

Now, in the event that in step S612, the control unit 108 has not confirmed that the cause of printing interruption of the job regarding which printing has been interrupted in step S609 has been removed, the control unit 108 takes this result and the flow returns from step S612 to step S611.

On the other hand, in the event that in step S612 the control unit 108 confirms that the cause of printing interruption of the interrupted job has been removed, the control unit 108 takes this result and the flow proceeds from step S612 to step S613. In step S613, the control unit 108 prepares to resume the printing operations of the interrupted job. Specifically, the control unit 108 checks the progress of the job regarding how much of the printing processing had been completed, using the information regarding the job held in the memory 109 in step S610. Upon receiving the results thereof, the control unit 108 confirms how much volume remains to be output in what format. Thus, confirmation work necessary to complete the interrupted job is performed in step S613, following which the flow returns from step S613 to step S603 in FIG. 7A. The control unit 108 then controls the printing system 100 so as to resume printing the interrupted job. The flow then proceeds to step S604. Thus, the same processing as described above can be executed at the printing system 100.

With the above-described configuration in mind, let us say that the control unit 108 has confirmed in step S611 that there is in the memory 109 a job in printing standby which is not affected by the cause of printing interruption of the job regarding which printing has been interrupted in step S609, and has advantaged the flow from step S611 to the flow on the step S614 side. In this case, the control unit 108 executes control such as illustrated in exemplary form in the Cases 1 through 4.

In step S614 the control unit 108 reads out from the memory 109 job information of the hob selected in step S611 as a job not affected by the cause of printing interruption. Using this job information enables to make confirmation in step S614 regarding what printing conditions the user has set for the job selected in step S611, and what printing operations the job needs. Thereafter, the control unit 108 advances the flow from step S614 to step S615.

Now, in this step S615, the control unit 108 determines whether or not the cause of printing interruption of the interrupted job has been removed at the printing system 100 by the operator. In this case, the control unit 108 uses the job information held in the memory 109 in step S610 and the current status information of the printing system 100 to perform the determination in step S615.

Now, let us say that in step S615, confirmation has been made that the operator has not removed the cause of printing interruption of the interrupted job, at the printing system 100. In this case, the control unit 108 makes a "NO" determination in step S615, and based on this determination result, controls the system 100 so as to advance the flow from step S615 to the flow on the step S616 side.

On the other hand, let us say that in step S615, confirmation has been made that the operator has removed the cause of printing interruption of the interrupted job, at the printing system 100. In this case, the control unit 108 makes a "YES" determination in step S615, and based on this determination result, controls the system 100 so as to advance the flow from step S615 to the flow on the step S620 side.

First, description will be made regarding the control which the control unit 108 executes on the printing system 100, in the event that the flow so far has following the series of processing of "YES in S604 in FIG. 7A"→S609→S610→"YES in S611"→S614→"NO in S615".

The control unit 108 confirms that the cause of printing interruption of the job regarding which printing has been interrupted in step S609 is unresolved. This is the first condition. Also, the control unit 108 confirms that another job in a printing standby state, which is not affected by that cause of printing interruption, is present in the memory 109. This is the second condition. In other words, we say that the control unit 108 has made a "YES" determination in step S611, and a "NO" determination in step S615. Upon both the first condition and the second condition being satisfied, in step S616 the control unit 108 starts the printing operations of the job not affected by the cause of printing interruption at the printer unit 104, while maintaining the printing interruption state of the job regarding which printing has been interrupted in the printing system 100. Thus, we say that the printing system 100 is under control of the control unit 108.

As already mentioned, in the present embodiment, a job regarding which printing operations have been interrupted in step S609 due to the occurrence of the cause of printing interruption in step S604 is referred to as an "interrupted job". Also, a job which is not affected by the cause of printing interruption, regarding which printing is to be started (S616), is a job which the control unit 108 selects from the printing queue in step S616, and is also referred to as a "current job", as in step S621.

The configuration regarding which jobs the control unit 108 prints in step S616 as a job not affected by the cause of printing interruption is as described above in Cases 1 through 4. That is to say, the control unit 108 selects and determines a job to start printing processing in step S616 from the multiple jobs in a standby state in the printing queue in the memory 109, based on the type (contents) of the cause of printing interruption of the job regarding which printing has been interrupted in step S609.

However, one point to keep in mind with the present embodiment is that, as also mentioned elsewhere, there is an axiomatic condition for permitting starting of printing of another job in step S616 during the printing interruption period of the job regarding which printing has been interrupted. That is that the type of cause of printing interruption of the job regarding which printing has been interrupted in step S609 is not "jamming of printing sheets of the job on the sheet transportation path within the printer unit 104". In the event that this cause of printing interruption is confirmed in step S604, the control unit 108 forbids transition from step S611 to step S614, and the flow proceeds from step S611 to step S612.

Now, let us say that the control unit 108 has indeed confirmed that the type of cause of printing interruption of the interrupted job is a jam of printing sheets of the job on the sheet transportation path within the printer unit 104. In this case, even in the event that there are other printing standby jobs other than this job in the memory 109, the control unit 108 forbids any and all starting of printing of other jobs in the printing system 100 during the printing interruption period. In this case, the control unit 108 stands by until the operator removes the cause of printing interruption of the job from the printing system 100.

Upon the operator having removed the cause of printing interruption, the control unit 108 returns the processing from step S612 in FIG. 7B to step S603 in FIG. 7A, and restarts (resumes) the printing operations of the job to be printed. Note that in this case of resuming printing of the job, the control unit 108 controls the printing system 100 so as to print the remaining printing which was unprocessed at the point immediately before the printing interruption of the job.

If the cause of interruption is indeed a jam of printing sheets within the printer unit 104, allowing another job to start in the printing system 100 without first removing the cause of printing interruption would create a new sheet jam within the printing system 100. The printing system 100 according to the present embodiment proactively preventing such problems.

In the following description, a job regarding which printing has been interrupted in step S609 due to confirmation by the control unit 108 in step S604 that a cause of printing interruption has occurred, will be referred to as "job X". Further, a job regarding which the control unit 108 permits starting of printing in step S616 under the condition of being a job having printing processing conditions whereby printing operations thereof can be completed regardless of the cause of printing interruption of the job X which has occurred in the printing system 100, will be referred to as "job Y".

As can be clearly understood from the comparison with the above-described Cases 1 through 4, with the present embodiment, this job Y is equivalent to a job which is not affected by the cause of printing interruption of the job X. Further, this job Y is equivalent to a job regarding which the control unit 108 has received a printing execution request following receiving the printing execution request for the job X in step S601. More specifically, the job Y is a job which has been stored by the control unit 108 in the memory 109 in a state of the printing data to be printed and the printing processing conditions data being correlated, while printing operations of the job X are being carried out by the printer unit. That is to say, if we call the job X a "preceding job", the job Y is a "subsequent job".

Now, the control unit 108 has stored data of this job Y in the memory 109 while executing printing of the job X, holding the job Y in standby in the memory 109 as a printing standby job regarding which starting of printing is forbidden during the printing execution period of the job X. However, upon a cause of printing interruption occurring with the job X, the control unit 108 has interrupted the printing operations of the job X in step S609. Further, the type of cause of printing interruption of the job X was been identified, and based on the identification results thereof, the control unit 108 has selected the job Y as a job capable of completing printing at the printing system 100 without being affected by the cause of printing interruption.

Accordingly, the control unit 108 has started printing of the job Y in step S616 during the printing interruption period of the job X. We now assume that the job Y is being printed with the printing system 100 being in this state. Thus, here is disclosed a configuration wherein printing of a job Y, which is a subsequent job to the job X, is started with the preceding job X remaining in a printing-uncompleted and a currently printing interrupted state. In light of this, the job Y is a job regarding which printing is executed without awaiting completion of printing of the job X. Accordingly, as illustrated in the example, a job regarding which the control unit 108 gives printing starting permission in step S616 during the printing interruption period of the job regarding which printing has been interrupted is step S609, can be defined as an "overtake printing job (promoted printing job)". That is to say, the job Y given in this example means a "current job" or "overtake printing job" in the present embodiment.

Now, let us say that for the current state of the printing system 100, the control unit 108 is causing the printing system 100 to continue the printing operations of the job Y which have been started in step S616, with the job X kept in the printing interruption state. That is to say, this means that the control unit 108 is repeating the loop in FIG. 7B of S616→"NO" in S617→"NO" in S615→S616.

That is to say, the control unit 108 keeps the printing system 100 operating to achieve completion of the printing of the job Y with the interruption state maintained for the job X regarding which printing has been interrupted, while the cause of printing interruption of the job X regarding which printing has been interrupted in step S609 remains unresolved in the printing system 100.

Note that in the event of starting printing in step S616 of a job selected in step S611 (job Y in this case), the control unit 108 causes the printing system 100 to executing the printing processing following the printing processing conditions which the user has set with the UI unit for that job, as the printing operations required by that job.

To this end as well, the control unit 108 performs confirmation of the printing processing condition data held in the memory 109 in correlation with the printing data of the job regarding which printing is to start in step S616. As one example of this, in step S614 the control unit 108 reads and refers to the job information of the job selected in step S611, from the memory 109. This processing is the processing to be executed in step S614. Note that this job regarding which printing is to start in step S616 is a job regarding which a printing execution request has been made following the printing execution request of the job regarding which printing has been interrupted in step S609, and which is not affected by the cause of printing interruption of the job regarding which printing has been interrupted. That is to say, this means an "overtake printing job (promoted printing job)" such as job Y.

Subsequently, let us say that the printing operations of the job Y, of which printing was started in step S616, has ended at the printing system 100, for example. In this case, upon receiving the printing end result of the job Y, the control unit 108 advances the flow from step S617 to step S618. In step S618, the control unit 108 deletes the job Y from the printing queue in the memory 109, and in step S619 the control unit 108 deletes the job information of the job Y (including printing data of the job Y which is actually printed on the printing sheets, and printing processing condition data of the job Y) from the memory 109. Upon completing the processing in step S619, the control unit 108 returns the flow from step S619 to step S611.

The processing flow exemplarily illustrated above is a control example corresponding to the processing flow executed while the control unit 108 is executing the printing processing of the job Y regarding which printed has been started in step S616, in the event that the cause of printing interruption of the job X has not been removed by the operator from the printing system 100.

With the present embodiment, the control unit 108 monitors whether or not the cause of printing interruption of the interrupted job, which is equivalent to the job regarding which printing has been interrupted in step S609, has been removed, even while the printing operations of the promoted printing job which is equivalent to the job started printing in step S616 are being executed at the printing system 100.

With this configuration, for example, in the event that printing of the job Y has not ended in step S617 following having been started in step S616, the flow returns from step S617 to step S615, and reconfirmation is made in step S615 regarding whether or not the cause of printing interruption of the job X has been removed. This processing loop repeats the processing of steps S615 through S617.

Following the processing flow of, for example, S601 through 603→"YES" in S604→S609→S610→"YES" in S611→S614→NO in S615→S616→"NO" in S617, and going to S615 again, a "YES" determination is made in step S615. In other words, the control unit 108 has confirmed that the cause of printing interruption of the job X has been removed by the operator while the printing operations of the job Y are being executed at the printing system 100. In this case, the control unit 108 advances the flow from S615 to step S620, due to the removal of the cause of printing interruption of the job X during the printing execution of the job Y.

In step S620, the control unit 108 performs, on the UI unit according to the present embodiment, a display for enabling the operator to explicitly instruct (request) a resuming method (recovery method) of printing operations of the job regarding which printing has been interrupted in step S609. Hereafter, this display may also be referred to as a "particular display".

With this embodiment, the control unit 108 controls the printing system 100 such that the printer unit 104 is capable of starting printing operations of a promoted printing job (job Y in this example) during the printing interruption period of an interrupted job (job X in this example). Assuming this configuration, the control unit 108 confirms that the cause of printing interruption job has been removed at the printing system 100 during printing of job Y. In this situation, the control unit 108 which has performed the confirmation controls the UI unit according to the present embodiment so as to be able to make the "particular display". The processing in step S620 according to the present embodiment is processing corresponding to this configuration. Note that while this configuration is an important feature of the present embodiment, the printing system 100 also has a configuration requirement based on the following point, given here as an example of a further feature.

For example, in the event of permitting the UI unit to perform the above "particular display", the control unit 108 executes this "particular display" with the UI unit while continuing the printing operations of the promoted printing job at the printer unit 104 in the printing system 100. That is to say, in other words, the control unit 108 makes the "particular display" on the UI unit according to the present embodiment, but forbids the printing system 100 from executing actions such as stopping the printing operations of the above promoted printing job regarding which printing is being executed by the printer unit 104.

Now, let us say that no instruction was made by the operator regarding the recovery method of the interrupted job by way of the "particular display" within a predetermined amount of time elapsed from the point in time at which the "particular display" was made at the UI unit (e.g., within one minute from the point at which a later-described screen 900 is displayed).

With the present embodiment, in the event that instruction of the recovery method of the interrupted job is not made through the "particular display" within the predetermined time, the control unit 108 controls the printing system 100 such that the printing operations of the promoted printing job which is being printed by the printer unit 104 continue to be executed even though the "particular display" remains executed by the UI unit (e.g., a state wherein the screen 900 is displayed on the operating unit 102).

Thus, in the event that specification of the recovery method of the interrupted job has not been finalized by the operator within a predetermined amount of time, the control unit 108 continues the printing operations of the promoted printing job at the printer unit 104 without stopping.

As one example of the "particular display", with the present embodiment the control unit 108 enables execution through the UI unit according to the present embodiment, of a particular display wherein the user is presented with selection candidates (selection options) which the user can specify for a timing at which the printing operations of the job regarding which printing has been interrupted can be resumed with the printing system 100, such that the user can specify a desired selection option from the presented selection options.

Figure 16:
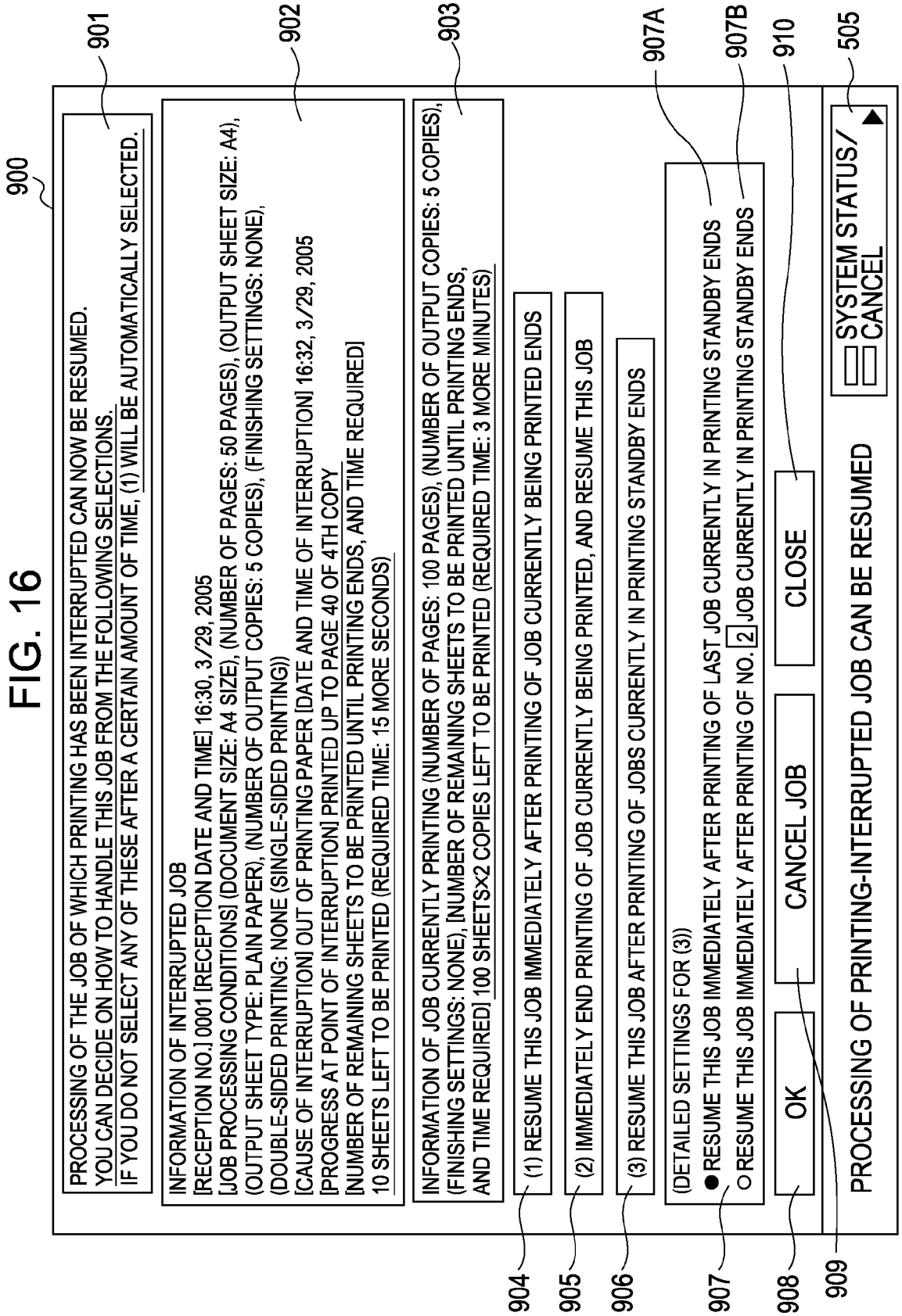
FIG. 16 is a diagram for describing a control example of the embodiment.

Moreover, the control unit 108, which is an example of a control unit of the printing system 100 according to the present embodiment, effects control such that a display configured of the components illustrated in, for example, FIGS. 16, 21, and 24, which are an example of the "particular display", can be made by the UI unit of the present embodiment.

Also, as described above, the control unit 108 permits the printer unit 104 to start printing operations of a subsequent job which is not affected by the cause of printing interruption of the interrupted job (equivalent to a promoted printing job) during the printing interruption period of an interrupted job. Assuming this configuration, the control unit 108 enables the "particular display" to be made with the UI unit of the present embodiment, in the event that the operator has removed the cause of printing interruption during the period in which the printer unit 104 is executing the printing operations of the promoted job, in the printing system 100.

Note that this "promoted printing job" is also referred to as "current job" and "overtake printing job" with the present embodiment, and these terms are synonymous.

The operating unit 102 of the printing apparatus 101 serves as the UI unit disclosed in the present embodiment whereby the "particular display" is executed as illustrated in exemplary from in FIGS. 16, 21, and 24. Further, the configuration is arranged such that the UI units of remote devices (information processing devices such as the PCs 200 through 400, other printing apparatus 500 and 600, in FIG. 1, and so forth) other than the printing apparatus 101 can execute the "particular display". Moreover, the configuration is arranged such that various instructions and operational commands relating to various types of control of various display examples described below can be executed from the UI units of the external devices. Accordingly, a configuration can be realized wherein the same operations can be performed regarding the printing system 100 as with the operations disclosed with the present embodiment, even with a UI unit other than the operating unit 102. The printing system 100 according to the present embodiment is configured so as to be adaptable to such a configuration as well.

Moreover, the control unit 108 according to the present embodiment controls the UI unit so as to dynamically change the candidates as selection options which the operator of the printing system 100 can instruct by way of the "particular display", based on the multiple types of information relating to the job to be processed at the system 100. For example, examples of the "multiple types of information" include information of printing processing conditions of a promoted printing job such as with the job Y, printing queue job information such as the printing standby status of subsequent jobs standing by in the memory 109, and so forth. Assuming the above configuration, as exemplarily illustrated in FIGS. 16, 21, and 24, candidates for selection options regarding which reception from the user by way of the "particular display" are controlled so as to dynamically differ from one another, based on the multiple types of information relating to the job to be printed with the printing system 100, as described above. Thus, with this configuration, the contents of the display made by the UI unit, serving as the "particular display", are controlled as well.

For example, from the printing processing conditions of a promoted printing job regarding which printing starting is performed during the printing interruption processing of an interrupted job, the control unit 108 forbids displaying of a display such as exemplarily illustrated in FIG. 16 as the "particular display". Instead, according to the configuration of the printing system 100 of the present embodiment, the control unit 108 effects control such that a display such as exemplarily illustrated in FIG. 24 is performed by the UI unit.

Moreover, based on the reception status of a printing standby job, the control unit 108 forbids display such as exemplarily illustrated in FIGS. 16 and 24 as the "particular display". Instead, according to the configuration of the printing system 100 of the present embodiment, the control unit 108 effects control such that a display such as exemplarily illustrated in FIG. 21 is performed by the UI unit.

For example, let us say that during the period in which the cause of printing interruption of an interrupted job remains unresolved in the printing system 100 by the operator, the control unit 108 according to the present embodiment keeps the printing operations of the interrupted job. Also, the control unit 108 controls the printing system 100 so as to keep repeating the printing operations of subsequent jobs which are promoted printing jobs, as much as possible, during this printing interruption period. Thus, the control unit 108 controls the printing system 100 so as to keep the printing operations of the printer unit 104 of the printing system 100 continuing as much as possible without stopping.

Assuming this configuration, let us say that the control unit 108 has confirmed that the cause of printing interruption of the interrupted job has been removed by the operator of the printing system 100 during the executing period of the printing operations of a promoted printing job at the printer unit 104. Let us further say that the control unit 108 has made the above "particular display" with the UI unit of the present embodiment, upon this confirmation.

Thus, we are saying that the status of the current printing system 100 is that of performing the "particular display" by the UI unit. However, even in this state, the control unit 108 controls the printing system 100 so as to continue the printing operations of the promoted printing job at the printer unit 104 regarding which printing started in step S616, during the predetermined period up to the operator selecting and finalizing a method for resuming the interrupted job by way of the "particular display".

The above-described arrangement itself is also an example of an arrangement taking into consideration the overall productivity of multiple jobs, which is of great importance in a POD-based printing environment, such as continuous operation of the printing operations of the printing system 100 as much as possible, while obtaining the advantages disclosed in the present embodiment.

Taking into consideration the control configuration of the above-described various printing systems 100, a specific example of configuration requirements for the control unit according to the present embodiment to effect control so as to enable the "particular display" at the UI unit according to the present embodiment will be described.

First, as with the above-described control example, the control unit 108 has interrupted the printing operations of the job X at the printer unit 104, and then started printing operations of the job Y. This configuration is according to the control described with the control examples illustrated in the above Cases 1 through 4.

Assuming the above configuration, the control unit 108 continues the printing operations of the job Y at the printer unit 104 started during the printing interruption period of the job X, in the event that the cause of printing interruption of the job X is unresolved by the operator. In other words, the control unit 108 controls the printing system 100 so as to continue the printing operations of the job Y at the printer unit until the operator removes the cause of printing interruption of the job X at the printing system 100.

Subsequently, the control unit 108 has confirmed that the cause of printing interruption of the job X has been removed with the printing system 100 during the printing of the job Y. Following this configuration, in step S620 the control unit 108 effects control such that a display of the display screen 900 exemplarily illustrated in FIGS. 16, 21, and 24, can be executed by the display unit 301 of the operating unit 102.

The user interface screen 900 (hereafter also referred to as UI screen) exemplarily illustrated in FIGS. 16, 21, and 24, is an example of a screen configuration of the "particular display" which the control unit 108, which is an example of the control unit according to the present embodiment, executes as an example of the UI unit according to the present embodiment.

Note that with the present embodiment, the control unit 108 confirms that the operator has removed the cause of printing interruption of the job regarding which printing has already been interrupted in step S609, at the printing system 100, while executing the promoted printing job of which printing has started in step S616. Upon making this confirmation, the control unit 108 confirms information of jobs which require printing operations by the printing system 100, including the job X which is the interrupted job, and the job Y which is the promoted printing job, based on the various types of information held in the memory 109. the various types of information include information unique to each job such as the printing processing condition data and the like of each job, information of the printing queue for the control unit 108 to identify the number of printing standby jobs standing by for printing in the memory 109, and so forth. Based on the configuration results, the control unit 108 effects control so as to dynamically change the number of candidates serving as selection options regarding which reception from the user is permitted, as a user request for determining the timing at which to resume printing operations of the interrupted job at the printer unit 104. As a specific configuration thereof, with the present embodiment, the control unit 108 effects control of the UI unit of the present embodiment so as to restrict or increase the number of candidates serving as selection operations regarding which reception from the user as a method for resuming the interrupted job is permitted, as with the display examples in FIGS. 16, 21, and 24. Note however, that there are also display components which are common to each of the FIGS. 16, 21, and 24, which are the "particular display".

Now, the display components which are common to each of the display examples in FIGS. 16, 21, and 24 will be described with reference to FIG. 16, representing these three drawings.

Display Component 1: Printing-Interrupted Job Status Notification Space 901

This notification space 901 is an example of a display which the control unit 108 displays with the UI unit, for enabling notification to the user to the effect that the current status of the printing system 100 is that the printing operations of the job interrupted in step S609 can be resumed.

With the present control example, the cause of printing interruption of the job X has been removed in the system 100 by the operator while printing the job Y at the printer unit 104. In response to this, the control unit 108 performs display of the UI screen 900, which is an example illustrated of the "particular display" in FIGS. 16, 21, and 24, at the operating unit 102.

Accordingly, the control unit 108 effects control so as to enable notification to the user via the notification space 901 of the UI screen to the effect that the printing operations can be resumed at the system 100.

The display control example in FIG. 16 discloses a configuration wherein the operator of the printing system 100 can be notified by the control unit 108 via the notification space 901 to the effect that the printing operations of the job X can be resumed at the current state.

Note that this notification space 901 also serves to notify the user that the timing for resuming the printing operations of job X can be selected and finalized by the user from selection operations displayed in the UI screen 900 along with the notification space 901.

Now, let us say that with the present embodiment, a predetermined amount of time has elapsed without the user selecting and finalizing the timing for resuming the printing of job X and then the cause of printing interruption has been removed, using the UI screen 900, for example. Thus, we are saying that the user has not made an operation for selecting an option for a predetermined amount of time following displaying the UI screen 900 on the UI unit. In this case, under this situation, the control unit 108 controls the printing system 100 so as to be capable of automatically resuming the printing operations of job X, using a resuming method equivalent to a certain one of the selection options. Assuming this configuration, the control unit 108 also performs display control of guidance control relating to the case of automatic selection of a selection option at the UI screen 900 as in this example, so as to enable notification to the user via the notification space 901.

The UI screen 900 having the notification space 901 which the control unit 108 displays on the operating unit 102 may also be configured so as to have the following display components, as well.

Display Component 2: Printing-Interrupted Job Information Notification Space 902

This notification space 902 is an example of a display which the control unit 108 displays with the UI unit, for enabling notification to the user regarding information of the job regarding which printing has been interrupted in step S609.

With the present embodiment, the control unit 108 can display, on the display space 902 of the UI screen 900, detailed information relating to the interrupted job and now the control unit 108 is permitting re-executing of the printing operations upon the operator of the system 100 removing the cause of printing interruption.

As an example of this configuration, the display control example shown in FIG. 16 discloses a configuration wherein notification of the below-listed detailed information to the user by the control unit 108 via the notification space 902, is enabled.

Information "1" to be Presented in Display Space 902

This information "1" is an example of information enabling the user to identify the job reception No. of an interrupted job. The display control example according to the present embodiment shown in FIG. 16 discloses a configuration wherein the control unit 108 effects control such that the operator of the printing system 100 can identify through the notification space 902 that the reception No. of the job X, which the control unit 108 has assigned at the time of reception of the printing execution request, is "0001".

Information "2" to be Presented in Display Space 902

This information "2" is an example of information enabling the user to identify the job reception date-and-time of an interrupted job.

The display control example according to the present embodiment shown in FIG. 16 discloses a configuration wherein the control unit 108 effects control such that the operator of the printing system 100 can identify through the notification space 902 that the reception date-and-time of the job X, at the time of reception of the printing execution request, is "16:30 of 2005/3/29".

Information "3" to be Presented in Display Space 902

This information "3" is an example of information enabling the user to identify the job processing conditions of an interrupted job. The display control example according to the present embodiment shown in FIG. 16 discloses a configuration wherein the control unit 108 effects control such that the operator of the printing system 100 can identify through the notification space 902 the job processing conditions of the job X, regarding what sort of the printing operations are required for the series of printing operations necessary for completing the processing of the job X.

For example, with the display control example shown in FIG. 16, the original document sheet size of the job X is "A4 size". Also, the total number of pages of the document for the job X is "50 pages". The size and type of the printing medium required for printing of the job X is "A4 size and plain paper". Executing finishing with the finisher provided to the printing system 100 on the printed articles of the job X is unnecessary. The job X requires single-sided printing, not both-sided printing. This exemplary illustration of the printing processing conditions discloses a configuration wherein the control unit 108 effects control such that the operator of the printing system 100 can identify through the notification space 902 the series of processing conditions necessary for the series of printing operations for the job X.

Information "4" to be Presented in Display Space 902

This information "4" is an example of information enabling the user to identify the type of cause of printing interruption of a job. The display control example according to the present embodiment shown in FIG. 16 discloses a configuration wherein the control unit 108 effects control such that the operator of the printing system 100 can identify through the notification space 902 what type of cause of printing interruption the cause of printing interruption of the job X confirmed by the control unit 108 in step S604 is.

For example, the display control example in FIG. 16 discloses that the control unit 108 effects control such that the operator of the printing system 100 can identify through the notification space 902 that the cause of printing interruption of the job X is "out of printing paper".

It should be noted that the display exemplarily illustrated in FIG. 16 and also FIGS. 21 and 24 so as to disclose an example of "particular display" is a display which the control unit 108 causes the UI unit to perform upon the cause of printing interruption having been removed. That is to say, at the point that this display is made, the cause of printing interruption has already been resolved, so the information "4" which the control unit 108 notifies to the user via this notification space 902 is not information to the effect that a cause of printing interruption is currently underway in the system 100, but rather history information that the cause of interruption of the job X was "out of printing paper".

However, it should be noted that even in cases of notifying information to the user regarding cause of interruption as history information, the control unit 108 uses information for identifying the cause of printing interruption which is included in the job information which is to be held in the memory 109 in the processing in step S610.

Information "5" to be Presented in Display Space 902

This information "5" is an example of information enabling the user to identify the date-and-time at which the cause of printing interruption occurred with a job. The display control example according to the present embodiment discloses a configuration wherein the control unit 108 effects control such that the operator of the printing system 100 can identify through the notification space 902 the date-and-time at which the cause of printing interruption in step S906 occurred.

For example, the display control example according to the present embodiment shown in FIG. 16 discloses a configuration wherein the control unit 108 effects control such that the operator of the printing system 100 can identify through the notification space 902 that the date-and-time at which the cause of printing interruption of the job X occurred is "16:32 of 2005/3/29".

That is to say, with the case of the display control example shown in FIG. 16, the user can confirm various types of confirmation regarding the job regarding which printing has been interrupted, with the information "2" and the information "4" displayed in the notification space 902 along with the information "5".

For example, by confirming these three types of information, the operator can confirm that "two minutes after the printing execution request of the job X was accepted, the printing operations of the job X were interrupted due to running out of the printing medium necessary for the printing operations of the job X".

The control unit 108 enables the operating unit 102 to perform the display illustrated in FIG. 16 and also FIGS. 21 and 24 as an example of the "particular display" according to the present embodiment, in order to serve such a role as well.

Information "6" to be Presented in Display Space 902

This information "6" is an example of information enabling the user to identify the progress status of the interrupted job, when interruption occurred. The display control example according to the present embodiment shown in FIG. 16 discloses a configuration wherein the control unit 108 effects control such that the operator of the printing system 100 can identify through the notification space 902 how far the job regarding which printing has been interrupted had progressed immediately before the printing operations thereof were interrupted in step S609.

With the display control example shown in FIG. 16, the information "6" along with the information "3" described above in the notification space 902 enable the user to confirm the following information by way of the notification space 902.

For example, the job X regarding which printing has been interrupted in step S609 is a job which needs to be executed under the conditions of 50 copies of original data of 50 pages, printed on one side of a recording medium of the size of A4 size and type of plain paper. The job X regarding which such printing operations are required has already been printed to the 40th page of the 4th copy at the point immediately before the interruption of printing.

This discloses a configuration wherein the control unit 108 effects control such that the operator of the printing system 100 can identify through the notification space 902 all of the following three types of confirmation illustrated exemplarily, Confirmation 1 through Confirmation 3.

Confirmation 1: Confirmation of what printing operations with what sort of printing conditions the interrupted job needs.

Confirmation 2: Confirmation regarding the total printing volume of the interrupted job, such as whether the job is a large-scale job or a small-scale job.

Confirmation 3: Confirmation of how much of the printing of the interrupted job had been completed immediately before the printing interruption.

These various types of confirmation can be made by the UI screen shown in FIG. 16.

Information "7" to be Presented in Display Space 902

This information "7" is an example of information enabling the user to identify how much printing processing is necessary to complete all processing of the interrupted job.

The present embodiment discloses a configuration wherein the control unit 108 effects control such that the operator of the printing system 100 can identify through the notification space 902 the number of sheets and amount of time necessary from resuming printing to printing completion of the interrupted job.

For example, the display control example shown in FIG. 16 discloses a configuration wherein the operator of the printing system 100 can identify through the notification space 902 that the number of pages remaining from resuming printing to printing completion of the job X is 10 pages, and the amount of time required for this is 15 seconds.

Note that with the present embodiment, the control unit 108 controls the notification space 902 to make notification of this information "7", which is obtained as the result of performing calculations based on the above-described information "3" and information "6" presented in the notification space 902 and the capabilities information of the printing system 100.

For example, in this example in FIG. 16, the control unit 108 identifies the processing conditions of the job X to be displayed in the notification space 902 by reading out and references the job information of the job X held in the memory 109 in step S610 earlier, as the information "3".

Also, the control unit 108 identifies the progress information of the job X, regarding how much of the printing operations of the job X regarding which printing at the printer unit 104 has been interrupted in step S609 due to the "out of printing paper error" had been completed at the point immediately before being interrupted, as the information "6". The control unit 108 refers to the job information of the job X already held in the memory 109 in step S610 so as to perform identification of the information "6" as well.

Based on the information "3" and the information "6", the control unit 108 first calculates the number of sheets remaining necessary for completing the printing of the job X. Specifically, a value obtained by subtracting the processed printing amount of the job X processed up to immediately before interruption of the job X from the total printing amount of the job X, which is how many copies of how many pages each are to be printed, is determined to be the remaining printing amount of the job X. The control unit 108 also confirms the capabilities of the printer unit 104, regarding how many pages can be printed per minute, the capabilities of the finisher of the printing system 100, and so forth, which are registered in the memory 109 are specifications information of the printing system 100. the amount of time from resuming printing until completion of printing is calculated based on the capabilities information of the printing system 100 and the number of printing sheets remaining for the job X that has been calculated above. The control unit 108 controls the operating unit 102 so as to display these two calculation results as information "7" on the notification space 902.

With the present embodiment, the control unit 108 generates the information "7" by the above generating method, but any method may be employed. In other words, any configuration may be used as long as information such as information "7" is presentable to the operator of the printing system 100 upon removal of the cause of printing interruption, for example, as an arrangement giving consideration to the productivity of multiple jobs which is of great importance in a POD-based printing environment.

Further, The UI screen 900 having this notification space 902 which the control unit 108 causes the operating unit 102 to display is configured so as to also have the following display components.

Display Component 3: Information Notification Space 903 Regarding Job Being Printed at the Point that Cause of Printing Interruption is Removed This notification space 903 is an example of a display which the control unit 108 displays with the UI unit, for enabling notification to the user regarding information relating to a job itself which satisfies the following two conditions.

Condition 1: That the Job be Capable of Being Printed by the Printer Unit 104 Without Being Affected by the Cause of Printing Interruption.

Condition 2: That the job be undergoing printing execution at the printer unit 104 at the precise moment that the control unit 108 has confirmed that the cause of printing interruption of the interrupted job (job X in this example) has been removed by intervention of the operator at the printing system 100.

With the display control example shown in FIG. 16, a configuration is disclosed wherein the control unit 108 effects control such that the operator of the printing system 100 can be notified through the notification space 903 regarding information relating to the job Y itself as a job which satisfies both this Condition 1 and Condition 2.

In step S616, the control unit 108 has started the printing operations of the job Y during the printing interruption of the job X. The control unit 108 effects control based on rule information equivalent to the above Condition 1 held in the HD 209 beforehand as management information.

Further, the control unit 108 has confirmed that the operator has removed the cause of printing interruption of the job X during printing execution of the job Y at the printer unit 104 in the printing system 100. In other words, the control unit 108 has confirmed that the job, which is being printed by the printer unit 104 precisely at the point in time that the cause of printing interruption of the job X has been removed, is the job Y. This configuration means that the present embodiment discloses a configuration wherein the control unit 108 effects control based on rule information equivalent to the above Condition 2 held in the HD 209 beforehand as management information.

With the display control example in FIG. 16, the job which satisfies both of the Condition 1 and the Condition 2 is the job Y, so the control unit 108 effects control of the UI unit such that information relating to the job Y itself can be notified to the user via the notification space 903.

For example, let us say that the printer unit 104 is executing printing operations of the job X, regarding which the control unit 108 has permitted starting of printing in step S603 upon receiving a printing execution request for the job X via the UI unit. The control unit 108 has then received a printing execution request for the job Y, which is a subsequent job, during execution of printing of the job X, by the UI unit of the present embodiment. Further, let us say that following this, the control unit 108 has received a printing execution request for another job Z as a subsequent job, which is a separate job from the job Y, during execution of printing of the job X. Thus, we are saying that the jobs Y and Z regarding which printing execution requests have been received while the job X is being printed at the printer unit 104, are taken by the control unit 108 and are standing by in the memory 109 as subsequent jobs in printing standby.

Assuming this situation, we will say that subsequently, an "out of printing paper error" for sheets with a size of A4 and type of plain paper occurs at the printing apparatus 101. Upon the cause of printing interruption occurring for the job X, the control unit 108 controls the printer unit 104 so as to interrupt the printing operations of the job X.

At the same time, the control unit 108 reads out and references the printing conditions data of the job Y held in the memory 109 at the point that the printing execution request was accepted, thereby identifying what sort of printing operations this job Y requires. Consequently, let us say that the control unit 108 has confirmed that the job Y is a job which requires printing on sheets of an A3 size and a plain paper type. We will further say that the control unit 108 has confirmed that the "sheets of A3 size and plain paper type" which the job Y needs for printing are available in a sheet supplying unit of the printing apparatus 101.

Let us say that through these two confirmations, the control unit 108 has identified that the job Y exists in the memory 109 as a job regarding which printing operations can be completed with printing processing conditions not dependent on the cause of printing interruption of the job X which is a job regarding which printing has been interrupted.

Let us say that based on these identifying results, in step S616 the control unit 108 has started printing operations of the job Y at the printer unit 104, with the printing operations of the job X remaining in an interrupted state by the printing system 100. Now, even during the execution of the printing operations of the job Y at the printer unit 104, the control unit 108 monitors whether or not there has been supply of the "sheets of A4 size and plain paper type" by intervention of the operator, which amounts to a removal of the cause of printing interruption of the job X.

Assuming the above situation, let us say that the control unit 108 has confirmed that the printing operations of the job Y at the printer unit 104 have been completed in a state wherein the interruption cause of the job X is unresolved in the system 100 (in this case, the sheets for the job X have not been supplied). In this case, the control unit 108 makes a "YES" determination in step S617 as a determination for the job Y, and returns the processing from step S617 to the S611 side. Also, at the step S611 to which transition has been made to, the control unit 108 determines whether or not the job Z which follows the job Y is a job regarding which printing operations can be completed with printing processing conditions not dependent on the cause of printing interruption of the job X. At the same time, the control unit 108 reads out and references the printing conditions data of the job Z held in the memory 109 at the point that the printing execution request was accepted, thereby identifying what sort of printing operations this job Z requires. Consequently, let us say that the control unit 108 has confirmed that the job Z is a job which requires printing on sheets of an A4 size and a recycled paper type. We will further say that the control unit 108 has confirmed that the "sheets of A4 size and recycled paper type" which the job Z needs for printing are available in a sheet supplying unit of the printing apparatus 101.

Let us say that through these two confirmations, the control unit 108 has identified that the job Z exists in the memory 109 as a job, other than the job Y, regarding which printing operations can be completed with printing processing conditions not dependent on the cause of printing interruption. We will also say that the control unit 108 has confirmed that the cause of printing interruption of the job X is still unresolved at the current point. In this case, the control unit 108 moves the processing from step S611 to step S616 again. That is to say, the control unit 108 advances the flow to the processing in step S616 to which it had already gone earlier due to having permitted starting of printing of the job Y, this time for processing of the job Z.

The control unit 108 which has made transition to the step S616 again starts printing operations of the job Z, which is a job subsequent to the job Y, at the printer unit 104, with the printing operations of the job X remaining interrupted at the printing system 100. Now, even during the execution of the printing operations of the job Z at the printer unit 104, the control unit 108 monitors whether or not there has been supply of the "sheets of A4 size and plain paper type" by intervention of the operator, which amounts to a removal of the cause of printing interruption of the job X.

According to the above-described configuration, the control unit 108 effects control such that the printer unit 104 can continuously print as many "multiple subsequent jobs which are not affected by the cause of printing interruption of the interrupted job", such as the job Y and the job Z during the interruption period of an interrupted job such as exemplarily illustrated by the job X.

Now, let us say that, assuming the above configuration, at the step S616 to which the flow has made transition, during printing operations of the job Z regarding which the control unit 108 has started printing at the printer unit 104, the control unit 108 confirms that the operator of the printing system 100 has removed the cause of printing interruption of the job X.

That is to say, we will say that the control unit 108 has confirmed that at the printing system 100, the operator has removed the cause of printing interruption of the job X, which is a job regarding which printing has been interrupted, during printing execution at the printer unit 104 of the job Z which the control unit 108 has permitted starting of following completion of printing of the job Y. Note that this is an example of the control unit 108 confirming that sheets which are A4 size and plain paper sheets have been supplied to the sheets supplying unit of the printing apparatus 101 as an intervention operation by the operator, which amounts to resolving of the cause of printing interruption of the job X.

Based on these confirmation results, the control unit 108 causes the UI unit according to the present embodiment to execute display of the UI screen 900 such as exemplarily illustrated in FIGS. 16, 21, and 24, as an example of the above "particular display".

However, with this case, the control unit 108 controls the UI unit of the present embodiment so as to forbid notification to the user of the printing system 100 regarding information of the job Y via the notification space 903 of the UI screen 900, which is an exemplarily illustrated example of the above "particular display". Also, in this case, the control unit 108 controls the UI unit of the present embodiment so as to notify the user of the printing system 100 regarding information of the job Z via the notification space 903 of the UI screen 900, which is an exemplarily illustrated example of the above "particular display".

According to the above configuration, the job Y and the job Z are both jobs which meet the above Condition 1, i.e., are promoted printing jobs. However, due to the above-described configuration of the printing system 100 for improving productivity, the printing operations of the job Y preceding the job Z have already been completed before removing the cause of printing interruption of the job X. In other words, at the point that the cause of printing interruption of the printing job X was removed, the job being printed by the printer unit 104 is not the job Y but the job Z which is the subsequent job regarding which a printing execution request has been received following that of the job Y.

That is to say, in this case, the job Y is a job which satisfies Condition 1 but does not satisfy Condition 2, and the job Z is a job which satisfies both Condition 1 and Condition 2.

Accordingly, with this case, even in the event that the job Y is a job which is a promoted printing job regarding which starting of printing can be permitted in step S616, the control unit 108 which following the control rules forbids notification of the information of the job Y at the UI unit via the notification space 903. Further, in this case, the control unit 108 follows the control rules to control the UI unit of the present embodiment so as to notify the user of the printing system 100 regarding information of the job Z via the notification space 903 of the UI screen 900, which is an exemplarily illustrated example of the above "particular display".

Now, with this example, the control unit 108 displays the information of the job Y in the notification space 903, upon the control unit 108 having determined that the job Y satisfies both Condition 1 and Condition 2, and description will be further made based on this control example. That is to say, we will say that the job Y is a job which requires printing operations with printing processing conditions not affected by the cause of printing interruption of the job X, and also is a job which is being printed by the printer unit 104 at the point that the cause of printing interruption of the job X as removed at the printing system 100. Upon confirmation thereof, the control unit 108 controls the UI unit of the present embodiment so as to be able to notify information relating to the job Y itself in the notification space 903.

Now, with the present embodiment, the control unit 108 uses various types of information for confirming whether or not a subsequent job, regarding which a printing execution request has been received following the job regarding which printing has been interrupted, meets the Condition 1 and Condition 2. For example, the control unit 108 makes such confirmation by using information relating to the printing processing condition data of each job requiring printing operations held in the memory 109, remaining information of consumables of the printing system 100 (sheets, toner, staples, etc.), the operating status of the printing system 100, status information of job processing, and so forth.

The information which the control unit 108 notifies with the notification space 903 is information relating to the job Y itself in this example. This job Y is a job which the control unit 108 displays in the notification space 903 as a job which satisfies both the Condition 1 and Condition 2.

For example, with this example, the Job Y is a job satisfying both Condition 1 and Condition 2, and accordingly, the control unit 108 displays the job information relating to the job Y in the notification space 903. In other words, this means that the job Y is a job which is currently being printed by the printer unit 104 at the point that the operator of the printing system 100 has removed the cause of printing interruption of the job X regarding which printing has been interrupted.

Accordingly, with the present embodiment, a job satisfying both Condition 1 and Condition 2 can be displayed as a "job currently being printed" on the UI screen 900 such as exemplarily illustrated in FIGS. 16, 21, and 24, as an example of the above "particular display". This configuration is also an arrangement for improving the advantages which can be obtained by the present embodiment, such as providing excellent operability which the operator of the system 100 can intuitively understand.

In light of this, with the present embodiment, it should be noted that there are portions in the description of the embodiment and in the drawings with expressions such as a "job currently being printed", which means a job satisfying both Condition 1 and Condition 2 in the present embodiment.

The display control example shown in FIG. 16 exemplarily illustrates a configuration wherein the control unit 108 controls the operating unit 102 so as to enable notification of the detailed information listed below to the user as detailed information relating to the job exemplarily illustrated as this "job currently being printed" via the notification space 903.

Information "1" to be Presented in Display Space 903

This Information "1" is an example of information enabling the user to identify the processing conditions of a job currently being printed. The present embodiment discloses a configuration wherein the operator of the printing system 100 can identify through the notification space 903 the printing processing conditions of the job Y, which is what printing operations are necessary as the series of printing operations necessary for completing processing of the job Y.

With the display control example shown in FIG. 16 for example, the total number of pages of the document for the job Y is "100 pages", the total number of copies necessary for the printing operations of the job Y is "five copies", and executing finishing with the finisher provided to the printing system 100 on the printed articles of the job X is unnecessary. Disclosed is a configuration wherein the control unit 108 effects control such that the operator of the printing system 100 can identify through the notification space 903 that the printing processing conditions exemplarily illustrated here are set as the series of processing conditions necessary for the series of processing operations for the job Y. Note that an arrangement may be made wherein the information to be presented as information "1" in the display space 903 is of exactly the same items as the items for the printing processing conditions to be presented as the information "3" in the display space 902. However, with the present embodiment, the configuration illustrated is employed so as to reduce unnecessary displaying of information and present only necessary information, as much as possible.

Information "2" to be Presented in Display Space 903

This Information "2" is an example of information enabling the user to identify how much more printing processing needs to be performed in order to completely end all processing necessary for the job currently being printed. With this example, the job Y is a job currently being printed at the printer unit 104. Accordingly, the control unit 108 effects control such that the operator of the printing system 100 can identify through the notification space 903 how much more printing of the job Y needs to be performed to complete printing of the job.

The information "2" is configured as a clear statement in the form of a sentence, regarding how many copies of how many pages each need to be printed to complete the printing of the job currently being printed. For example, with the display control example shown in FIG. 16, a configuration is disclosed wherein the control unit 108 effects control to display on the UI unit information that "the job Y currently being printed needs printing of two copies of 100 pages each to be completed".

Also, the control unit 108 controls the UI unit so as to enable notification via the notification space 903 the amount of time for the job currently being printed to end, as this information "2". For example, with the display control example shown in FIG. 16, a configuration is disclosed wherein the control unit 108 controls the UI unit so as to enable notification via the notification space 903 to the user to the effect that "printing of the job Y currently being printed will be completed in 3 minutes".

Note that with the present embodiment, the control unit 108 checks the above information "1" which is to be displayed at the same time in the notification space 903, information for identifying the progress of the job regarding how much printing has been finished at the present point for the job currently be printed, and the capabilities information of the system 100. The control unit 108 controls the operating unit 102 so as to display in the notification space 906 results obtained by calculation based on this information as information "3". The calculation method and the like of generating the information "3" for display in the notification space 903 is the same as that of the information "7" for display in the notification space 902, and accordingly description thereof will be omitted here.

However, it should be noted that the control unit 108 controls the UI unit so that the information "3" displayed in the notification space 903 is constantly updated so as to make a real-time display.

In a state wherein the screen 900 is displayed on the operation unit 102, the control unit 108 controls the printing system 100 so as to continue printing operations of the job Y currently being printed even during the predetermined period up to instruction of the method for resuming the job X is input by the operators via the screen 900.

As described above, the printing system 100 is configured so as to continue printing operations to complete completion of processing of the job regarding which printing is currently being performed (job Y in this example) at least for a predetermined period (1 minute in this example) even with the screen 900 displayed by the UI unit.

Thus, a configuration is made such that even with the UI screen 900 displayed, the printing of the job currently being printed is continued, and as much progress as possible is made in the processing necessary for that job. Accordingly, the actual progress status of the job changes in real-time.

Accordingly, the present embodiment has a configuration wherein the information presented as information "2" in the notification space 903 reflects the actual progress status of printing operations by the printer unit 104 for the job currently being printed.

Thus, the fact that the information "2" presented in the notification space 903 in the display in the UI screen 900 which is one example of the "particular display" according to the present embodiment, differs from the information "7" presented in the notification space 902 therein, is also a feature of the present embodiment.

Note however, that any method may be employed to generate the information "2". That is to say, any configuration may be used as long as information such as information "1" is presentable to the operator of the printing system 100 upon removal of the cause of printing interruption.

With the present embodiment, the UI screen 900 display serving as an example of the "particular display" exemplarily illustrated in FIGS. 16, 21, and 24, is configured having three types of display components that have already been described, which are the display of the notification space 901, display of the notification space 902, and display of the notification space 903, hereafter also referred to as display components 1, 2, and 3.

As described above, the three types of display components 1, 2, and 3, which are the notification spaces 901, 902, and 903, are configured to serve as an information notification function to the operator of the printing system 100.

Accordingly, with the present embodiment assuming the above configuration, the three types of display components 1, 2, and 3, are components of the "particular display", regardless of dynamic determination factors which dynamically change according to the status of the system 100.

Thus, the present embodiment has a configuration serving as a guidance function for the operator to explicitly instruct the method for resuming an interrupted job (job X in this example) via the display of the screen 900, which is an example of the "particular display" according to the present embodiment.

For example, the control unit 108 controls the UI unit according to the present embodiment so that the notification spaces 901, 902, and 903 are in a valid displays state on the screen 900, regardless of the display of the screen 900 serving as an example of the "particular display" such as illustrated in FIG. 16, 21, or 24.

Note that with the present embodiment, an example of a "dynamic determination factor" is "information relating to the processing conditions of a job requiring execution of printing operations at the printing system 100", necessary at the time of the control unit 108 executing various types of display control and job processing control disclosed with the present embodiment. In other words, this information is information which enables the control unit 108 to confirm what sort of printing operations under what printing conditions the job which requires printing operations at the system 100 requires. Also, with the present embodiment, information relating to the number of jobs in printing standby in memory 109 is also a dynamic determination factor.

According to the present embodiment having the configuration described above, an arrangement can be presented for realization for a printing system product, which is not restricted to the office environment alone but also takes into consideration a POD-environment-based printing environment. For example, operability can be improved, such as providing operations support for the operator operating the screen 900 to determine what timing would be optimal for resuming the printing operations of an interrupted job (job X in this example) when the cause of printing interruption has been removed.

For example, according to the present embodiment having the configuration described above, in addition to the above advantages, operability can be improved, such as at the time of the operator explicitly instructing the method for resuming the interrupted job, the operator is prompted to operate the screen 900 so make a suitable judgment not just taking into consideration the one interrupted job (job X in this case) but also taking into consideration (1) the relation to the job currently being printed (job Y in this case) and (2) the degree of progress of these jobs and comparison thereof, i.e., to take into consideration the state of both jobs.

According to the present embodiment having the configuration described above, in addition to the above advantages, operability can be improved, such as at the time of the operator explicitly instructing the method for resuming the interrupted job, the operator can resume printing operations of the interrupted job with a recovery method which the user operating the screen 900 desires, under an operating environment taking into consideration the multiple jobs requiring printing at the printing system 100, including not only the interrupted job (job X in this example) and the job currently being printed (job Y in this example), but also further subsequent jobs (job Z in this example).

Assuming a POD-based printing environment, the greatest purveyor of such printing system 100 will most likely be commercial printing firms which take orders for printing from customers, and create printed articles, using the printing system 100. Upon the printed articles being delivered to the customer, the commercial printing firm is paid by the customer.

In such a POD-based printing environment, the present printing systems 100 is not simply a tool for assisting business in the office environment, but rather can be said to be a business tool for producing products for which the business is paid by the customer.

Moreover, there will most likely be demand for the printing system 100 to have capabilities to process printing requests from customers in a shorter amount of time, and at the same time to take and process a greater amount of printing requests. In other words, with such a POD-based printing environment, how efficiently multiple jobs can be processed, i.e., overall productivity, will most likely carry great importance.

Also, in a POD-based printing environment, it is expected that various types of printing requests will come from a wide variety of customers, and will include a great number of large-scale jobs (jobs which involve a great number of sheets to be printed). Further, cases wherein such large-scale jobs are concentrated in certain periods are expected for the printing system 100.

Taking this into consideration, there will be demand from the market such as the POD market for a printing system 100 which can handle a variety of multiple jobs with high efficiency and productivity, while taking into consideration the deadlines from the customers.

Thus, it can be readily assumed that a POD-environment-based printing environment will be quite different from an office environment, both in usage cases and in user needs.

Rephrasing the description made above with the embodiment given in exemplary form, printing apparatuses and printing systems described as background art are capable of job recovery functions can be sufficiently satisfactory in office-environment-based printing environments. However, such conventional printing apparatuses and printing systems may be capable of job recovery functions but cannot solve problems given below in exemplary from which occur in POD-environment-based printing environments. More specifically, with such conventional printing apparatuses and printing systems capable of job recovery functions, no consideration has been given to usage cases and user needs unique to the POD environment, which can occur in POD-environment-based printing environments. The very fact that this point is taken into consideration is an example of an important feature of the present embodiment, and the present embodiment is configured so as to be capable of solving problems given below in exemplary from which occur in POD-environment-based printing environments.

For example, a configuration might be able to be provided wherein printing of the job Y can be started during printing interruption of the job X, by expanding conventional printing apparatuses and printing systems capable of job recovery functions described as background art. Further, these might be further expanded for example, to enable resuming of printing of the job X following completion of printing of the job Y. However, let us say that the job Y of which printing process was started due to the printing of the job X being interrupted, is a large-scale job which requires printing on a large number of sheets. In this case, with the printing system having the above-described job recovery function, the job X will have to stand by for a long time before printing thereof is resumed. In other words, regardless of how speedily the printing interruption cause is for the job X recovered from, printing of the job X cannot be resumed until printing of the job Y ends. It is readily conceivable that such a situation could occur even though the job X is almost completely finished.

In an office environment, such usage cases are scarce, so little attention has been paid to them. In such an environment, a user X is only concerned about his/her own printing job X, and does not give consideration to a printing job Y of another user Y, while the user Y is only concerned about his/her own printing job Y, and similarly does not give consideration to the printing job X of the user X. This is due to the office-environment-based printing environment wherein individuals print their own documents, wherein the recipient of a printed article issues a printing request to the printing system and picks up the printed article from the sheet discharge unit of the printing system himself/herself.

However, the situation in this example is of great concern in a POD-based printing environment, where how efficiently and productively such a crunch of multiple large-scale jobs can be handed is of great importance. The present embodiment takes into consideration expected demand from the POD market to deal with this issue, and accordingly, the printing system 100 according to the present embodiment is configured so as to be capable of solving the problems listed above.

Particularly noteworthy is the fact that even if a printing system capable of handling the above problems were configured, other problems can be expected as well, and that the printing system 100 according to the present embodiment is configured so as to be capable of solving the new problems expected in the POD-based printing environment, in addition to the problems listed above.

For example, let is examine a configuration where the above problem is handled by an arrangement wherein the processing of the job Y, which has been started while printing of the job X is interrupted, is forcibly stopped upon the operator removing the interruption cause of the job X. Such a configuration could affect the printing results of the job Y depending on the contents of the job Y, such as particular types of post-processing which the job Y might include.

The present embodiment takes into consideration expected demand from the POD environment to deal with this issue, and accordingly, the printing system 100 according to the present embodiment is configured so as to be capable of solving the problems listed above.

Due to the above reasons with the present embodiment, the control unit 108 is configured so as to be capable of performing various types of control assuming not only the office environment but also the POD-based printing environment, as described above. A particularly important component of the present embodiment is the "particular display", whereby various types of control related thereto can be executed.

The exemplarily illustrated display components 4, 5, and 6, are components for enabling the operator to explicitly input, via the UI unit of the present embodiment, instructions for specifying a resuming method (recovery method) of the printing operations of an interrupted job regarding which the cause of printing interruption has been removed (job X in this example).

Also, with the present embodiment, the display components 4, 5, and 6 are also "components regarding which dynamic control is executed based on dynamic determination factors".

Further, with the present embodiment, the display components 4, 5, and 6, are components for enabling the operator to explicitly input, via the UI unit of the present embodiment, instructions for specifying the timing for resuming printing of the interrupted job, i.e., the time at which to restart execution at the system 100 of the printing operations of the interrupted job (job X in this example) regarding which the operator has removed the cause of printing interruption during the printing execution period of a job currently being printed (job Y).

Note that with this embodiment, the UI screen 900 is provided with the display components 4, 5, and 6, such that the operator can explicitly and selectively specify a resuming method for the interrupted job (job X in this case) from up to three general selection candidates (selection options). With the present embodiment the display component 4 is provided as a first selection option of the three types of selection options, the display component 5 is provided as a second selection option, and the display component 6 is provided as a third selection option.

With the present embodiment, the control unit 108 controls the operating unit 102 so as to display an operation instruction key 904 provided to the UI screen 900 according to the present embodiment, for responding to intuitive touch-panel operations made by the operator, as one example of the display component 4.

Also, with the present embodiment, the control unit 108 controls the operating unit 102 so as to display an operation instruction key 905 provided to the UI screen 900, for responding to intuitive touch-panel operations made by the operator, as one example of the display component 5.

The control unit 108 controls the operating unit 102 so as to display an operation instruction key 906 and detailed setting space 907, provided to the UI screen 900, so as to be capable of responding to intuitive touch-panel operations made by the operator, as one example of the display component 6.

Assuming the above configuration, with the present embodiment, the control unit 108 controls the operating unit 102 so as to make valid display on the UI screen 900 of the display components 4, 5, and 6, whereby the operator can explicitly and selectively specify a resuming method for the interrupted job (job X in this case) from up to three general selection candidates (selection options).

Further, the control unit 108 confirms what sort of printing operations of what printing processing conditions the job currently being printed (job Y in this example) needs, when the cause of printing interruption of the interrupted job (job X in this example) is removed. Based on the confirmation results, the control unit 108 controls the operation unit 102 such that of the display keys (also called soft keys) 904, 905, and 906, corresponding to the above-described three types of selection operations, the key 905 corresponding to the second selection option is in a disabled display state on the screen 900. Accordingly, the control unit 108 forbids reception of user requests from the operator that use the key 905 corresponding to the second selection option.

Further, the control unit 108 confirms whether there are any jobs standing by in the memory 109, and if so, how many. Based on the confirmation results, the control unit 108 controls the operation unit 102 such that of the three types of selection operations, the key 906 and detailed setting space 907 corresponding to the third selection option are in a disabled display state on the screen 900. Accordingly, the control unit 108 forbids reception of user requests from the operator that use the key 906 and detailed setting space 907 corresponding to the third selection option.

Moreover, with the present embodiment, the display components 4, 5, and 6 are components enabling explicit input by the operator regarding the timing for resuming the interrupted job (job X in this example) at the time of the operator instructing the timing for resuming the interrupted job, while clearly taking into consideration the relation thereof as to the job currently being printed (job Y in this example).

For example, with the present embodiment, the display key (soft key) 904 which is the display component 4 is configured as a display component whereby the operator can clearly understand the content, "RESUME THIS JOB IMMEDIATELY AFTER PRINTING OF JOB CURRENTLY BEING PRINTED ENDS". Also, display key (soft key) 905 which is the display component 5, configured separately from the key 904, is configured as a display component whereby the operator can clearly understand the content, "IMMEDIATELY END PRINTING OF JOB CURRENTLY BEING PRINTED, AND RESUME THIS JOB". Thus, this configuration allows operation instruction portions which are equivalent to the selection operations which the operator of the system 100 can select to be provided, such as the display key 904, the display key 905 which of which the valid display state is dynamically restricted by the control unit 108 according to the job processing state, and so forth.

Thus, at the time of the operator instructing the timing for resuming printing of the interrupted job, the operator can operate the screen 900 so explicitly make a suitable judgment taking into consideration the relation to the job currently being printed (job Y in this case) and the degree of progress of these jobs. This is also advantageous in that, upon making such a determination, the selection option which the operator desires for the timing to resume printing operations of the interrupted job can be explicitly instructed through the display on the screen 900.

Moreover, with the present embodiment, the display key (soft key) 906 which is the display component 6 is configured as a display component whereby the operator can clearly understand the content "RESUME THIS JOB AFTER PRINTING OF JOBS CURRENTLY IN PRINTING STANDBY ENDS".

Thus, the operator can operate the screen 900 to explicitly make a suitable judgment taking into consideration not only the interrupted job (job X in this example) and the job currently being printed (job Y in this example), but also further subsequent jobs (job Z in this example) queued in the memory 109 and requiring printing operations with the printing system 100.

According to the present embodiment as described above, the operator can make determinations through the display of the screen 900 taking into consideration not only the interrupted job and not only the job currently being printed, but also the overall productivity of the multiple jobs which require printing operations at the printing system 100.

This is also advantageous in that, upon making a determination taking into consideration the overall productivity of the multiple jobs which require printing operations at the printing system 100, the selection option which the operator desires for the timing to resume printing operations of the interrupted job can be explicitly instructed through the display on the screen 900.

Moreover, with the present embodiment, the control unit 108 effects control so as to display with the operating unit 102 the screen 900 which has not only the display components 4, 5, and 6, but also the above-described display components 1, 2, and 3.

Further, as described above, the control unit 108 controls the operating unit 102 so as to display in the notification space 902, which is the display component 2, printing processing conditions, and the number of remaining sheets necessary for completing the printing of the job and the amount of time required, as information of the job which has been interrupted (job X in this case).

Also, the control unit 108 controls the operating unit 102 so as to display in the notification space 903, which is the display component 3, printing processing conditions, and the number of remaining sheets necessary for completing the printing of the job and the amount of time required, as information of the job which is currently being printed (job Y in this case), so as to make a comparison with the information presented in the display component 2.

Thus, with the present embodiment, at the time of the operator selecting one of the three selection options of the three types of display components 4, 5, and 6, information of the jobs of the display components 2 and 3 is displayed and presented to the operator so as to be clearly distinguishable and comparable. According to this configuration, the present embodiment can further obtaining the following advantages illustrated in exemplary form.

For example, this configuration can contribute as an aid to the operator for making decisions in operating the screen 900, such as, "Printing of the job X can be completed by printing just a little more. On the other hand, completion of printing of the job Y will still take a considerable amount of time. If so, it is more efficient to resume printing of the job X before completion of the printing of the job Y which is currently being printed so as to complete creation of the printed articles of the job X."

In another example, this can contribute as an aid to the operator for making decisions in operating the screen 900, such as, "Printing of the job Y can be completed by continuing printing for just a little longer. If so, it is more efficient to first complete the printing of the job Y which is currently being printed, than to resume printing of the job X."

Thus, a well-equipped operation support embodiment can be provided, wherein an operator, at a printing site in a printing environment such as a POD environment for example, who operates the system 100 while taking into consideration the overall productivity of multiple printing jobs, deadlines for printed articles set by customers, and so forth, can make more suitable decisions, at the time of selecting one of the above three selection operations through the screen 900.

Thus, improving information notifying functions by the display components 1, 2, and 3, in addition to the display components 4, 5, 6, furthers the advantages of the present embodiment.

Assuming the above configuration, specific control relating to the display components 4, 5, and 6, provided to the UI screen 900, along with the display components 1, 2, and 3, which the control unit 108 displays on the operating unit 102, will be described below.

Display Component 4: Display key 904, equivalent to an operating instruction unit configured such that an operator can explicitly input instructions for resuming printing operations of an interrupted job regarding which the cause of printing interruption has been removed, following completion of printing of the job currently being printed.

That is to say, the key 904 is the first selection option of the three selection options in the present embodiment, for a resuming method (resuming timing) of the printing operations of the interrupted job (job X in this example) regarding which the cause of printing interruption has been removed during the printing period of the job currently being printed (job Y in this example) at the printer unit 104.

Assuming this configuration, under the condition that the cause of printing interruption of the interrupted job (job X in this example) has been removed during the printing period of the job currently being printed (job Y in this example) at the printer unit 104, the control unit 108 permits display of the screen 900 with the operating unit 102 such that the key 904 is displayed in an enabled state on the screen 900.

Also, operator requests equivalent to the first selection option can be received via the key 904 displayed on the screen 900 in an enabled state, while continuing the printing operations of the job currently being printed (the job Y in this example) at the printer unit 104.

Now, with this configuration, let us say that the operator has pressed the key 904 displayed on the screen 900 in an enabled state by making a touch-panel operation on the screen 900 for example, and further that the OK key 908 on the screen 900 has been pressed. In this case, the control unit 108 takes this as a determination condition, and determines that the operator has made a first user request, as the method for resuming the printing operations of the interrupted job (job X in this example).

In the event of having received the first user request, which is equivalent to the first selection option of the three selection candidates, the control unit 108 forbids interrupting of printing operations of the job currently being printed (the job Y in this example) at the printer unit 104.

In this case, the control unit 108 controls the printing system 100 to leave resuming of the printing operations of the interrupted job until printing of the job currently being printed ends, even in the event that the cause of printing interruption has already been removed at this point.

Note that terms such as "end printing" or "complete printing" are used with regard to the present embodiment. These terms are used synonymously in the present embodiment.

In the event that the first user request has been made, the control unit 108 controls the system 100 so as to resume printing operations of the interrupted job (job X in this example) at the printer unit 104, after printing operations of the job currently being printed (the job Y in this example) at the printer unit 104 end.

For example, in the case of the display control example in FIG. 16, the control unit 108 effects control so as to complete all printing operations of the job Y, this job Y requiring a series of printing operations necessary for printing five copies of printing data having 100 pages under the printing processing conditions of the job Y.

Accordingly, in the display control example in FIG. 16, the control unit 108 identifies that this job Y needs two more copies printed of 100 pages each, based on the processing conditions data and progress information relating to job Y. Accordingly, the control unit 108 causes the printing system 100 to continue on and perform the printing operations for the remaining 100 pages×2 copies remaining in the job Y.

Let us say that the control unit 108 then confirms that the printing operations of the job Y have ended, based on the status information from the printer unit 104. Upon receiving this, the control unit 108 forbids starting of printing of any subsequent job (job Z in this example) in the memory 109 but rather leaves the subsequent job in the printing standby state, and resumes printing operations of the job X by the printing system 100. At the time of resuming the printing operations of the job X, the control unit 108 confirms how far the job X had progressed up to immediately before the interruption in step S609, based on progress information of the job X, and also confirms the printing processing conditions of the job X. Thereupon, the control unit 108 causes the printing system 100 to execute printing processing of the incomplete portions of the job X as printing processing necessary for resuming the printing processing of the job X.

For example, in the case of the display control example in FIG. 16, the control unit 108 effects control so as to confirm that the job X, is a job requiring a series of printing operations necessary for printing five copies of printing data having 50 pages under the printing processing conditions of the job X. Further, the control unit 108 identifies that this job X needs 10 more pages to be printed to be completed, based on the printing conditions data and progress information relating to the job X. Accordingly, the control unit 108 causes the printing system 100 to execute the printing processing for printing the remaining 10 pages of the job X which had been unprocessed due to the interruption. Thus, the control unit 108 completes the series of printing operations necessary for printing of the job X, which have been resumed immediately following completion of printing of the job Y.

At this point, in the event that there is a subsequent job (job Z in this example) standing by for printing in the memory 109 for example, the control unit 108 permits starting of the printing operations of the subsequent job under the condition that the printing of the job X has been completed. Accordingly, the control unit 108 starts the printing operations necessary for printing of the subsequent job at the printing system 100, immediately following completion of printing of the job X.

Thus, upon receiving a first user request from the operator by the key 904 which is the display component 4, the control unit 108 controls the printing system 100 so as to process each job required printing processing at the system 100, in the printing order such as described above.

Note that the control sequence which the control unit 108 performs upon having received the first user request from the operator by the key 904 corresponds to the Printing Processing 1 of step S622 to which the flow proceeds upon a "YES" determination having been made in step S621 in FIG. 7B. Note that with the present embodiment, the control unit 108 executes the processing flow of step S801 through 810 in FIG. 22 as the detailed processing flow included in the Printing Processing 1 of step S622.

The present embodiment is configured so as to be able to receive user requests other than the first user request from the key 904 equivalent to the first selection option, through the screen 900. An example thereof is the key 905 which is the display component 5 equivalent to the second selection operation of the three selection candidates described above. This will also be described below with a specific example.

Display Component 5: Display key 905, equivalent to an operating instruction unit configured such that an operator can explicitly input instructions for resuming printing operations of an interrupted job regarding which the cause of the printing interruption has been removed, before completion of printing of the job currently being printed.

That is to say, the key 905 is the second selection option of the three selection options of which the operator can select in the present embodiment, for a resuming method (resuming timing) of the printing operations of the interrupted job (job X in this example) regarding which the cause of printing interruption has been removed during the printing period of the job currently being printed (job Y in this example) at the printer unit 104.

The above first user request which is equivalent to the first selection option is a user request for resuming printing operations of the interrupted job, following completion of the printing operations of the job currently being printed (job Y in this example).

Conversely, the above second user request which is equivalent to the second selection option is a user request for resuming printing operations of the interrupted job before completion of the printing operations of the job currently being printed (job Y in this example). Note that with the present embodiment, the second user request is handled as a user request wherein the printing operations of the job currently printing (job Y is this example) are interrupted, and immediately thereafter, the printing operations of the interrupted job of which the cause of printing interruption has been removed (job X in this case) are resumed.

However, in the present embodiment, with this second selection option, the control unit 108 controls the operating unit 102 so as to forbid the operator to make this selection, depending on the confirmation results regarding what sort of printing processing conditions there are for the job currently being printed.

As one example, with the present embodiment, the control unit 108 performs confirmation of the printing processing conditions of the job currently being printed (job Y in this case) before displaying the screen 102 on the screen 900, when the cause of printing interruption of the interrupted job (job X in this case) is removed. At this time, the control unit 108 reads out and makes reference to the printing processing conditions data of the job current being printed (job Y in this example) held in the memory 109.

Let us say that as a result, the control unit 108 has confirmed that the job currently being printed is a job which requires post-processing using post-processing members on the printed articles printed by the printer unit 104 (also called "sheet processing" or finishing processing"), using a post-processing device of the system 100 (e.g., the sheet processing device 230).

As described above, before displaying the screen 102 on the screen 900, when the cause interruption is removed, the control unit 108 has confirmed that the job currently being printed (job Y in this example) is a job which requires finishing processing on the printing media.

In this case, the control unit 108 forbids the operator to select this second selection option via the UI unit of the present embodiment. For example, with the present embodiment, the control unit 108 controls the operating unit 102 such that the operator cannot select this second selection option. The screen 900 is displayed on the operating unit 102, but the control unit 108 has controlled the operating unit 102 such that the key 905 is in a disabled display state in the screen 900.

Now, this disabled display control can be performed by a configuration wherein, as shown in FIGS. 21 and 24, this portion is displayed "grayed-out" or "hatched", or may not be displayed on the screen 900 at all.

Regardless of the configuration, in this case at least (a case wherein the job currently being printed (job Y in this example) is a job which requires finishing processing), the control unit 108 forbids any reception of the second selection option from the operator via the UI unit of the present embodiment. Thus, in this case, the control unit 108 forbids the printing system 100 from being controlled so as to resume printing operations of the interrupted job before completion of the printing operations of the job currently being printed.

Note that this is one example of an arrangement for suppressing occurrence of a new problem, which can occur in the above-described case of forcibly stopping the processing of the job Y when the cause of printing interruption of the job X is removed.

On the other hand, let us say that the control unit 108 has confirmed that the job currently being printed (job Y in this example) is a job which requires finishing processing, before displaying the operating unit 102 on the screen 900, when the cause of printing interruption is removed. In this case, the control unit 108 permits the operator to select this second selection option via the UI unit of the present embodiment. For example, with the present embodiment, the control unit 108 controls the operating unit 102 such that the operator can select this second selection option. As one example, with the present embodiment, as shown in FIGS. 16 and 21, the screen 900 is displayed on the operating unit 102, and the control unit 108 has controlled the operating unit 102 such that the key 905 is in an enabled display state in the screen 900.

In this case, control unit 108 permits reception of the second selection option from the operator using the key 905 in an enabled display state on the screen 900. This means that the control unit 108 effects control such that operator request equivalent to the second selection operation can be received while the printing operations of the currently printing job (job Y in this example) are continued at the printer unit 104.

Assuming this configuration, let us say that the operator has pressed the key 905 displayed on the screen 900 in an enabled state by making a touch-panel operation on the screen 900 for example, and further that the OK key 908 on the screen 900 has been pressed. In this case, the control unit 108 determines that the operator has made a second user request, as the method for resuming the printing operations of the interrupted job (job X in this example).

In the event of having received the second user request, which is equivalent to the second selection option of the three selection candidates to be represented to the operator by the screen 900, the control unit 108 permits interrupting printing operations of the job currently being printed (the job Y in this example) at the printer unit 104. In this case, the control unit 108 controls the printing system 100 to resume the printing operations of the interrupted job (job X in this example) before completing printing of the job currently being printed (job Y in this example) ends, so as to complete the printing operations of the interrupted job.

For example, in the case of the display configuration example in FIG. 16, in the event of receiving the second user request by the key 905 in a valid display state having been pressed, the control unit 108 interrupts (stops) the printing operations of the job currently being printed (job Y in this example), that is being printed at the printer unit 104.

At this time, the control unit 108 enables the progress of the job at the current point, regarding how far the job (job Y in this example) has been printed at the current point, so that this can be identified when resuming printing of this job later. As one example of this, the control unit 108 stores progress information for job Y at the current point in the memory 109, in a state correlated with the printing data and printing processing conditions data of job Y.

Thus, the printing operations of job Y is interrupted upon receiving the second user request from the operator, and following the interruption, the printing operations of the job X can be quickly resumed by the printing system 100.

Let us now say that is yet another subsequent job (job Z in this example) besides job X and job Y in this case in the memory 109. In this case as well, the control unit 108 does not start printing of the subsequent job following printing interruption of the job currently being printed (job Y in this example), but rather leaves the subsequent job in the printing standby state, and resumes printing operations of the interrupted job.

At the time of resuming the printing operations of the job X, the control unit 108 confirms how far the job X had progressed up to immediately before the interruption in step S609, based on progress information of the job X, and also confirms the printing processing conditions of the job X. Thereupon, the control unit 108 causes the printing system 100 to execute printing processing of the incomplete portions of the job X.

For example, the control unit 108 effects control so as to confirm that the job X is a job requiring a series of printing operations necessary for printing five copies of printing data having 50 pages under the printing processing conditions of the job X. Further, the control unit 108 identifies that this job X needs 10 more pages to be printed to be completed, based on the printing conditions data and progress information relating to the job X. Accordingly, the control unit 108 causes the printing system 100 to execute the printing processing for printing the remaining 10 pages of the job X which had been unprocessed due to the cause of printing interruption. Thus, the control unit 108 completes the series of printing operations necessary for printing of the job X, which have been resumed immediately following interruption of printing of the job Y.

Upon the printing operations of the job X, resumed following interruption of the job Y, being completed at the system 100, the control unit 108 resumes printing operations of the job Y which had been interrupted in order to resume printing of the job X. Let us now say that there is yet another subsequent job (job Z in this example) besides the job Y in this case in the memory 109 in a standby state. In this case as well, the control unit 108 does not start printing of the subsequent job following printing completion of the job X, but rather leaves the subsequent job in the printing standby state, and controls the printing system 100 so as to be capable of starting the printing operations of the job Y.

At the time of resuming the printing operations of the job Y, following completion of the printing of the job X, the control unit 108 confirms how far the job Y had progressed up to immediately before the interruption, based on progress information of the job Y, and also confirms the printing processing conditions of the job Y. Thereupon, the control unit 108 causes the printing system 100 to execute printing processing of the incomplete portions of the job Y.

Let us say that the control unit 108 then confirms that the printing operations of the job Y have ended, based on the status information from the printer unit 104. Upon receiving this, the control unit 108 confirms whether there is a subsequent job (job Z in this example) in printing standby in the memory 109.

At this point, in the event that there is a subsequent job (job Z in this example) standing by for printing in the memory 109 for example, the control unit 108 permits starting of the printing operations of the subsequent job under the condition that the printing of the job Y has been completed. Accordingly, the control unit 108 starts the printing operations necessary for printing of the subsequent job at the printing system 100, immediately following completion of printing of the job Y.

Thus, upon receiving a second user request from the operator by the key 905 which is the display component 5, the control unit 108 controls the printing system 100 so as to process each job which requires printing processing at the system 100, in the printing order as described above.

Note that the control sequence which the control unit 108 performs upon receiving the second user request from the operator by the key 905 corresponds to the Printing Processing 2 of step S624 to which the flow proceeds upon a "YES" determination having been made in step S623 in FIG. 7B. Note that with the present embodiment, the control unit 108 executes the processing flow of step S901 through 910 in FIG. 17 as the detailed processing flow included in the Printing Processing 2 of step S624.

Assuming the above configuration, the present embodiment is configured so as to be able to receive user requests other than the second user request from the key 905 equivalent to the second selection option, through the screen 900. An example thereof is the key 906 which is the display component 6 equivalent to the third selection option of the three selection candidates described above. This will also be described below with a specific example.

Display Component 6: Display key 906 and detailed setting space 907, equivalent to an operating instruction unit configured such that an operator can explicitly input instructions for resuming printing operations of an interrupted job regarding which the cause of printing interruption has been removed, following completion of printing of the job currently being printed and also following completion of printing of a job in printing standby in the memory 109.

The key 906 (including the detailed setting space 907) is the third selection option of the three selection options in the present embodiment, for a resuming method (resuming timing) of the printing operations of the interrupted job regarding which the cause of printing interruption has been removed during the printing period of the job currently being printed at the printer unit 104.

Making a more specific description, the above third user request which is equivalent to the third selection option is a user request for resuming printing operations of the interrupted job (job X in this example) regarding which the cause of printing interruption has been removed, following completion of the printing operations of the job currently being printed (job Y in this example), and also following completion of the printing operations of a job in printing standby (job Z in this example).

However, with the present embodiment, the control unit 108 controls the operating unit 102 such that this third selection option also becomes non-selectable by the operator depending on the results of confirmation regarding whether or not there is a job in printing standby in the memory 109 as another job besides the job currently being printed (job Y in this example) needing printing operations, at the point that the cause of printing interruption of the interrupted job (job X in this example) is removed.

As one example thereof, with the present embodiment, before displaying the screen 900 with the operating unit 102 upon the cause of printing interruption of the interrupted job (job X in this example) having been removed, the control unit 108 checks the printing queue managed in the memory 109. The control unit 108 also checks whether or not there is a printing standby job in the memory 109, as a job requiring printing operations, other than the interrupted job (job X in this example) and the job currently being printed (job Y in this example).

This case is a case wherein, before displaying the screen 900 with the operating unit 102 upon the cause of printing interruption of the interrupted job (job X in this example) having been removed, the control unit 108 confirms that there are no printing standby jobs in the memory 109.

In this case, based on the confirmation results, the control unit 108 forbids the operator from selecting this third selection option with the UI unit according to the present embodiment. For example, with the present embodiment, the control unit 108 controls the operating unit 102 such that selection of the third selection option is forbidden to the operator.

As one example, with the present embodiment, as shown in FIGS. 21 and 24, the screen 900 is displayed on the operating unit 102, but the control unit 108 has controlled the operating unit 102 such that the key 906 (including the detailed setting space 907) is in a disabled display state in the screen 900.

Now, this disabled display control can be performed by a configuration wherein, as shown in FIGS. 21 and 24, this portion is displayed "grayed-out" or "hatched", or may not be displayed on the screen 900 at all.

Regardless of the configuration, in this case at least (a case wherein there are no printing standby state jobs in the memory 109 other than the interrupted job and the job currently being printed), the control unit 108 forbids any reception of the third selection option from the operator via the UI unit of the present embodiment. This is to prevent the operator from making erroneous operations at the screen 900, and prevent the operator from making unsuitable decisions.

Let us say that the control unit 108 has confirmed that there is a printing standby state job in the memory 109, other than the interrupted job (job X in this example) and the job currently being printed (job Y in this example). For example, with this example, there is at least a job Z in the memory 109 besides the job X and job Y, as a printing standby job.

In this case, based on the confirmation results, the control unit 108 permits the operator to select this third selection option with the UI unit according to the present embodiment. For example, with the present embodiment, the control unit 108 controls the operating unit 102 such that the operator can make selection of the third selection option. As one example, with the present embodiment, as shown in FIGS. 16 and 24, the screen 900 is displayed on the operating unit 102, and the control unit 108 has controlled the operating unit 102 such that the key 906 (including the detailed setting space 907) is in an enabled display state in the screen 900.

In this case the control unit 108 effects control such that an operator request equivalent to the third selection option can be received via the key 906 (including the detailed setting space 907) in an enabled display state in the screen 900, while the printing operations of the currently printing job (job Y in this example) are continued at the printer unit 104.

Let us say that the operator has pressed the key 906 displayed on the screen 900 in an enabled state by making a touch-panel operation on the screen 900 for example, and further that the OK key 908 on the screen 900 has been pressed. In this case, the control unit 108 determines that the operator has made a third user request, as the method for resuming the printing operations of the interrupted job (job X in this example).

In the event of having received the third user request, the control unit 108 forbids interrupting printing operations of the job currently being printed (the job Y in this example) at the printer unit 104. In this case, the control unit 108 also forbids resuming printing operations of the interrupted job (job X in this example) before ending of printing (synonymous with "completion of printing") of the job standing by in the memory 109.

In this case, the control unit 108 controls the printing system 100 so as to resume printing operations of the interrupted job (job X in this example) at the printing unit 104 following the printing operations of the job currently being printed (job Y in this example) and also following printing operations of the printing standby state job (job Z in this example), thereby completing the printing operations of the interrupted job.

For example, in the case of the display control example in FIG. 16, the control unit 108 effects control so as to complete all printing operations of the job Y, this job Y requiring a series of printing operations necessary for printing five copies of printing data having 100 pages under the printing processing conditions of the job Y.

Accordingly, in the display control example in FIG. 16, the control unit 108 identifies that this job Y needs two more copies printed of 100 pages each, based on the processing conditions data and progress information relating to job Y. Accordingly, the control unit 108 causes the printing system 100 to perform the printing operations for the remaining 100 pages×2 copies remaining in the job Y. Let us say that the control unit 108 then confirms that the printing operations of the job Y have ended, based on the status information from the printer unit 104.

Even through ending of the printing operations of the job Y has been confirmed, this case is a case wherein the third user request has been made. Accordingly, even though the cause of printing interruption has been solved, the control unit 108 forbids starting of the interrupted job. Moreover, the control unit 108 places this interrupted job in a printing standby state in the memory 109. In this case, the control unit 108 keeps resuming of the printing operations of the job X in standby at least until the printing operations of the job Z, which are started upon ending of the printing of the job Y, end.

Upon confirming ending of printing of the job Y, and staring printing operations of the job Z, the control unit 108 confirms the printing processing conditions of the job Z. The control unit 108 then causes the printing system 100 to execute the series of printing operations which the job Z requires.

Subsequently, upon confirmation that the printing operations of the job Z have also ended, the control unit 108 resumes the printing operations of the interrupted job (job X in this example) at the printing system 100.

At the time of resuming the printing operations of the job X, the control unit 108 confirms how far the job X had progressed up to immediately before the interruption in step S609, based on progress information of the job X, and also confirms the printing processing conditions of the job X. Thereupon, the control unit 108 causes the printing system 100 to execute printing processing of the incomplete portions of the job X as printing processing necessary for resuming the printing processing of the job X.

For example, the control unit 108 effects control so as to confirm that the job X is a job requiring a series of printing operations necessary for printing five copies of printing data having 50 pages under the printing processing conditions of the job X. Further, the control unit 108 identifies that this job X needs 10 more pages to be printed to be completed, based on the printing conditions data and progress information relating to the job X. Accordingly, the control unit 108 causes the printing system 100 to execute the printing processing for printing the remaining 10 pages of the job X which had been unprocessed due to the cause of printing interruption.

Thus, the control unit 108 completes the series of all printing operations necessary for printing of the job X, which have been resumed following completion of printing operations of the job Y and the job Z.

Thus, upon receiving a third user request from the operator by the key 906 (including the detailed setting space 907) which is the display component 6, the control unit 108 controls the printing system 100 so as to process each job which requires printing processing at the system 100, in the printing order such as described above.

Note that with the present embodiment, the detailed setting space 907 is included in the display component 6 besides the key 906. The present embodiment is configured so as to be able to handle detailed operation requests relating to the third user request with the detailed setting space 907, as illustrated below in exemplary form.

For example, let us say that there are multiple jobs in standby in the memory 109 at the point that the key 906 in an enabled display state on the screen 900 is pressed by the user. Let us further say that the multiple jobs are three printing standby jobs, job Z1, job Z2, and job Z3, for example, in the memory 109. Further note that the reception order of printing execution requests for these jobs is job Z1, job Z2, and job Z3, in that order.

The embodiment as described above also handles cases wherein multiple printing standby jobs excluding the interrupted job (job X in this example) and the job currently being printed (job Y in this example) are present in the memory 109 at the point that the cause of printing interruption of the interrupted job has been removed from the printing system 100 by the operator.

Now, let us say that in the above case, the key 906 in an enabled display state on the screen 900 is pressed by the user. In this case, the control unit 108 controls the operating unit 102 such that the operator can specify after printing of which of the printing standby jobs should the printing operations of the job X be resumed, by way of the detailed setting space 907 in an enabled display state on the screen 900.

For example, in the event that there are the jobs Z1, Z2, and Z3, regarding which printing execution requests have been made in order, in the memory 109, as exemplarily illustrated in the above case, the control unit 108 effects the following control.

For example, let us say that the operator has input a "1" at the setting space 907B of the detailed setting space 907 in an enabled display state on the screen 900, by using the numeric keypad 405 on the operating unit 102. In the event that the operator has made such a setting, the control unit 108 performs two jobs, in the order of job Y→job Z1, and upon completion of all of the printing operations of these two jobs, controls the printing system 100 so as to resume the printing operations of the job X.

On the other hand, let us say that the operator has input a "2" at the setting space 907B of the detailed setting space 907 in an enabled display state on the screen 900, by using the numeric keypad 405 on the operating unit 102. In the event that the operator has made such a setting, the control unit 108 performs three jobs, in the order of job Y→job Z1→job Z2, and upon completion of all of the printing operations of these three jobs, controls the printing system 100 so as to resume the printing operations of the job X.

Or, let us say that the operator has input a "3" at the setting space 907B of the detailed setting space 907 in an enabled display state on the screen 900, by using the numeric keypad 405 on the operating unit 102. In the event that the operator has made such a setting, the control unit 108 performs four jobs, in the order of job Y→job Z1→job Z2→job Z3, and upon completion of all of the printing operations of these four jobs, controls the printing system 100 so as to resume the printing operations of the job X.

Thus, as described above, in the event that the key 906 in an enabled display state on the screen 900 is pressed by the operator, the control unit 108 controls the operating unit 102 such that the operator can specify after printing of which of the printing standby jobs should the printing operations of the job X be resumed, by way of the detailed setting space 907 in an enabled display state on the screen 900.

As described above, the present embodiment has various arrangements directed to realization of products with future digital printing systems in mind, and this configuration also has an arrangement assuming the following situation.

For example, with the present embodiment, the control unit 108 controls the operating unit 102 such that, following pressing the key 906 in an enabled display state on the screen 900, the operator can press the OK key 908 without operating the detailed setting space 907.

In other words, a configuration is made such that the control unit 108 determines that the third user request has been accepted even in the event that the OK key 908 is pressed immediately after pressing the key 906 in an enabled display state on the screen 900, without operating the detailed setting space 907.

Now, let us say that the operator presses the OK key 908 immediately after pressing the key 906 in an enabled display state on the screen 900, without operating the detailed setting space 907.

In the event that this operator setting has been made, the control unit 108 effects control such that resuming of printing operations of the interrupted job (job X in this example) regarding which the cause of printing interruption has already been removed stands by, until the printing operations of the last of the multiple jobs in printing standby state end. Upon the printing operations of the last job in the printing standby state ending, the control unit 108 controls the printing system 100 so as to resume the printing operations of the interrupted job. In other words, control equivalent to that described above is realized even without inputting "3" in the detailed setting space 907B.

This configuration means that in the event of receiving a third user request from the operator by pressing the key 906 in an enabled display state on the screen 900, the following request can be received from the operator as a default setting for the third user request.

Default Setting for Third User Request: Settings for resuming printing operations of the interrupted job following printing operations of the job at the rearmost position in the printing queue of printing standby jobs in the memory 109 excluding the interrupted job (job X in this example) and the job currently being printed (job Y in this example), regarding which the control unit 108 has received a printing execution request last.

Note that with the present embodiment, in the event of permitting enabled display of the key 906 on the screen 900, the control unit 108 controls the operating unit 102 such that the setting of the setting space 907A of the detailed setting space 907 in an enabled display state on the screen 900 is in a selected state. Accordingly, the operator is clearly notified that the above default state is in effect. This is another example of the advantages of improved operability according to the present embodiment.

In a POD-based printing environment, there will most likely be cases wherein the printing system 100 is running under predetermined scheduling, so as to process the widely-varied large-scale jobs from various clients in a proper order. In such a scheduled environment, having the apparatus to process situations under its own judgment may not be suitable.

Further, cases can be expected where printing jobs having similar processing conditions need to be continuously printed together in a concentrated period.

That is to say, in a POD-based printing environment, equipment such as printing apparatuses and the like are adjusted and inspected thoroughly, and then the apparatuses need to be continuously operated as much as possible. In such a situation, let us say that we queue multiple jobs with nothing in common with regard to printing processing conditions, such as the types and sizes of printing media used for the printing operations. In such a case, there may be situations wherein the preparatory operations before starting printing (e.g., temperature adjustment, switching sheet supplying units, adjustment of the transportation interval of printing media, and so forth) for each job becomes unnecessarily long. Accordingly, in a POD-based printing environment, there may be cases wherein printing jobs having similar processing conditions are continuously printed together in a concentrated period, in order to minimize such down time.

In light of this, a configuration wherein an interrupted job breaks into a queue where multiple printing standby jobs (jobs Z1 through Z3, other than the job X and job Y, in this example) have been scheduled so as to reduce down time as much as possible, without consent thereto, will lead to additional down time.

Accordingly, as described above, with the present embodiment, in the event of permitting enabled display of the key 906 on the screen 900, the control unit 108 controls the operating unit 102 such that the setting of the setting space 907A of the detailed setting space 907 in an enabled display state on the screen 900 is in a selected state.

The control unit 108 performs the above control in the event that the OK key 908 is pressed immediately after pressing the key 906 in an enabled display state on the screen 900, without operating the detailed setting space 907.

The control sequence which the control unit 108 performs upon having received the third user request from the key 906 (including the detailed setting space 907) corresponds to the Printing Processing 3 of step S625 to which the flow proceeds upon a "NO" determination having been made in step S623 in FIG. 7B. Note that with the present embodiment, the control unit 108 executes the processing flow of step S1001 through 1013 in FIG. 25 as the detailed processing flow included in the Printing Processing 3 of step S625.

As described above, the present embodiment has a configuration which assumes a POD-based printing environment and takes into consideration how to efficiently process multiple jobs at the printing system 100 with high productivity. This also holds true for the following configuration, which is also a configuration example for further improving the advantages of the present embodiment.

For example, with the present embodiment, upon the cause of printing interruption of the interrupted job (job X in this example) being removed during the printing period of the job currently being printed (job Y in this example), the control unit 108 displays the screen 900 with the operating unit 102, as described above.

Assuming this configuration, let us say that there is no request for any of the three types of user requests even after a predetermined amount of time has elapsed (one minute with this example, as mentioned earlier) from the point of displaying the screen 900 with the operating unit 102. It should be noted that the control unit 108 controls the printing system 100 so as to continue the printing operations of the job currently being printed at the printer unit 104. This point is according to the configuration already described, so details thereof will be omitted.

Thus, we say that one minute has elapsed from the point of displaying the screen 900 with the operating unit 102, without instruction of the resuming method (resuming timing) of the interrupted job (job X in this example) from the operator. A situation wherein one minute has elapsed without the operator pressing any of the keys 904, 905, or 906, falls under this case.

In this case, the control unit 108 controls the printing system 100 so as to automatically execute actions equivalent to the first selection option of the above three selection options.

Based on the confirmation results, the control unit 108 ends all of the printing operations of the job Y by continuing the printing operations of the job Y currently being printed. Subsequently, upon ending of the printing operations of the job Y, the control unit 108 resumes the printing operations of job X. Subsequently, upon ending of the printing operations of job X, the control unit 108 starts the printing operations of job Z.

As described above, in the event that the operator has removed the cause of printing interruption, but through intent or negligence has failed to make a selection at the screen 900, the first selection option, which is the considered to be the least risky of the selection options, is automatically selected. Thus, the control unit 108 controls the printing system 100 so as to perform the same operations as if the first user request had been made. This control is equivalent to the processing flow herein a "YES" determination is made in step S710 in FIG. 15 and the flow proceeds to step S711.

Thus, the present embodiment has a configuration which assumes a POD-based printing environment and takes into consideration how to efficiently process multiple jobs at the printing system 100 with high productivity, while reducing unnecessary work by the operator on-site.

Moreover, the control unit 108 controls the operating unit 102 so as to make a display in the notification space 901 in the event that the control unit 108 has automatically selected the first selection option, so as to not perplex the operator.

For example, in the event of displaying the screen 900 at the operating unit 102, the control unit 108 makes a display to the effect of "IF YOU DO NOT SELECT ANY OF THESE AFTER A CERTAIN AMOUNT OF TIME, (1) WILL BE AUTOMATICALLY SELECTED", as described above with the display component 1.

As described above, the term "current job" in the following description means a promoted printing job satisfying the above Condition 1 and Condition 2 as with the above job Y. Also, the series of procedures including procedures such as, interrupting a job to be executed at the system 100 upon occurrence of a cause of printing interruption with the job to be processed, and resuming the job to be executed at the system 100 upon the cause of printing interruption having been removed, are described in exemplary form with reference to FIGS. 7A and 7B. With the present embodiment, the processing in the flowcharts in FIGS. 7A and 7B is executed by the control unit 108 (including an unshown CPU) executing control programs stored in the memory 109, for example.

First Example

Interruption Processing and Resuming Processing Due to Occurrence of Out-of-paper The following is an example of control which the control unit 108 performs in the event that a job is entered and an interruption cause wherein sheets specified for the job being printed run out.

Note that here, description will be made from the processing wherein the control unit 108 performs confirmation in step S604 regarding the cause of printing interruption of the job to be printed which has occurred in step S603, for example.

In the event that a cause of printing interruption has been detected in step S604, the flow proceeds to step S609, and the job being printed is interrupted. In this example, a case wherein the A4 size sheets in the sheet tray 213 have run out will be described. As shown in FIG. 14, a picture of the photocopier shown in the sheet tray which has run out of sheets, and buttons for each of the trays, are displayed on the touch panel 301. FIG. 14 shows a warning screen on the touch panel 301 for a case wherein there are no sheets in the sheet cassette 1. A message to the effect that there are no more sheets, indicating the cause of printing interruption, is displayed to the upper left of the screen, as shown in FIG. 14. Upon the user pressing the OK key 1401, the screen on the touch panel 301 goes from that shown in FIG. 14 to that shown in FIG. 12.

Figure 12:
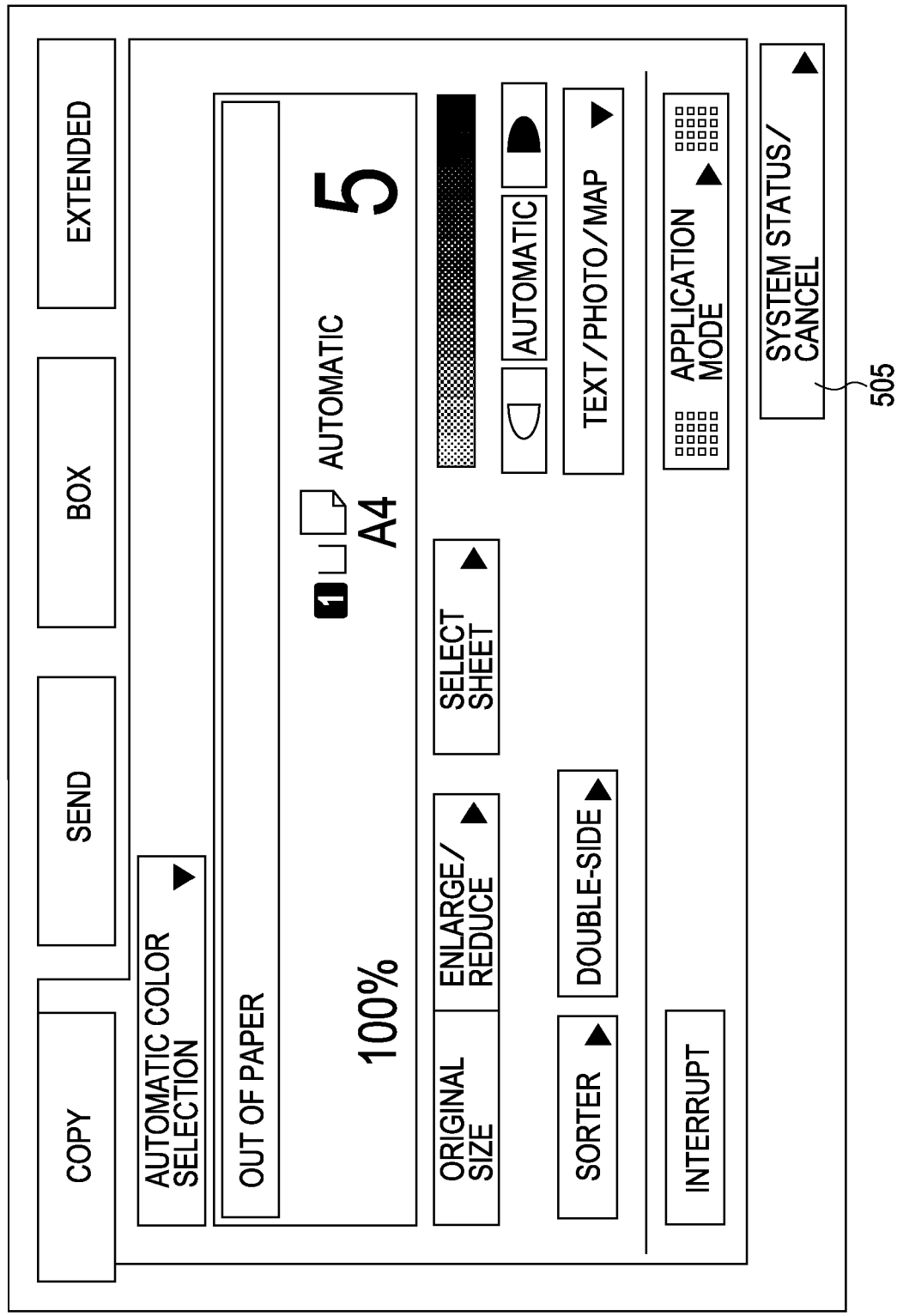
FIG. 12 is a diagram for describing a control example of the embodiment.

As shown in FIG. 12, the text "OUT OF PAPER" is displayed in the status display portion 513.

Figure 13:
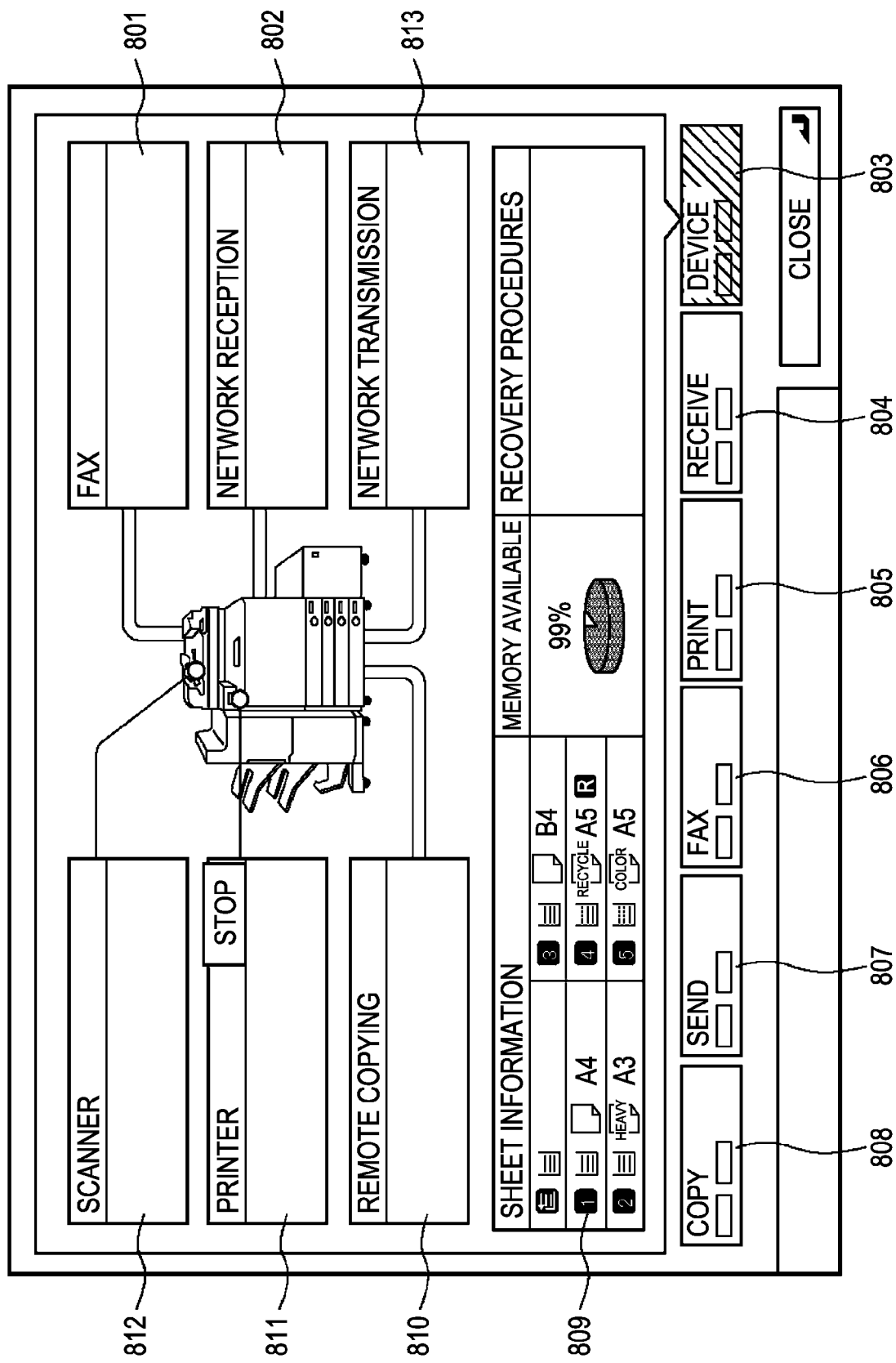
FIG. 13 is a diagram for describing a control example of the embodiment.

Upon the user operating the system monitor key 505 to operate the device tab 704, the screen changes to the device information display screen shown in FIG. 13. The device information display screen has a fax information display portion 801, network reception information display portion 802, device tab 803, receive tab 804, print tab 805, fax tab 806, send tab 807, copy tab 808, sheet information display portion 809, remote copy information display portion 810, printer information display portion 811, scanner information display portion 812, and network transmission information display portion 813. According to the screen shown in FIG. 13, it can be understood that the sheet icon for the A4 sheet tray of the sheet information display portion 809 is blank. In the display example shown in FIG. 13, this represents that A4 sheets have run out, using the sheet information display portion 809.

Thus, the device information display screen shown in FIG. 14 shows a display screen on the touch panel 301 for the case that there are no sheets in the sheet cassette 1.

Returning to FIG. 7B, in step S610, the control unit 108 registers the information of the interrupted job at the time of interruption, in the printing queue. In step S611, confirmation is made regarding whether or not there are other jobs registered in the printing queue which are not affected by the interruption cause. In the event that there is such a job registered therein, the flow proceeds from step S611 to step S614, and that job is read in and printed in steps S615 and S616 until the interruption cause is removed. For example, let us say that the second job registered in the printing queue (the job with reception No. 0002 in FIG. 11) uses A3 sheets for printing. In this case, having no A4 sheets is not a cause of printing interruption with the second job. Accordingly, the flow proceeds to step S614, and this second job is read in. In steps S615 and S16, the second job is handled as the current job, with sheets being fed out from the sheet cassette 214 holding A3 size heavy sheets, and printing is performed until the interruption cause (out of A4 sheets) is removed. It can be readily understood that if the second job were a job requiring A4 size recording sheets and the third job used A3 size recording sheets, the third job would be executed in this case.

In step S617, whether or not printing of the current job has been completed is determined, and in the event that this has not been completed the flow returns to step S615 and monitoring for removal of the interruption cause and printing of the current job are continued. On the other hand, in the event that determination is made in step S617 that printing of the current job has been completed, the flow proceeds to step S618 the current job is deleted from the printing queue, and the printing job is deleted from the backup memory 109 in step S619. The flow then returns to step S611, and determination is made regarding whether or not there are other jobs registered in the printing queue which do not involve the cause of interruption. In the event that there is such a job registered therein, the flow proceeds to step S614, and the same processing as above is repeated.

Upon removal of the cause of interruption being detected in step S615, the flow proceeds to step S620. with this example, removal of the cause of interruption is achieved by the user adding plain paper of the A4 size to the sheet cassette 213. In step S620, the user interface (UI) for enabling the user to select the job resuming method is displayed as shown in FIG. 16, from which the user selects the job resuming method.

In the event that the key 904 (resuming method selecting button) "1" is specified, "RESUME THIS JOB IMMEDIATELY AFTER PRINTING OF JOB CURRENTLY BEING PRINTED ENDS" is selected as the method for resuming printing, so the flow proceeds from step S621 to step S622. In step S622, the job interrupted in step S609 is resumed after waiting for the printing of the current job to end (described later with reference to FIG. 22).

In the event that the key 905 (resuming method selecting button) "2" is specified, "IMMEDIATELY END PRINTING OF JOB CURRENTLY BEING PRINTED, AND RESUME THIS JOB" is selected as the method for resuming printing, so the flow proceeds from step S623 to step S624. In step S624, printing of the current job is immediately interrupted, and the job interrupted in step S609 is resumed (described later with reference to FIG. 17).

In the event that the key 906 (resuming method selecting button) "3" is specified, "RESUME THIS JOB AFTER PRINTING OF JOBS CURRENTLY IN PRINTING STANDBY ENDS" is selected as the method for resuming printing, so the flow proceeds from step S623 to step S625. In step S625, the job interrupted in step S609 is resumed after waiting for the printing of the current job and of jobs registered in the printing queue to end (described later with reference to FIG. 25). Note that in the event of selecting "RESUME THIS JOB AFTER PRINTING OF JOBS CURRENTLY IN PRINTING STANDBY ENDS", the detailed setting space 907 in FIG. 16 can be used to specify after which job in standby to resume printing of the interrupted job. This will be described later in deal with reference to FIG. 25.

On the other hand, in step S611 in FIG. 7B, in the event that there are no jobs in the printing queue which do not involve the cause of interruption, the flow proceeds to step S612, where removal of the interruption cause is awaited. Upon the interruption cause being removed, the flow proceeds to step S603 so as to resume the printing job interrupted in steps S609 and S610.

Figure 15:
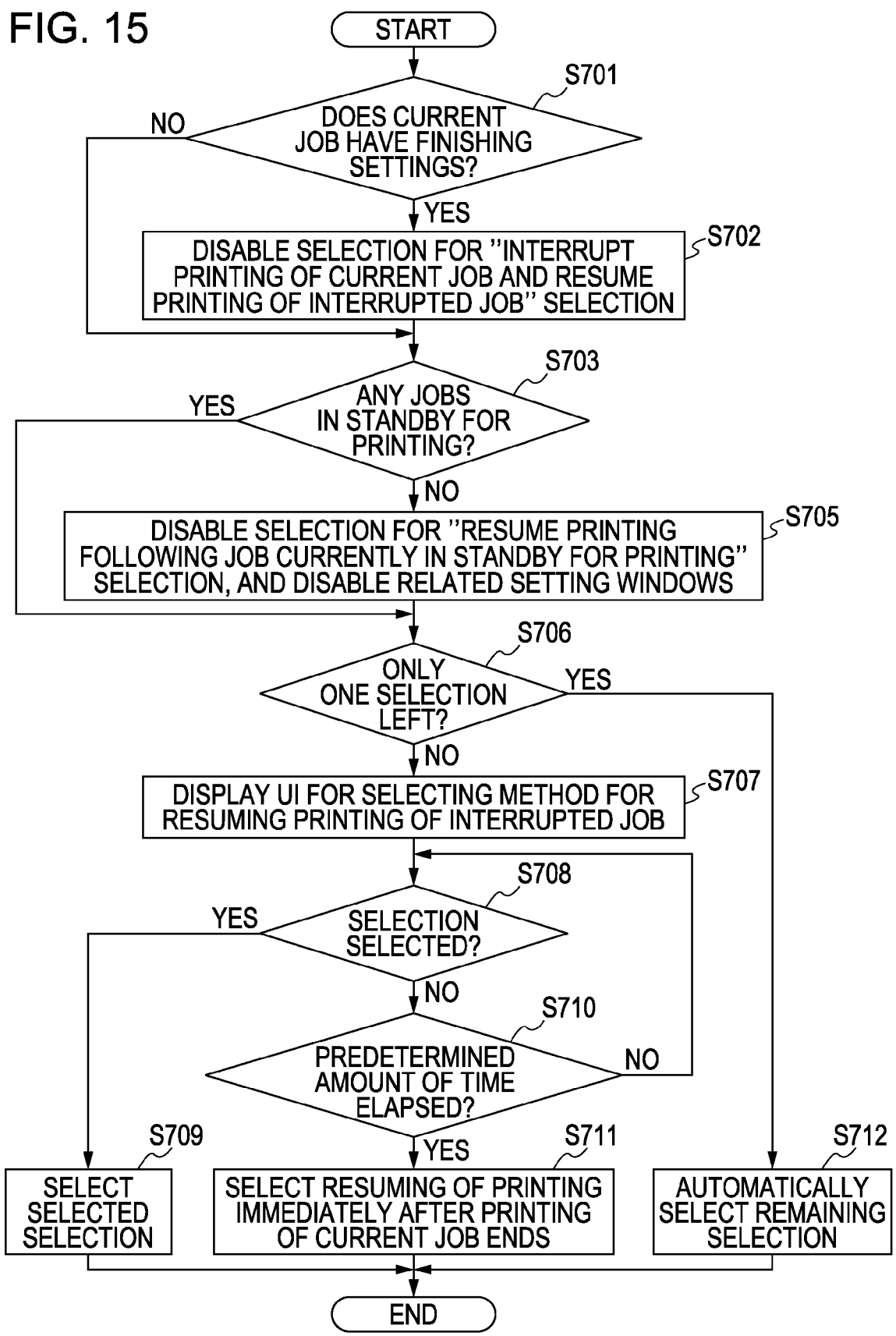
FIG. 15 is a flow diagram for describing a control example of the embodiment.

FIG. 15 is a flowchart illustrating detailed processing of the UI processing in step S620 in FIG. 7B. Executing the processing shown in FIG. 15 presents a UI such as shown in FIG. 16, and the resuming operations of the job that has been interrupted are determined according to the operations which the user makes at the UI.

In step S701, determination is made regarding whether or not there are finishing settings for the job currently being processed (the current job which has been read in step S614 and is being processed instead of the interrupted job). In the event that there are finishing settings for the job currently being processed, the flow proceeds to step S702, and selection of the selection option "IMMEDIATELY END PRINTING OF JOB CURRENTLY BEING PRINTED, AND RESUME THIS JOB" (key 905 in FIG. 16) is disabled. On the other hand, in event that there are no finishing settings for the current job, the flow proceeds from step S701 to step S703.

In step S703, confirmation is made regarding whether or not there are jobs in printing standby state in the printing queue (printing jobs other than the interrupted job and the current job). In the event that there are not printing standby state jobs, the flow proceeds to step S705, where selection of the selection option "RESUME THIS JOB AFTER PRINTING OF JOBS CURRENTLY IN PRINTING STANDBY ENDS" (key 905 in FIG. 16) and specification with the detailed setting space 907 thereof are disabled. On the other hand, in event that there is a job standing by for printing, the flow proceeds from step S703 to step S706.

In step S706, determination is made regarding whether or not there are multiple selection operations which are in a selectable state. In the event that only one selection option remains, the flow proceeds to step S712, and the resuming processing corresponding to that selection option is automatically selected. On the other hand, in the event that multiple selection operations remain in a selectable state, the flow proceeds from step S706 to step S707. In step S707, the UI such as shown in FIG. 16 for selecting the printing resuming method of the interrupted job is displayed.

Upon the user selecting one of the selection options at the UI, the flow proceeds from step S708 to step S709, and a selection operation selected by the user is carried out. On the other hand, in the event that no selection operation of a selection option is made even after a predetermined amount of time elapses following displaying the UI in step S707, the flow proceeds to step S711, and the selection option of "RESUME THIS JOB IMMEDIATELY AFTER PRINTING OF JOB CURRENTLY BEING PRINTED ENDS" is automatically selected.

This processing will be described with reference to an example such as illustrated in FIG. 11, for example, wherein there are three printing standby jobs in the printing queue, and the job with reception No. 0001 has been interrupted due to running out of sheets, and the current job is now job with reception No. 0002. First, if there are no finishing settings made for the current job (job with reception No. 0002), the flow proceeds from step S701 to step S703. Also, as shown in FIG. 11, there are two jobs in printing standby at this point, so the flow proceeds from step S703 to step S706. Consequently, all selection operations (all of the selection options shown in FIG. 16) are selectable in step S706, and the flow proceeds to step S707.

In step S707, a UI for selecting the printing resuming method of the interrupted job is displayed. FIG. 16 shows the UI for selecting the printing resuming method of the interrupted job. In the UI shown in FIG. 16, description of the UI is shown in the notification space 901 (processing resuming status display portion). The notification space 902 (interrupted job information display portion) displays the detailed information of the interrupted job. The notification space 903 (current job information display portion) displays details of the job currently being executed. Keys 904 through 906 are buttons for selecting a printing resuming method. The key 904 is for selecting a method to "(1) RESUME THIS JOB IMMEDIATELY AFTER PRINTING OF JOB CURRENTLY BEING PRINTED ENDS". The key 905 is for selecting a method to "(2) IMMEDIATELY END PRINTING OF JOB CURRENTLY BEING PRINTED, AND RESUME THIS JOB". The key 906 is for selecting a method to "(3) RESUME THIS JOB AFTER PRINTING OF JOBS CURRENTLY IN PRINTING STANDBY ENDS". The detailed setting space 907 is used to specify after which job in printing standby to resume printing of the interrupted job.

In the event that the key 905, for example, is operated before the predetermined amount of time elapses, the flow proceeds from step S708 to step S709, where "IMMEDIATELY END PRINTING OF JOB CURRENTLY BEING PRINTED, AND RESUME THIS JOB" is selected, and this processing ends.

Returning to FIG. 7B, in the event that a job resuming method is determined as above, the flow proceeds to step S621. In step S621, determination is made regarding whether or not "RESUME THIS JOB IMMEDIATELY AFTER PRINTING OF JOB CURRENTLY BEING PRINTED ENDS" has been selected, and since this is not selected, the flow proceeds to step S623. In step S623, confirmation is made regarding whether or not "IMMEDIATELY END PRINTING OF JOB CURRENTLY BEING PRINTED, AND RESUME THIS JOB" has been selected, and since this has been selected the flow proceeds to step S624.

Now, the processing in step S624 will be described in detail with reference to the flowchart shown in FIG. 17. FIG. 17 illustrates the printing processing in the event that the resuming method of "IMMEDIATELY END PRINTING OF JOB CURRENTLY BEING PRINTED, AND RESUME THIS JOB" has been selected.

Figure 18:
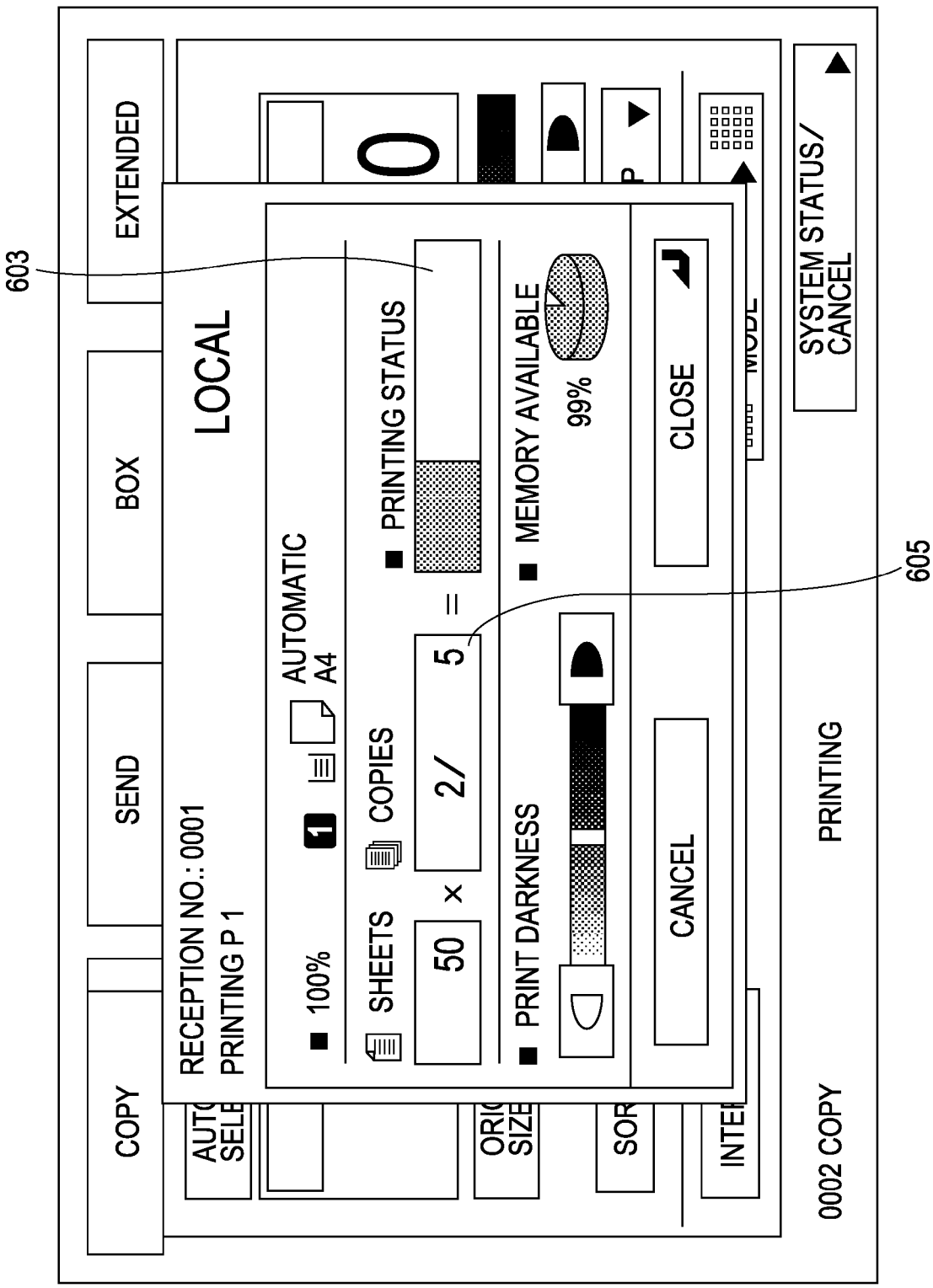
FIG. 18 is a diagram for describing a control example of the embodiment.

First, in step S901, the job currently being executed (current job) is interrupted, and the flow proceeds to step S902. In step S902, the information of the current job is registered in the printing queue, and the flow proceeds top step S903. In step S903, the information of the job interrupted in step S609 (interrupted job) is read into the printing queue, and taken as a printing resuming job. In step S904, the printing processing of the printing resuming job is resumed. In the above example, A4 size plain paper is fed out from the sheet cassette 213 and printing is performed. The touch panel 301 shows a display illustrating the printing status of the printing resuming job in response to the printing having been resumed, as shown in FIG. 18. A progress display bar progresses on a print status display portion 603, and also the number of copies processed is counted at a number-of-copies display portion 605, in the format of "2/5", for example.

In step S905, confirmation is made regarding whether or not printing of the printing-resumed job has ended, and if not ended, the flow returns to step S904. Thus, printing of the resumed job is carried out. On the other hand, in the event that confirmation is made in step S905, that printing of the printing-resumed job has ended, the flow proceeds to step S906.

In step S906, the information of the printing resuming job is deleted from the printing queue, and the flow proceeds to step S907. In step S907, the job is deleted from the backup memory 109, and the flow proceeds to step S908. In step S908, the information of the job interrupted during execution in step S901 is read in, and taken as a currently-executed job (current job) and the flow proceeds to step S909. In step S909, the printing processing of the current job is resumed. In the above example, A3 size heavy paper is fed out from the sheet cassette 214 and printing is performed. In step S910, confirmation is made regarding whether or not printing has ended, and if not ended, the flow returns to step S909. Thus, printing of the current job is carried out.

On the other hand, in the event that confirmation is made in step S910 that printing of the current job has ended, the flow proceeds to step S911. In step S911, the current job regarding which printing has ended is deleted from the printing queue, and the flow proceeds to step S912. In step S912, the job is deleted from the backup memory 109, and the flow ends.

Returning to FIG. 7B, upon the printing processing at step S924 ending, the flow proceeds to step S608. In step S608, the printing queue is confirmed regarding whether or not there are jobs remaining to be printed, and in the event that there are, the flow returns to step S603 and is repeated, thereby carrying out printing. On the other hand, in the event that confirmation is made of the printing queue in step S608 that there are no printing jobs to print, the flow ends.

Second Example

Interruption Processing and Resuming Processing Due to Occurrence of a Paper Jam Next an example of interruption processing due to an original document jam will be described, wherein the method of "IMMEDIATELY END PRINTING OF JOB CURRENTLY BEING PRINTED, AND RESUME THIS JOB" is selected as method for interruption processing and resuming processing. Notice that an original document jam is a situation wherein an original becomes jammed at the automatic document feeder 201. The following description will be made with reference to FIGS. 7A and 7B.

Upon the user setting a 50-page original in the automatic document feeder 201 and specifying "5" in order to print five copies, the number-of-sheet display portion 516 shown in FIG. 8 on the touch panel 301 shows "5". Also, upon the user pressing the start key 403 of the key input portion 302 for starting reading, document reading is started. As described with the first example, when reading of documents from the ADF ends, "50" is displayed in a number-of-pages display portion 607, and "1/5" is displayed in a number-of-copies display portion 605, as shown in FIG. 9, on the touch panel 301. In the event that there are no jobs undergoing printing, the printing of the job that has been read is started, and the print status display portion 603 shows a progress bar moving across. Once the first copy is finished and progresses to the second copy, the number-of-copies display portion 605 shows "2/5". The images read by the reader unit 103 are stored in the backup memory 109 by the control unit 108, in the order that they are read (step S601). Also, in the event that the user has input a printing job from the client computer A300, the job is stored in the backup memory 109 by the control unit 108 (step S601).

Figure 19:
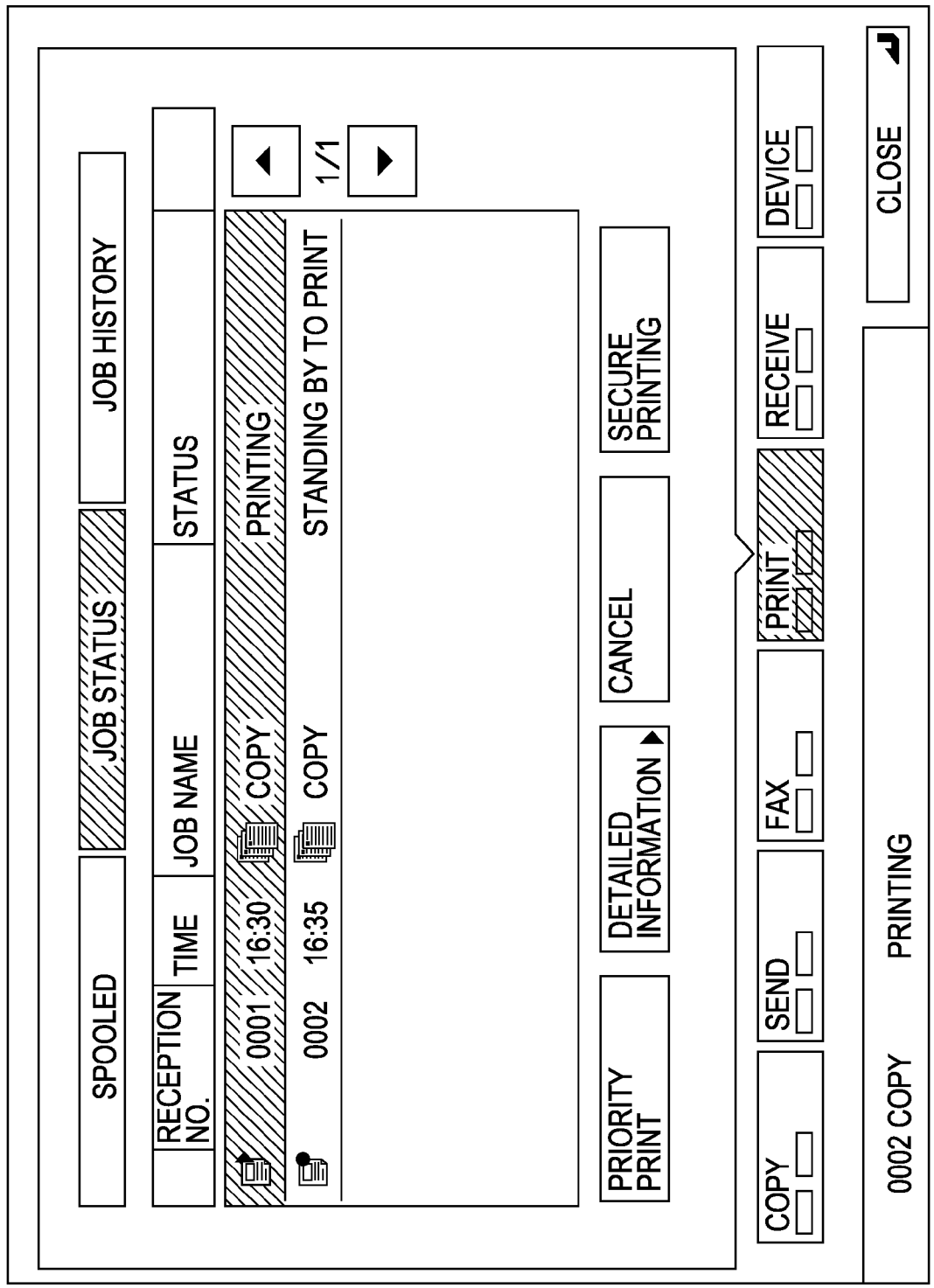
FIG. 19 is a diagram for describing a control example of the embodiment.

Job information read as described above is registered in the printing queue (step S602). Also, once storing of the printing job input from the client computer A300 to the backup memory 109 is completed, the control unit 108 generates corresponding job information, and registers this in the printing queue. Operating the touch panel 301 in this state, in the order of system monitor key 505 (FIG. 6), print tab 607 (FIG. 19), and job status table 702 (FIG. 19) in that order displays the job status display portion 710 as shown in FIG. 19. In this second example, the first job registered is the copy job and the second is the print job, the display portion making display to that effect.

Next, the job with the smallest number in the printing queue is read out from the backup memory 109 by the control unit 108, and processing printing) of the job is started (step S603). With this example, the job with the reception No. 0001 is read out, A4 sheets are fed out from the sheet tray 213, and printing is performed at the printer unit 104. Subsequently, confirmation is made that there is no cause of interruption (step S604), and in the event that there is no cause of interruption, confirmation is made that the printing of the job has ended, based on the printing job information registered in the printing queue (step S605). In the event that the printing is not ended, the printing is continued (steps S603 through S605).

On the other hand, in the event that an interruption cause is detected, a warning screen is displayed to that effect, and the job currently printing is interrupted (step S609). That is to say, upon jamming of a sheet at the automatic document feeder 201 being detected, a warning screen to the effect that a sheet has jammed at the automatic document feeder 201, such as shown in FIG. 20, is displayed on the touch panel 301, and the current job is interrupted. The information at the time of interruption of this interrupted job is then registered in the printing queue (step S610). Upon the OK key 3001 being operated in the display shown in FIG. 20, a notification is made to the status display portion 513 of the paper jam, albeit a different display from that shown in FIG. 12.

Next, confirmation is made regarding whether or not there is another job in the printing queue which does not involve the interruption cause (step S611). In this example (FIG. 19), the second job is a print job and is not affected by the interruption cause (i.e., an original feed jam), so the second job is read in (step S614). This second job is carried out as the current job until the interruption cause is removed (until the sheet jammed in the automatic document feeder 201 has been removed) (steps S615, S616, S617). In the event that the printing of the current job has ended, this current job is deleted from the printing queue and the backup memory 109, and another printable job is searched for (step S611).

In the event that the interruption cause (the sheet jammed in the automatic document feeder 201) is removed, a user interface for selecting a job resuming method such as shown in FIG. 21 is presented (Step S620). The presenting of the user interface according to this second example will be described in detail with reference to FIG. 15.

First, determination is made regarding whether or not there are finishing settings for the job currently being processed (step S701). We will say that there are no finishing settings for the current job. Accordingly, next, confirmation is made regarding whether or not there are jobs in printing standby (step S703). As shown in FIG. 19, there are no jobs standing by for printing in this example. Accordingly, the key 906 ("RESUME THIS JOB AFTER PRINTING OF JOBS CURRENTLY IN PRINTING STANDBY ENDS") is made to be not selectable, and the settings of the detailed setting space 907 are also disabled (step S705).

As a result of the above processing, there are two selection options, selectable by the keys 904 and 905, so a UI for selecting the printing resuming method of the interrupted job such as shown in FIG. 21 is displayed (steps S706, S707). FIG. 21 illustrates the UI for selecting the printing resuming method of the interrupted job displayed with this example. As described above, the option of "RESUME THIS JOB AFTER PRINTING OF JOBS CURRENTLY IN PRINTING STANDBY ENDS" is not selectable, so the key 906 and the detailed setting space 907 for use with the key 906 are grayed out and made non-selectable. Now, the subsequent processing will be described with regard to a case wherein the user has selected "(1) RESUME THIS JOB IMMEDIATELY AFTER PRINTING OF JOB CURRENTLY BEING PRINTED ENDS".

Printing resuming processing is executed according to the method selected (in this case, "RESUME THIS JOB IMMEDIATELY AFTER PRINTING OF JOB CURRENTLY BEING PRINTED ENDS") (Steps S708, S709, S621, S622). FIG. 22 is a flowchart for describing the processing for "RESUME THIS JOB IMMEDIATELY AFTER PRINTING OF JOB CURRENTLY BEING PRINTED ENDS" shown in FIG. 7B in step S622. The processing for "RESUME THIS JOB IMMEDIATELY AFTER PRINTING OF JOB CURRENTLY BEING PRINTED ENDS" will now be described in detail with reference to FIG. 22.

First, in step S801 through S803, processing is continued until printing of the job currently being executed (current job) ends. That is to say, in step S803, confirmation is made regarding to whether or not printing of the job currently being executed is performed, and in the event that this has not ended, the flow returns to step S802 and this is repeated, thereby advancing the printing of the job currently being executed. On the other hand, in the event that confirmation is made in step S803 that printing of the printing resuming job has ended, the flow proceeds to step S804.

In step S804, information of the current job regarding which printing has ended in the above processing is deleted from the printing queue, and next in step S805, this printing job is deleted from the backup memory.

Next, in step S806, the interrupted job regarding which printing has been interrupted in step S609 is read in step S806, and in step S807, the interrupted job is resumed and printing is performed. In step S808, confirmation is made regarding whether or not printing of the interrupted job has ended, and in the event that his has not ended the flow returns to step S807 and this is repeated, thereby advancing printing. On the other hand, in the event that confirmation is made in step S808 that printing has ended, the flow proceeds to step S809, the job currently being executed is deleted from the printing queue, and the processing ends.

Thus, upon ending the processing of step S622 in FIG. 7B, the flow returns to step S608. In step S608, confirmation is made regarding whether or not there is a printing job to be printed in the printing queue, and in the event that here is, the flow returns to step S603 and is repeated, thereby carrying out printing. On the other hand, in the event that confirmation is made regarding a printing job to be printed in the printing queue, and there is none, the flow ends.

Third Example

Interruption Processing and Resuming Processing Due to Occurrence of Paper Jam at Movable Tray Next we will describe an example of the processing from a job being interrupted due to a sheet jam occurring at the movable tray 228 as an interruption cause, up to resuming printing of the interrupted job following removing the interruption cause.

Upon the user setting a 50-page original in the automatic document feeder 201 and specifying "5" in order to print five copies, the number-of-sheet display portion 516 shown in FIG. 8 on the touch panel 301 shows "5". Also, upon the user pressing the start key 403 of the key input portion 302 for starting reading, document reading is started. As described with the first example, when reading of documents from the ADF ends, "50" is displayed in a number-of-pages display portion 607, and "1/5" is displayed in a number-of-copies display portion 605, as shown in FIG. 9, on the touch panel 301. In the event that there are no jobs undergoing printing, the printing of the job that has been read is started, and the print status display portion 603 shows a progress bar moving across. Once the first copy is finished and progresses to the second copy, the number-of-copies display portion 605 shows "2/5". The images read by the reader unit 103 are stored in the backup memory 109 by the control unit 108, in the order that they are read (step S601). Also, in the event that the user has input a printing job from the client computer A300, the job is stored in the backup memory 109 by the control unit 108. Note that with the third example, the following description will be made with the understanding that the job input from the client computer A300 has finishing settings.

Simultaneous with the above reading, job information is registered in the printing queue (step S602). Also, once storing of the printing job input from the client computer A300 to the backup memory 109 is completed, the control unit 108 generates corresponding job information, and registers this in the printing queue. That is to say, job information corresponding to the printing job stored in the backup memory 109 is registered in the printing queue. Operating the touch panel 301 in this state, in the order of system monitor key 505 (FIG. 6), print tab 607 (FIG. 19), and job status table 702 (FIG. 19), displays the job status display portion 710 as shown in FIG. 19. In this example, the first job displayed is the copy job (the job for printing the original images read in with the reader unit 103) and the second is the print job (the printing job input from the external computer).

The job with the smallest number in the printing queue is read out from the backup memory 109 by the control unit 108, A4 sheets are fed out from the sheet tray 213, and printing is performed at the printer unit 104 (step S603). Subsequently, confirmation is made as to whether there is no cause of interruption (step S604), and in the event that there is no cause of interruption, confirmation is made that the printing of the job has ended, based on the printing job information registered in the printing queue (step S605). Thus, the printing processing is continued until printing ends.

However, in the event that an interruption cause occurs before the printing ends, a warning screen such as shown in FIG. 23 is displayed, and the job being printed is interrupted. With this example, the following description will be made assuming a case wherein a sheet is jammed in the movable tray 228.

As shown in FIG. 23, a warning display is made on the touch panel 301 to the effect that a sheet is jammed in the movable tray 228. Upon the OK key being operated in the display shown in FIG. 23, the printing is interrupted in step S609 and the flow proceeds to step S610.

Next, confirmation is made regarding whether or not there is another job in the printing queue which does not involve the interruption cause (step S611). In this example, the second job in FIG. 19 is a job with finishing settings, and accordingly does not use the movable tray, i.e., is not affected by the interruption cause. Accordingly, the second job is read in (step S614). Printing processing is then carried out until the interruption cause is removed or the printing of the job ends (Steps S615 through S617).

In the event that the sheet jammed in the movable tray 228 is removed and the interruption cause is resolved, a user interface for selecting a job resuming method is presented, whereby the user selects a job resuming method (Step S620). The display processing of the user interface here will be described with reference to FIG. 15.

In the case of this third example, there are finishing settings for the job currently being processed (current job), so the key 905 ("IMMEDIATELY END PRINTING OF JOB CURRENTLY BEING PRINTED, AND RESUME THIS JOB") is grayed out and is made not selectable (step S702). Also, as shown in FIG. 19, there are no jobs in printing standby in this example, so the key 906 ("RESUME THIS JOB AFTER PRINTING OF JOBS CURRENTLY IN PRINTING STANDBY ENDS") is grayed out and is made not selectable. The detailed setting space 907 for use with the key 906 is also grayed out and made non-selectable at this time.

Consequently, only "RESUME THIS JOB IMMEDIATELY AFTER PRINTING OF JOB CURRENTLY BEING PRINTED ENDS" is left as a selection option as a resuming method with this example, so this selection option is automatically selected. Note that with this example (FIG. 7B), in the event that two of the three selection options are not selectable, and only one selection option is left, the UI is not displayed and the selectable selection option is automatically selected, but an arrangement may be made wherein the selectable selection option is presented to the user for confirmation thereof by the user.

In the event that the interrupted job resuming method "RESUME THIS JOB IMMEDIATELY AFTER PRINTING OF JOB CURRENTLY BEING PRINTED ENDS" is decided upon in step S620, the selected processing is executed (step S621, S622).

The processing following selection of "RESUME THIS JOB IMMEDIATELY AFTER PRINTING OF JOB CURRENTLY BEING PRINTED ENDS" is a described above with FIG. 22, and accordingly description thereof will be omitted here.

Fourth Example

Processing in a Case that "RESUME THIS JOB AFTER PRINTING OF JOBS CURRENTLY IN PRINTING STANDBY ENDS" has been Selected So far, the two selection option of "RESUME THIS JOB IMMEDIATELY AFTER PRINTING OF JOB CURRENTLY BEING PRINTED ENDS" and "IMMEDIATELY END PRINTING OF JOB CURRENTLY BEING PRINTED, AND RESUME THIS JOB" have been described. Next, the processing in the case that "RESUME THIS JOB AFTER PRINTING OF JOBS CURRENTLY IN PRINTING STANDBY ENDS" has been selected, will be described. Also, for the fourth example, we will say that in the state of the interruption occurring in the first example, finishing settings have been made for the current job, so "IMMEDIATELY END PRINTING OF JOB CURRENTLY BEING PRINTED, AND RESUME THIS JOB" cannot be selected as a resuming method. Accordingly, the UI for selecting the resuming method in the fourth example is as shown in FIG. 24 rather than that shown in FIG. 16. That is to say, the key 905 for selecting "IMMEDIATELY END PRINTING OF JOB CURRENTLY BEING PRINTED, AND RESUME THIS JOB" is grayed out and/or cannot be selected. Upon the key 906 ("RESUME THIS JOB AFTER PRINTING OF JOBS CURRENTLY IN PRINTING STANDBY ENDS") being selected from the UI shown in FIG. 24, the flow proceeds to step S625 in FIG. 7B. FIG. 25 is a flowchart for describing the details of printing resuming processing in step S625.

In step S1001, a numerical value indicating which job in the printing standby state is to be printed first is stored in a counter. The counter is configured using RAM memory (not shown) in the control unit 108. In the event that "RESUME THIS JOB IMMEDIATELY AFTER PRINTING OF LAST JOB CURRENTLY IN PRINTING STANDBY ENDS" has been selected in the detailed setting space 907 shown in FIG. 25 has been selected, the number of jobs (including the current job) presently in the printing queue is set in the counter. Also, in the event that resuming printing following ending printing of the n'th job is set in the detailed setting space 907, the counter is set to n. The value of n cannot be set greater than the number of printing standby jobs in the printing queue.

In step S1002, printing of the current job is continued. Printing processing is advanced until the printing of the current job ends, by the processing in steps S1003 and S1004, and upon ending of printing the flow proceeds to step S1005. In step S1005, the current job is deleted from the printing queue, and in step S1006 the current job is deleted from the backup memory 109.

Subsequently, the flow proceeds to step S1007, and determination is made regarding whether or not the counter is zero. In the event that the counter is not zero, the value thereof is decremented by 1, and printing of the next printing standby job is executed. After repeating the above processing, in the event that the counter is determined to be zero in step S1007, the flow proceeds to step S1009, and printing of the interrupted job is resumed. That is to say, the interrupted job is read in step S1009, and resumed printing for the interrupted job is preformed in step S1010. Upon ending the printing of the interrupted job, the flow proceeds from step S1011 to step S1012, the interrupted job is deleted from the printing queue, and in step S1013 the interrupted job is deleted from the backup memory 109.

As described above, with the present embodiment, a job resuming processing method with improved operability is provided for a printing system wherein jobs can be interrupted according to interruption causes and other jobs can be printed besides the interrupted job. With the resuming processing method according to the present embodiment, one of the following three resuming method instructions can be selected to for removal of the cause of interruption:

(1) An instruction for identifying whether or not to interrupt the processing of a job currently being printed (current job) to start the processing of the interrupted job;
(2) An instruction for identifying whether or not to wait for the processing of the current job to end before starting the processing of the interrupted job; and
(3) An instruction for identifying the number of executable jobs to be further performed before the processing of the interrupted job after the processing of the current job ends (jobs in the printing queue which are not affected by the interruption cause).

All or a part of the three instructions are presented through the user interface such as shown in FIG. 16, and the interrupted job regarding which the cause of interruption has been removed, is resumed. In the event that the instruction (1) has been selected, the processing of the current job is interrupted, and the processing of the interrupted job is started immediately. In the event that the instruction (2) has been selected, the processing of the interrupted job is started immediately following the processing of the current job. Further, in the event that the instruction (3) has been selected, the processing of the interrupted job is started immediately following the processing of the current job and the processing of as many jobs as specified. Therefore, the user can resume the interrupted printing job in a desired sequence.

The instructions which cannot be selected (resuming methods which cannot be executed) of the instructions (1) through (3) according to job processing other than the interrupted job are made to be non-acceptable, so ease of instructing of resuming processing is facilitated.

Also, in the event that only one instruction of the instructions (1) through (3) is selectable, the instruction for the resuming method is not made acceptable on the user interface, and rather the job processing is started following that one instruction. For example, in the event that there are not other jobs other than the interrupted job at the point that the cause of interruption has been removed, the job is resumed immediately following removing of the interruption cause. This prevents unnecessary selection operations, and improves operability.

Now, a configuration common to all of the above-described embodiments will be described.

Control of the actions of the various units of the above-described embodiments is primarily executed by the control unit 108 of the printing system 100. For example, let us say that the control unit 108 receives a printing request, and at that point there are no jobs being printed and no jobs in printing standby in the memory 109. In this case, the control unit 108 starts printing of the printing job. While executing the printing operations, the control unit 108 monitors whether or not an interruption cause has occurred for this job, based on information from various sensors which the printing system 100 has. In the event that the control unit 108 has confirmed that an interruption cause has occurred, at that point the control unit 108 interrupts the printing operations of the job being printed. Further, in the event that there is a job standing by in the memory 109 at that point, the control unit 108 reads out the printing data of that job, and starts the printing operations of the job in printing standby during the period in which the printing operations of the interrupted job are stopped.

Subsequently, while executing these operations, the control unit 108 monitors whether or not the interruption cause of the interrupted job has been removed, based on information from the sensors. In the event of confirming that the interruption cause has been removed in this state, the control unit 108 executes control based on the processing in the above-described flowcharts. For example, a display having the above-described display components (see the drawings) is displayed at the timing described above, using the user interface of the printing system 100. The control unit 108 also enables reception of user requests, from the user, explicitly instructing the timing for resuming the printing operations of the interrupted job. The control unit 108 then follows the request to resume the printing operations of the interrupted job at the printing system 100, at the timing desired by the user. The primary control for the processing method for multiple printing jobs which the printing system 100 has received is executed by the control unit 108.

Now, specific examples will be given regarding what sort of jobs the printing system 100 receives, what sort of causes of printing interruption occur therewith, what sort of job printing operations are stored in response thereto, and under what sort of conditions are the interruption causes removed.

For example, let us say that a printing request for a printing job is received from the user, input from the reader unit 103 of the printing system 100, via the operating unit 102, as a printing job A. In the event that there is no printing job to be processed at this point in the memory 109, the control unit 108 causes the printer unit 104 to execute the printing operations of the printing job A. For example, the control unit 108 causes the originals in the original stack of multiple pages making up the printing job A to be fed one at a time by the ADF of the reader unit 102, so that the reader unit 103 reads the original documents, and the read data of the job A is stored in the memory 109. Then, printing processing of the printing data of the job A stored in the memory 109 is executed by the printer unit 104, following the printing setting conditions from the user of the job A, set via the operating unit 102. Now, let us say that during the series of printing operations of such a job A, a jam detection sensor in the ADF has detected a jam occurring on the ADF of the reader unit 103 with an original of the job A. This original jam of the job A at the ADF of the reader unit is a cause of printing interruption of the job A. The control unit 108 stops the printing operations of the job A being executed by the printing system 100, due to the cause of printing interruption with the job A. Note that the control unit 108 keeps the printing data of the job A which is interrupted, in the memory 109, for use upon resumption. Now, if we say that another job besides the job A has been stored in the memory 109 in a standby state in this state, the control unit 108 determines whether or not the printing standby job is a job regarding which printing operations can be executed without being affected by the interruption cause of the job A.

An example of a job regarding which printing operations can be executed without being affected by the interruption cause of the job A is, for example, a job received from a data source other than the reader unit 103, such as the computer 300 or 400. In other words, a job which does not use the ADF. The reason is that, in a situation wherein an original jam has occurred for the job A at the ADF, original reading actions of other jobs cannot be performed by the reading unit 103 using the ADF. In other words, a job requiring original reading actions by the reader unit 103 cannot be performed while the cause of printing interruption of the job A is occurring. On the other hand, printing data of jobs from external devices such as the computer 300 or 400 is not such a job. The reason is that the printing data of jobs from external devices can be printed following the route of computer interface unit 106→memory 109→printer unit 104. Accordingly, the control unit 108 starts printing operations of a printing standby job not affected by the interruption cause of the job A, during the period in which the printing operations of the job A are stopped. This aims for optimal productivity of the present printing system. Also, the control unit 108 monitors whether or not the original jam of the job A has been removed by the user, based on information from the sensor of the ADF, even while executing the other job. In the event of determining that the original jam of the job A has been removed, determination is made that the interruption cause of the job A has been removed. Thus, the present embodiment includes an error at the reader unit 103 of the printing system 100 as an example of a printing interruption cause. Note that errors at the reader unit 103 include errors other than jamming of original documents at the ADF. For example, various types of error events at the reader unit 103, such as malfunction of the lamp of the reader unit 103, malfunction of the ADF transporting unit, and so forth all come under the above cause of interruption. Note that configurations other than described here conform to the control and processing conditions described above in the various arrangements. That is to say, this is the same as that of the forms described above, so description here will be omitted. Next, another specific example will be described.

For example, let us say that the printing system 100 has received printing data to be processed from the reader unit 103, or an external device such as the computer 300 or 400, as a printing job B. Let us further say that the user specifies for printing conditions for this job B, that the sheets upon which the data of the job to be printed is A4 size sheets of a plain paper type. Thus, the printing system 100 has accepted a job B which requires "A4 plain paper sheets" for printing processing at the printer unit 104. Note that there are multiple sheet supplying units, such as the first through third sheet supplying units, provided to the printing system 100, with sheets of different sizes and types being set in each. For example, let us say that the "A4 plain paper sheets" are set in the first sheet supplying unit, "A3 plain paper sheets" are set in the second sheet supplying unit, and "A4 sheets of color paper of a type different to plain paper" are set in the third sheet supplying unit. Moreover, the control unit 108 confirms what type and what size of sheets are set in each of the sheet supplying units of the printing system 100, based on sensors in the sheet supplying units, and user setting information relating to sheet registration from the operating unit 102.

In the event that there are no jobs in the memory 109 at the point that the job B has been received, the control unit 108 executes the printing operations of the printing job B at the printer unit 104. Specifically, the control unit 108 reads out the printing data of the job B made up of the multiple pages stored in the memory 109, sequentially from the first page. Also, sheets necessary for printing the printing job B are fed out from the first sheet supplying unit one at a time, and printing of the printing data of the job B read out from the memory is performed on the supplied sheet, at the printer unit 104. The above printing operations are performed for all of the pages included in the job B including the multiple pages of document data, for as many copies as the user has specified for the job B.

Now, let us say that an out-of-paper error has occurred during execution of the series of printing operations for such a job B at the sheet supplying unit, due to fewer sheets than the number necessary for the job having been set in the first sheet supplying unit. At this point, the control unit 108 recognizes that an out-of-paper error has occurred with the sheets necessary for the job B, based on information from a remaining-sheet detection sensor in the first sheet supplying unit. The out-of-paper error for the sheets necessary for the job B is a cause of printing interruption of the job B. The control unit 108 stops the printing operations of the job B being executed by the printing system 100, due to the cause of printing interruption of the job B. The control unit 108 keeps the printing data of the interrupted job B in the memory 109, for use upon resumption.

Now, let us say that another job besides the job B has been stored in the memory 109 in a standby state in this state. In this case, the control unit 108 determines whether or not the printing standby job is a job regarding which printing operations can be executed without being affected by the interruption cause of the job B. An example of a job regarding which printing operations can be executed without being affected by the interruption cause of the job B is a job which requires "A3 plain paper sheets", for example, for printing processing at the printer unit 104. Another is a job requiring "A4 sheets of color paper", for example, for printing processing at the printer unit 104. In other words, this is a job requiring sheets of a size different to the sheets necessary for printing processing of the job B, or a job requiring sheets of a type different to the sheets necessary for printing processing of the job B. That is to say, a job requiring printing processing on sheets already provided in the sheet supplying units of the printing system 100 at the point that the out-of-paper-error occurs with the job B is a printable job. The control unit 108 starts printing operations of a printing standby job not affected by the interruption cause of the job B, during the period in which the printing operations of the job B are stopped. This aims for optimal productivity of the present printing system.

Also, the control unit 108 monitors whether or not the cause of interruption of the job B has been removed, while executing the printing operations of another job. With the present example, for example, the control unit 108 confirms whether or not "A4 plain paper sheets" which the job B needs for printing have been supplied to the first sheet supplying unit by the user, based on information from the sensor in the sheet supplying unit. Thus, the present embodiment includes an out-of-paper error of sheets necessary for jobs to be processed at the printer unit 104. Note that configurations other than described here conform to the control and processing conditions described above in the various arrangements. That is to say, this is the same as that of the forms described above, so description here will be omitted. Accordingly, the printing system according to the present embodiment is controlled by the control unit 108 so as to be capable of handling various kinds and types of causes of printing interruption.

Now, errors other than errors at the reader unit 103 and an out-of-paper error at the printer unit 104 can occur with the present printing system, and accordingly these can be handled as well. For example, errors at the printer unit 104 include out of toner, sheet jamming, and so forth. Also, in the event that the printing system 100 is equipped with a sheet processing device which can execute sheet processing, such as stapling and the like, on the sheets from the printer unit 104, errors at the sheet processing device are also encompassed in the causes of printing interruption. Examples thereof include, for example, errors relating to the stapling unit, such as out of staples, staple jamming error, and so forth. Also, in the event that the printing system 100 is equipped with a punching unit which can execute punching processing on the sheets from the printer unit 104, errors at the punching unit are also encompassed in the causes of printing interruption. Also, in the event that the printing system 100 is equipped with a binding unit which can execute binding processing on the sheets from the printer unit 104, errors at the binding unit are also encompassed in the causes of printing interruption. The present embodiment is configured such that the control unit 108 can recognize the interruption causes occurring during printing operations of jobs to be processed, out of the multiple types of causes of printing interruption which can occur at the printing system. The control unit 108 stops the printing operations of the job being printed in response to an interruption cause occurring.

However, in the event that a particular type of interruption cause occurs, control is effected so as to forbid execution at the printer unit 104 of the printing operations of subsequent jobs to the job regarding which printing has been interrupted, during the period in which the printing operations of the job regarding which printing has been interrupted have been stopped. An example thereof is a case wherein the interruption cause which has occurred in the printing system is a sheet jam error in the printer unit 104. In this case, the printing operations of the job are stopped, but printing of subsequent jobs is not permitted. The reason is that starting printing operations of subsequent jobs without the user removing the printed sheets of the job regarding which printing has been interrupted will cause further errors. In other words, in the event that an interruption cause which falls under a type wherein execution of printing operations of subsequent jobs should not be permitted, the control unit 108 forbids overtake printing operations of such subsequent jobs. Also, besides this example, in the event that the preceding job is a job which needs to be compiled as a single stack, overtake printing operations of subsequent jobs are forbidden. In other words, the configuration conforms to the control and processing conditions described above in the various arrangements.

Further, the present embodiment can also employ a configuration such as described below. For example, while interruption causes described above have been errors at devices provided to the printing system 100, the present embodiment can be configured to handle causes of printing interruption such as described below, as well.

For example, let us say that the printing system 100 has received printing data to be processed from the reader unit 103, or an external device such as the computer 300 or 400, as a printing job C. Let us also say that at this point, there are currently no printing jobs to be processed in the memory. In this case, the control unit 108 executes the printing operations of the printing job C at the printer unit 104. Specifically, the control unit 108 sequentially reads out the printing data of the job C made up of the multiple pages stored in the memory 109, from the first page. Also, printing of the printing data of the job C read out from the memory is performed at the printer unit 104. The above printing operations are performed for all of the pages included in the job C including the multiple pages of document data, for as many copies as the user has specified for the job C.

The control unit 108 enables the display unit 301 of the operating unit 102 to make a display during the series of printing operations of such a job C, to enable the user to input instructions to temporarily stop the printing operations of the job C which is currently being printed. For example, the control unit 108 enables a display key for temporarily stopping the printing operations of the job C on the display unit 301 in response to an instruction from the user, and enables an instruction to be input from the user by this display to temporarily stop the printing operations of the job C. Also, equivalent functions may be provided from the user interface unit for external devices. For example, a status monitor screen enabling confirmation of the status of the printing system 100 may be displayed on the display units of the computers 300 and 400, in response to key operations from the users of the computers. A display key for temporarily stopping the printing operations of the job C is displayed on the status monitor screen in response to an instruction from the user of the computer. Note that the CPU of the external device is the primary entity of control relating to the display units of such external devices. Thus, with the present embodiment, various user interfaces of the printing system 100 are enabled to make a display to enable the user to input instructions to temporarily stop the printing operations of the job C. Then, in the event of receiving, via the display, a user instruction for temporarily stopping the printing operations of the job C, the control unit 108 interrupts the printing operations of the job. That is to say, the control unit 108 determines that the user input for instructing temporary stopping of the job C currently being printed is an interruption cause of the job C.

The control unit 108 keeps the printing data of the interrupted job C in the memory 109, for use upon resumption. Now, let us say that another job besides the job C has been stored in the memory 109 in a standby state in this state. In this case, the control unit 108 starts printing operations of the subsequent job, during the period in which the printing operations of the job C are stopped. This aims for optimal productivity of the present printing system. Also, the control unit 108 monitors whether or not the cause of interruption of the job C has been removed, while executing the printing operations of the subsequent job. Specifically, the control unit 108 enables the display unit 301 of the operating unit 102 to make a display during the series of printing operations of the subsequent job, to enable the user to input instructions to resume the temporarily-stopped printing operations of the job C. For example, the control unit 108 enables a display key for entering a resume request for the printing operations of the job C on the display unit 301 in response to an instruction from the user, and enables a user to make a resume request for the printing operations of the job C from this display. Also, equivalent functions may be provided from the user interface unit for external devices. For example, a status monitor screen enabling confirmation of the status of the printing system 100 may be displayed on the display units of the computers 300 and 400, in response to key operations from the users of the computers. A display key for enabling the user to input an instruction for resuming the printing operations of the job C is displayed on the status monitor screen. Note that the CPU of the external device is the primary entity of control relating to the display units of such external devices. Thus, with the present embodiment, various user interfaces of the printing system 100 are enabled to make a display to enable the user to input instructions to resume the temporarily-stopped printing operations of the job C. Then, in the event of receiving, via the display, a user instruction for resuming the printing operations of the job C, the control unit 108 determines that the interruption cause of the job C has been removed.

Now, the configuration having the features of the present embodiment described with reference to FIGS. 1 through 25 above have various arrangements intended for realization of products of future printing systems assuming POD-based printing environments beyond the office environment, as described above. Accordingly, taking into consideration such POD-based printing environments, the following configurations may be made as arrangements for furthering the advantages of the present embodiment described above.

For example, with a POD-based printing environment, there may be orders for creating printed articles with various formats, from various customers.

Figure 26:
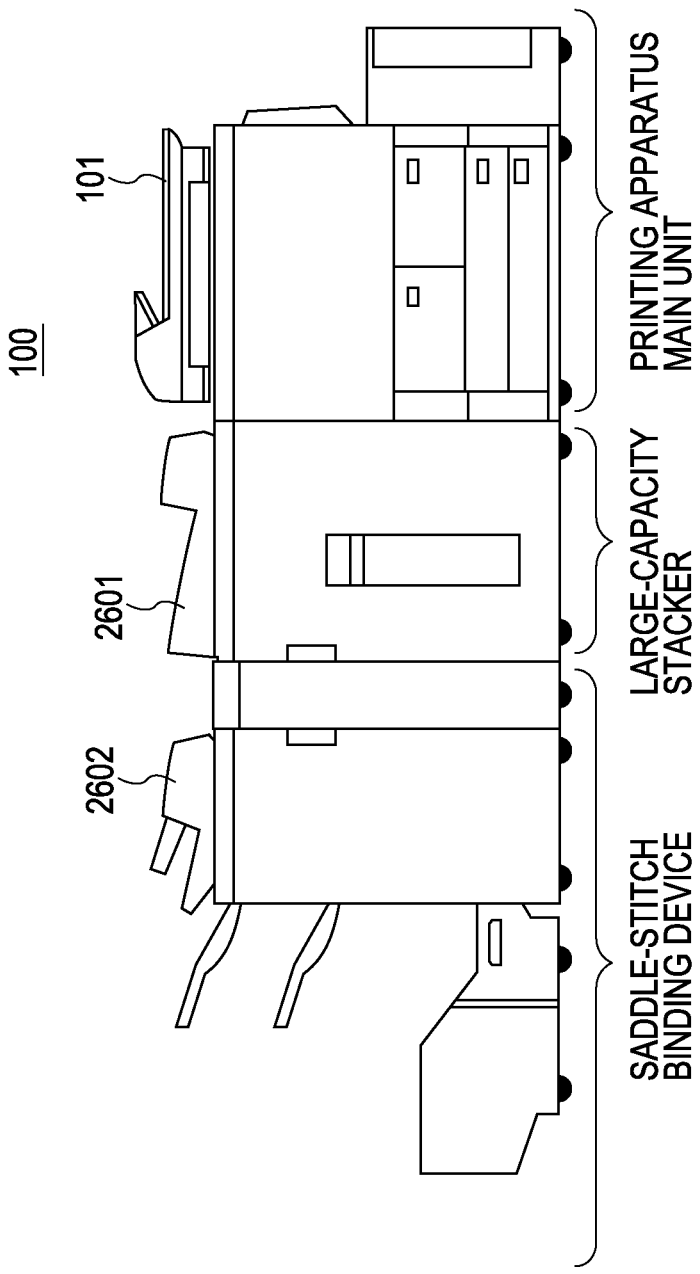
FIG. 26 is a diagram for describing a control example of the embodiment.

In light of such a situation, with the present embodiment, the configuration of the printing system 100 is confirmed so as to be expandable, as shown in FIG. 26.

Here, with regard to the printing apparatus 101 of the present embodiment, a configuration is disclosed wherein two types of post-processing devices are linked so that different types of post-processing can be performed, instead of the sheet processing device 230 shown in FIG. 3.

As shown in FIG. 26, the printing system 100 has a large-capacity stacker 2601, as an example of a post-processing device having a stacker unit capable of loading great quantities of printed sheets transported from inside the printer unit 104. Note that the large-capacity stacker 2601 has a configuration capable of stacking up to 5000 sheets of printed sheets, taking into consideration various usage cases and user needs assumed by the present embodiment.

Also, the printing system 100 has a saddle-stitch binding device 2602, as an example of a post-processing device wherein various types of post-processing (with this example, six types of finishing, namely, stapling, punching, trimming, shift discharging, saddle-stitch binding, and folding) are selectively executable as to the sheets subjected to printing processing which are transported from inside the printer unit 104.

Thus, with the present embodiment assuming a POD-based printing environment, the printing system 100 has multiple post-processing devices configured in a linkable manner to the printing apparatus 101. Also, particular types of post processing can be executed for each post processing. Thus, various types of post processing can be performed on a printing medium upon which printing processing has been performed by the printer 104 for a job, in response to requests from the operator.

Assuming this configuration, the control unit 108 controls the UI unit so as to be capable of receiving desired types of post-processing to be executed on the job to be processed, via the UI unit of the present embodiment, such as the operating unit 102.

Figure 27:
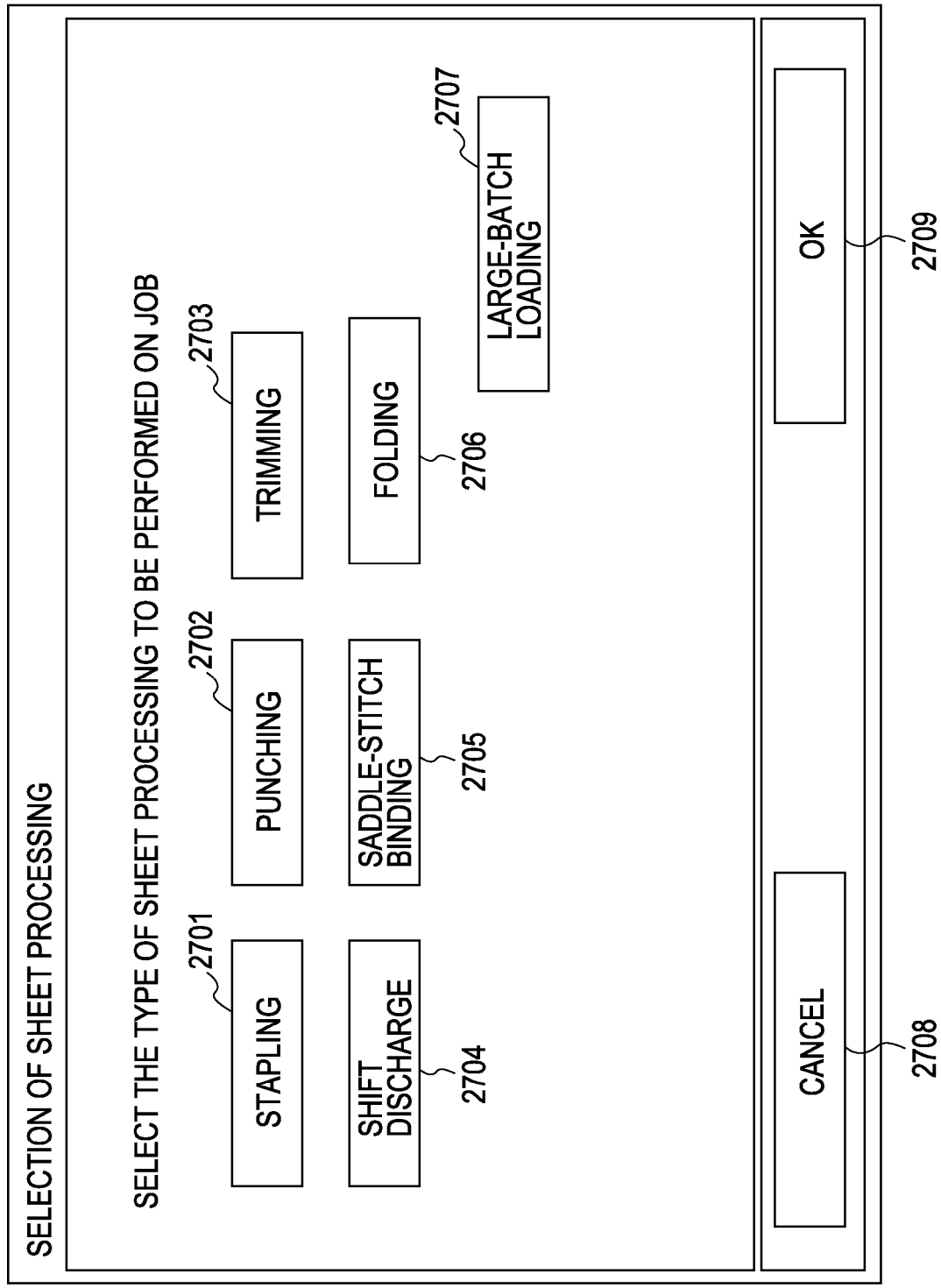
FIG. 27 is a diagram for describing a control example of the embodiment.

For example, the control unit 108 enables a UI screen such as shown in FIG. 27 to be displayed on the operating unit 102 based on the system configuration information of the printing system 100, in response to the operator having pressed the key 508 in FIG. 6.

Figure 28:
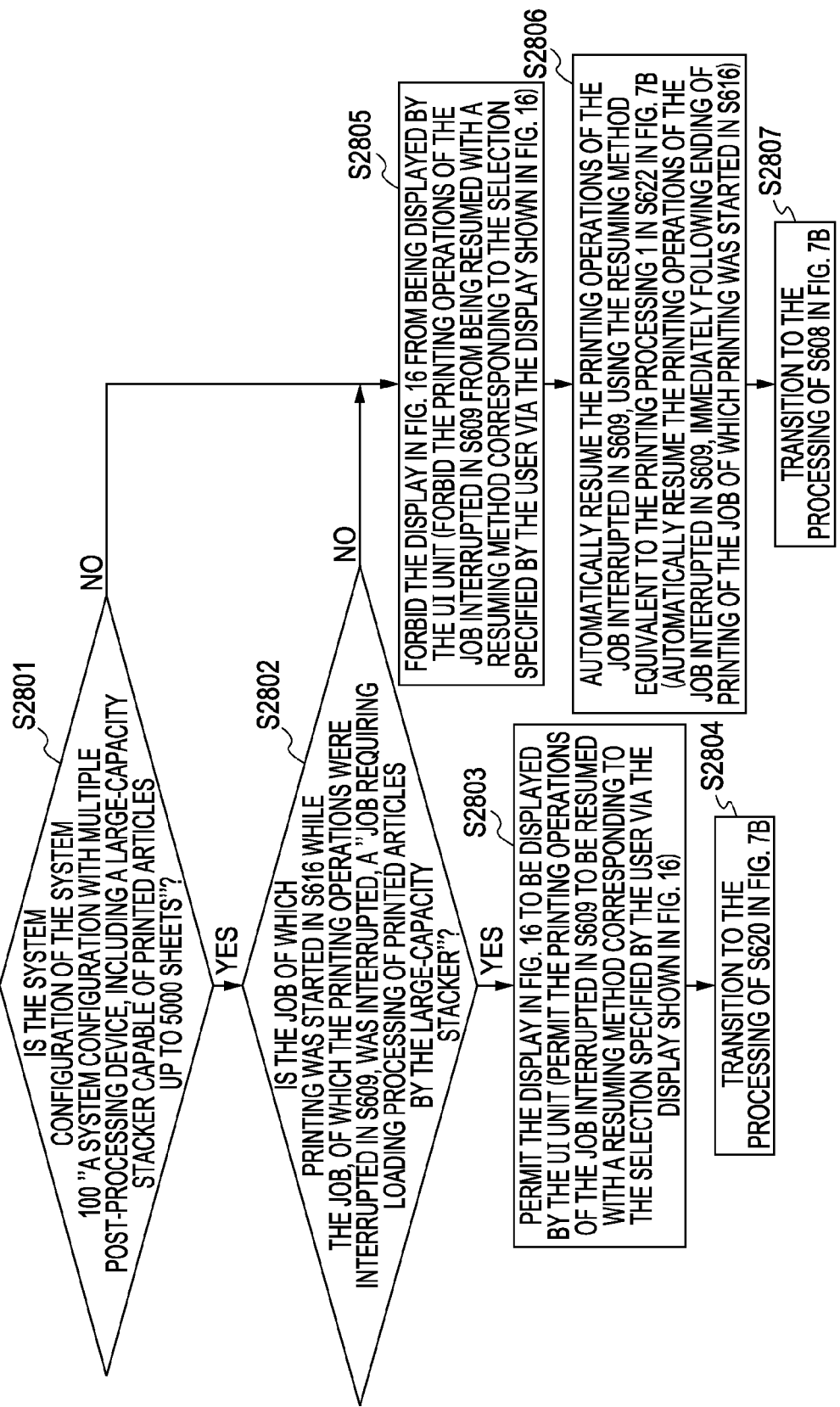
FIG. 28 is a flow diagram for describing a control example of the embodiment.

Assuming such a configuration, the control unit 108 effects control such that the printing system 100 can execute the operations according to the flowchart shown in FIG. 28 in exemplary form. A specific example thereof will be described. The control example using this FIG. 28 is a control example relating to step S620 in FIG. 7B.

Note that computer-readable programs relating to the processing of the flowchart in FIG. 28 are also stored in the memory 109 beforehand by the control unit 108, in a readable-executable manner.

With the control example using FIG. 28, processing from the point that a "YES" determination is made in step S615 in FIG. 7B above will be described. That is to say, processing from the point that the control unit 108 has confirmed that the interruption cause of the interrupted job (job X in the above example) regarding which printing has been interrupted in step S609 in FIG. 7B, has been removed, will be described.

Assuming the above configuration, upon the control unit 108 confirming that the cause of printing interruption of the interrupted job has been removed, the flow proceeds to the processing in step S2801 in FIG. 28.

In step S2801, the control unit 108 determines whether or not the printing system 100 is "a system configuration with multiple post-processing devices, including a large-capacity stacker capable of printed articles up to 5000 sheets", based on the specifications information in the memory 109, as described above.

In the event that a "YES" determination has been made in step S2801, the control unit 108 advances the flow from step S2801 to step S2802.

In this step S2802, the control unit 108 confirms whether or not the job (job Y in the above example) is a "job requiring loading processing of printed articles by the large-capacity stacker".

For example, let us say that, with the key 2707 shown in FIG. 27 pressed by the operator, the operator has made a printing execution request via the operating unit 102. In this case, the control unit 108 determines that the job is a "job requiring loading processing of printed articles by the large-capacity stacker". In this example, such a job will be referred to as a "large-batch loading job".

On the other hand, let us say that the key 2707 shown in FIG. 27 is not pressed by the operator, and with a key from 2701 through 2706 for executing finishing (post-processing) of a type different from the large-batch loading processing pressed by the operator, the operator has made a printing execution request via the operating unit 102. In this case, the control unit 108 determines that the job is a "job not requiring loading processing of printed articles by the large-capacity stacker". For example, a job regarding which a printing request has been made with key 2701 for stapling processing on the printing media printed by the printer unit 104, will be referred to as a "stapling job", and this falls under the case of a "job not requiring loading processing of printed articles by the large-capacity stacker". Also, a job regarding which a printing request has been made with key 2702 for punching processing on the printing media printed by the printer unit 104, will be referred to as a "punching job", and falls under the same case. Further, a job regarding which a printing request has been made with key 2703 for trimming processing on the printing media printed by the printer unit 104, will be referred to as a "trimming job", and falls under the same case. Also, jobs regarding which execution requests have been made for the processing of the other keys 2704, 2705, and 2705, are also under the same case. Thus, a "job not requiring loading processing of printed articles by the large-capacity stacker", will hereafter be referred to as a "non-large-batch loading job".

Assuming the above configuration, in the event that a "YES" determination has been made in step S2802, the control unit 108 advances the flow from step S2802 to step S2803.

In the event of transition to step S2803, the control unit 108 permits the screen 900, which is an example of the above "particular display" shown in exemplary form in FIGS. 16, 21, and 24, to be displayed by the operating unit 102. That is to say, in this case, the control unit 108 allows the printing system 100 to resume printing of the interrupted job using the resuming method corresponding to the selection option specified by the user via the screen 900 illustrated in FIG. 16 and other drawings. In this case, the control unit 108 advances the flow through the processing of step S2803 to the processing in step S620 in FIG. 7B. Subsequent processing and control have already been described above, and are all the same, and accordingly will be omitted from description here.

Assuming this configuration, in the event that a "NO" determination is made in step S2801, the control unit 108 advances the flow from step S2801 to step S2802. Or, in the event that the flow proceeds to step S2805, the control unit 108 forbids the operating unit 102 from displaying the screen 900 illustrated in FIG. 16 and other drawings. That is to say, in this case, the control unit 108 forbids resuming the printing operations of the job (job X in the above example) using the resuming method corresponding to the selection option specified by the user via the screen 900. Further in this case, after the processing in step S2805, the control unit 108 advances the flow to step S2806.

In the event of transmission to step S2806, in step S2806 the control unit 108 automatically resumes the printing operations of the job (job X in the above example) interrupted in step S609, using a resuming method equivalent to the Printing Processing 1 in step S622 of FIG. 7B (i.e., the selection option 1). In this case, the control unit 108 automatically resumes the printing operations of the job interrupted in step S609, immediately following printing of the job started in step S616 (job Y in the above example). The flow then proceeds from the processing of step S2806 to the processing in step S608 in FIG. 7A. Subsequent processing and control have already been described above, and are all the same, and accordingly will be omitted from description here.

In the event that a job which satisfies the Condition 1 and Condition 2 (job Y in the above example) is a "large-batch loading job", as with the above-described configuration, the control unit 108 permits the screen 900, which is an example of the above "particular display", to be displayed by the UI unit of the present embodiment. The control unit 108 also enables the printing system 100 to execute the operations according to the same control examples as the control examples described using FIGS. 1 through 25, via the screen 900, which is an example of the above "particular display".

On the other hand, in the event that a job which satisfies the Condition 1 and Condition 2 (job Y in the above example) is a "non-large-batch loading job", as with the above-described configuration, the control unit 108 forbids the screen 900, which is an example of the above "particular display", from being displayed by the UI unit of the present embodiment. In this case, the control unit 108 enables the printing system 100 to automatically execute an operation corresponding to the first selection option, without any intervening operations such as the operator selecting one of the three selection candidates via the screen 900 displayed on the UI.

This configuration is an arrangement for improving operability and productivity, by addressing the POD-based printing environment issues which could occur due to the job Y being a large-batch job while requiring only minimal operations of the operator by reducing intervening operations by the operator as much as possible.

Moreover, a configuration can be made wherein the control as illustrated in exemplary form with FIGS. 26 through 28 can be executed by the control unit 108.

As described above, causes of printing interruption based on explicit instructions from the user relating to printing interruption requests can also be handled. Assuming such a configuration, removal of the causes of printing interruption based on explicit instructions from the user relating to printing resuming requests can also be handled. These configurations are also encompassed by the present embodiment. Note that configurations other than described here conform to the control and processing conditions described above in the various arrangements.

Other Embodiments

While an embodiment has been described above, the present invention may be embodied as, for example, a system, apparatus, method, computer program, storage medium, or the like. Specifically, this may be applied to a system configured of multiple devices, or may be applied to a device formed by a single unit.

The present invention includes a case wherein a software program is directly or remotely supplied to a system or device, with the functions of the above-described embodiment being realized by the system or device reading out and executing the program code supplied thereto. In this case, the supplied program is a program corresponding to the flowchart shown in the embodiment.

Accordingly, in order to achieve the function processing of the present invention with a computer, the program code to be installed in the computer itself also realizes the present invention. That is to say, a computer program for realizing the function processing of the present invention is also included in the present invention.

In this case, the program may be in any format, such as object code, a program executed by an interpreter, script data supplied to an operating system, or the like, as long as the program has the functions of a program.

Examples of storage media for supplying the program include the following: floppy (registered trademark) disks, hard disks, optical disks, magneto-optical (MO) disks, CD-ROM, CD-R, CD-RW, magnetic tape, non-volatile memory cards, ROM, DVD (DVD-ROM, DVD-R), and so forth.

Further, examples of methods for supplying the program include accessing a homepage on the Internet using a browser from a client computer, and downloading the computer program according to the present invention from the homepage to a recording medium such as a hard disk or the like. In this case, the program being downloaded may be a file that is compressed and has self-installing functions. Also, this may be realized by dividing the program code making up the program according to the present invention into multiple files, and downloading the files from different homepages. That is to say, a WWW server, enabling multiple users to download the program file for realizing the function processing of the present invention on a computer, is itself included in the present invention.

Also, the program according to the present invention may be encrypted and stored in a recording medium such as a CD-ROM for distribution. In this case, an arrangement may be made wherein users who have cleared certain conditions can download key information for decryption from a homepage on the Internet, execute the encrypted program using the key information, and install the program on a computer.

Also, besides the functions of the above embodiment being realized by executing the program that has been read out, the functions of the above embodiment may be realized in cooperation with the operating system or the like running on the computer. In this case, the operating system or the like performs part or all of the actual processing, and the functions of the above embodiment are realized by the processing thereof.

Further, the program read out from the recording medium may be written to memory of a function expansion board inserted to the computer or a function expansion unit connected to the computer, whereby part of all of the functions of the above embodiment is realized. In this case, following the program being written to the function expansion board or the function expansion unit, a CPU or the like provided to the function expansion board or the function expansion unit performs part or all of the actual processing, based on instructions of the program.

For example, a specific example of the above embodiment will be described with an example of a case of inputting printing data of a job to be processed from a host computer 300 to the printing system 100.

As preliminary preparation, the following operations are performed. First, in response to user operations made at the user interface unit of the computer 300, program data, which is a printer driver of the printing system 100, is downloaded to the memory of the computer 300. Note that the user interface unit is the various operating units which the computer 300 itself has, such as a display unit, keyboard, mouse, and so forth. Or, the program data may be directly downloaded from an external server, for example. Or, a certain storage medium such as a CD-R or the like in which the program data has been stored may be set in the computer 300 so as to download the data from the storage medium. Note that the program data includes program data relating to the processing described with the above-described flowcharts. Also, UI program data necessary for display control relating to the various display screens described above is also included in the data. In other words, program data necessary for enabling execution of the configurations of the above-described embodiments using an external device capable of data communication with the printing system 100 is stored in the program data downloaded to the external device. Upon the data being downloaded to the computer 300, the CPU of the computer 300 displays a printer driver screen of the printing system 100 on the display unit of the computer 300, in response to user operations of the computer 300. Various printing settings of job data to be printed are received from the user via the screen.

Let us say that subsequently, printing settings are made by the user, and a printing execution instruction is input. In response, the CPU of the computer 300 transmits the printing data and printing setting conditions of the job to be processed from the computer 300 to the printing system 100. The job is then executed at the printing system 100. In this state, control which is equivalent to the control of the above-described embodiment is performed by the CPU of the computer by reading out and making reference to the program data. For example, the various types of interface screens such as described above with reference to the drawings, are displayed on the display unit of the computer 300. Also, input is enabled for the various types of user requests described in the above embodiment from the user of the computer 300 via the screens. Operations corresponding to the input user requests are executed by the printing system 100.

Due to the above configuration, operations the same as those of the above embodiment can be executed from external devices. In other words, the timing for resuming printing operations of a job regarding which printing operations have been interrupted by occurrence of a cause of printing interruption can be received from a user of an external device via the user interface of the external device, such as a computer or the like. In the event that a user request has been made, the control unit 108 receives the request from the external device, via the computer interface unit 106 for example. Further, the control unit 108 controls the printing system 100 so as to resume printing operations of the job regarding which printing has been interrupted, at the timing corresponding to the user request from the external device. Note that configurations other than described here conform to the control and processing conditions described above in the various arrangements. That is to say, this is the same as that of the forms described above, so description here will be omitted. Enabling remote operations in this way can further increase the advantages of the present invention. Thus, all applications and modifications are enabled unless departing from the spirit and scope of the present invention. Note however, that these are arrangements for improving ease of use for the users, and are not necessarily indispensable components.

For example, as described above, the printing system according to the present embodiment has a printing apparatus capable of executing printing operations of a second job which is different from a first job regarding which printing operations have been interrupted by occurrence of a cause of printing interruption. Assuming this configuration, the printing system is controlled so as to be capable of executing a job processing method such as exemplarily illustrated below, with the control unit 108 as the primary entity, for example.

The control unit 108 effects control such that, in the event that the cause of interruption of the first job regarding which printing has been interrupted, has been removed, the operating unit 102 can receive user requests for resuming the printing operations of the first job regarding which printing has been interrupted, following completion of the printing operations of the second job. Note that the user interface unit (also referred to as "UI unit") which the printing system provides is not only the operating unit 102. UI units which external devices have so as to be capable of data communication with the printing system 100, such as display unit (monitor), keyboard, mouse, and so forth, are also included in the present invention. Assuming the above configuration, in the event that a user request has been made via the UI unit, the control unit 108 controls the printing system 100 such that printing operations of the interrupted first job can be resumed following completion of the printing operations of the second job.

With the system according to the present embodiment, the above control is enabled, and further, the following control is also enabled.

The control unit 108 effects control such that, in the event that the cause of interruption of the first job regarding which printing has been interrupted, has been removed, the UI unit can receive user requests for resuming the printing operations of the first job regarding which printing has been interrupted, before completion of the printing operations of the second job. In the event that a user request has been made via the UI unit, the control unit 108 controls the printing system 100 such that printing operations of the interrupted first job can be resumed before completion of the printing operations of the second job.

With the system according to the present embodiment, not only is the above control enabled, further, the following control is also enabled.

Let us say that for example, in a case wherein the printing operations of the first job are stopped, the printing operations of the second job are being executed, and there is a third job in the memory 109 in a printing standby state, the user removes the interruption cause of the first job regarding which printing has been interrupted. In this case, the control unit 108 effects control so as to execute the following operations. First, the UI unit is controlled so as to be able to receive a user request for resuming the printing operations of the first job after both the printing operations of the second job which is currently being printed and the printing operations of the third job which is currently in a printing standby state. In the event that the user request has been made via the UI unit, the control unit 108 controls the printing system 100 such that the printing operations of the first job are resumed after both the printing operations of the second job and the printing operations of the third job.

Providing at least a part of the above control allows control such as described below, for example, to be executed with the printing system according to the present embodiment. The following is an example of execution from the control unit 108.

Let us say that for example, in a case wherein the printing operations of the first job are stopped, and the printing operations of the second job are being executed, the user removes the interruption cause of the first job regarding which printing has been interrupted. In this case, the control unit 108 effects control so as to be able to receive one of the following multiple user requests from the user via the UI unit. For example, the control unit 108 enables reception via the UI unit of a first user request for resuming the printing operations following completion of the printing operations of the second job. Or, for example, the control unit 108 enables reception via the UI unit of a second user request for resuming the printing operations before completion of the printing operations of the second job. Assuming the above configuration, control is effected such that the following operations can be executed by the printing system 100. For example, in the event that the second user request is not made via the UI unit but the first user request is made, the control unit 108 resumes the printing operations of the first job following completion of the printing operations of the second job. On the other hand, in the event that the first user request is not made via the UI unit but the second user request is made, the control unit 108 resumes the printing operations of the first job before completion of the printing operations of the second job.

The above control can be further expanded to allow control such as described below to be executed with the printing system according to the present embodiment. The following is an example of execution from the control unit 108.

Let us say that for example, in a case wherein the printing operations of the first job are stopped, the printing operations of the second job are being executed, and there is a third job in the memory 109 in a printing standby state, the user removes the interruption cause of the first job regarding which printing has been interrupted. In this case, the control unit 108 effects control so as to be able to receive one of multiple user requests including at least the following user requests from the user via the UI unit. For example, the control unit 108 enables reception via the UI unit of a first user request for resuming the printing operations following completion of the printing operations of the second job and before starting printing operations of the third job. Also, the control unit 108 enables reception via the UI unit of the second user request for resuming the printing operations before completion of the printing operations of the second job. Further, the control unit 108 enables reception via the UI unit of a third user request for resuming the printing operations following completion of the printing operations of the second job and also following completion of the printing operations of the third job. Note however, that simultaneous reception of the first through third user requests is forbidden, and control is effected to realize exclusive control such that one of the requests is received from the user. With the above configuration, in the event that the first user request is made via the UI unit, the control unit 108 resumes the printing operations of the first job following completion of the printing operations of the second job and before starting the printing operations of the third job. On the other hand, in the event that the second user request is made via the UI unit, the control unit 108 resumes the printing operations of the first job before completion of the printing operations of the second job. Also, in the event that the third user request is made via the UI unit, the control unit 108 resumes the printing operations of the first job following completion of the printing operations of the second job and also following completion of the printing operations of the third job. Thus, the control unit 108 controls the printing system 100 so as to be capable of executing the printing operations of the first job, in response to the one of the multiple user requests instructed via the UI unit.

Also, assuming the above configuration, let us say that there are multiple jobs in printing standby in the memory 109, besides the third job. In this case, the control unit 108 controls the UI unit so as to allow the user to specify the timing for resuming the printing operations of the first job via the UI unit, also including the multiple jobs in printing standby.

In order to further improve ease of use, the following configuration may be made. For example, the control unit 108 controls the UI such that, of the multiple selection operations for specifying the timing at which to resume the printing operations of the first job, selection options corresponding to user requests which can be selected by the user are made selectable by the user via the UI unit. However, control is effected such that, of the multiple selection operations for specifying the timing at which to resume the printing operations of the first job, selection options corresponding to user requests which cannot be selected by the user are made non-selectable by the user via the UI unit.

In order to further improve ease of use, the following configuration may be made. For example, in the event that there is only one selection operation that is selectable by the user, the printing operations of the first job are automatically resumed following completion of the printing operations of the second job, without accepting user requests via the UI unit. The control unit 108 controls the printing system 100 so as to execute such operations, and the various configurations can be provided with the printing system.

Assuming the above configuration, the present embodiment is configured so as to provide the following configuration as well, with the printing system.

For example, in addition to accepting various types of user requests from the UI unit of the printing system 100, these can be received via a UI unit provided to an external device capable of data communication with the printing system 100. Also, the printing system 100 has a printer unit 104 capable of printing at least one of printing data from the reader unit 103 and printing from an external device such as a computer 300 or the like, via the memory unit 109.

Also, assuming the following configuration, the following job control is also executed. For example, in the event that an error has occurred at the printing system 100 as a cause of interruption as described above, the control unit 108 controls the printing system 100 so as to stop printing operations of the job currently being printed. Also, in the event that a user request for stopping the printing operations has been input from the user via the UI unit, as an interruption cause, the printing operations of the job being printed are stopped. The control unit 108 controls the printing system 100 so as to execute such operations.

Also, as described in the above embodiment for example, the configuration is made so as to be able to handle at least the following types of interruption causes. For example, in the event that an error occurs at the reader unit 103 provided to the printing system 100, the above control is executed by the control unit 108. Also, for example, in the event that an error occurs relating to sheets required for printing operations of a job to be processed, the above control is executed by the control unit 108. Also, as described above, such various configurations are arrangements for further increased user advantages, so having all of the components is not indispensable.

Configuring each of the configurations so as to be providable with the present printing system as described above enables optimal manifestation of the advantages of the present embodiment. As an example thereof, problems conventionally assumed can be handled. Also, cases wherein the current job is interrupted due to an interruption cause having occurred, and printing of another job other than the job being interrupted is being executed, can be flexibly handled. Specifically, the operator can select the method for resuming processing of a job regarding which printing has been interrupted after the cause of interruption has been removed. Thus, job productivity in the printing system can be improved while respecting the environment and the intent of the operator. In other words, a flexible digital printing system suitable for not only the office environment but also the POD environment can be provided. Thus, an environment assuming printing environments such as POD environment wherein great amounts of jobs can be received can be configured. In other words, an environment can be handled such as a POD environment wherein, even in the event that the processing of a job being processed stops due to occurrence of an interruption factor, the productivity of multiple jobs handled can be improved overall. Also, a configuration can be made such that ease of use does not deteriorate regarding job regarding which printing has been interrupted, even in such an environment. Moreover, processing of a job regarding which printing has been interrupted can be resumed in a state wherein the intent of the user of the job regarding which printing has been interrupted is respected as much as possible.

A configuration such as described with the present embodiment can enable a printing system to be provided which can handle problems conventionally assumed. Particularly, a printing system can be provided which can contribute to realization of products with future digital printing systems in sight. Also, particularly, a printing system can be provided giving consideration to a printing environment such as a POD environment, wherein processing multiple jobs as efficiently and with as high productivity as possible, is important. Also, particularly, a printing system can be provided giving consideration to the entirety of multiple jobs to be processed, wherein, even in a state in which processing of another job has been started during interruption of a job to be processed, the multiple jobs can be processed efficiently and with high productivity, while respecting the usage environment and the intent of the operator. Further, a printing system can be provided which can handle not only recovery functions which are sufficient to deal with the office environment but also capable of handling usage cases and user needs which occur in a POD-based printing environment where recovery functions are difficult to realize.

Also, printing apparatuses, computer-readable programs, and storage mediums, capable of exhibiting the same advantages as these, can be provided. An easy-to-use and flexible printing environment, with such various advantages, can be configured.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-328947 filed Nov. 14, 2005, and No. 2006-283146 filed Oct. 17, 2006, which are hereby incorporated by reference herein in their entirety.

What is claimed is:

1. A job processing method of a printing system capable of receiving a first job and a second job from an external computer and capable of executing printing of the second job while printing of the first job is being interrupted by occurrence of an interruption factor, the job processing method comprising:

displaying, in a case where the interruption factor is removed while the printing of the second job is being executed, on a display unit of the printing system, a screen for receiving a first user request for resuming the printing of the first job, which has been interrupted after completion of the printing of the second job and a second user request for interrupting the printing of the second job and resuming the printing of the first job which has been interrupted before completion of the printing of the second job;

resuming the printing of the first job after completion of the printing of the second job in a case where the first user request is received via the screen; and interrupting the printing of the second job before completion of the printing of the second job, and resuming the printing of the first job which has been interrupted before completion of the printing of the second job, in a case where the second user request is received via the screen.

2. The job processing method according to claim 1, wherein the printing system includes a printing apparatus capable of executing the printing of the second job while the printing of the first job is interrupted.

3. The job processing method according to claim 1, wherein the printing system includes a printing apparatus capable of executing the printing of the second job while the printing of the first job is being interrupted by occurrence of the interruption factor,
and wherein the method, in a case where that the printing of the second job is being performed, and there is a third job in a printing waiting state, further comprises:
receiving, via the screen, a user request for resuming the printing of the first job after completion of both the printing of the second job and the printing of the third job; and
resuming the printing of the first job after both the printing of the second job and the printing of the third job, in a case where the user request is received via the screen.

4. The job processing method according to claim 1, wherein the printing system includes a printing apparatus capable of executing the printing of the second job while printing of the first job is being interrupted by occurrence of an interruption factor; and
wherein the method, in a case where the printing of the second job is being performed, and there is a third job in a printing waiting state, further comprises:
receiving, via the screen, any one of a plurality of user requests including a third user request for resuming the printing of the first job after completion of the printing of the second job and prior to the start of the printing operation of the third job in the printing waiting state, a fourth user request for resuming the printing operation of the first job prior to completion of the printing of the second job, and a fifth user request for resuming the printing of the first job after completion of the printing of the second job and after completion of the printing of the third job from the printing waiting state;
resuming the printing of the first job after completion of the printing of the second job and prior to the start of printing of the third job, in the case where the third user request is received by the screen;
resuming the printing of the first job prior to completion of the printing of the second job, in a case where the fourth user request is received by the screen; and
resuming the printing of the first job after completion of the printing of the second job and after completion of the printing of the third job in the printing waiting state, in the case where the fifth user request is received by the screen.

5. The job processing method according to claim 3, further comprising:
allowing a user to determine when to resume the printing of the first job.

6. The job processing method according to claim 1, further comprising:
allowing a user to select a selection option from a plurality of selection options for determining timing for resuming the printing of the first job.

7. The job processing method according to claim 1, further comprising:
allowing a user to select a selection option from a plurality of selection options for determining timing for resuming the printing of the first job; and
prohibiting the user from selecting a selection option corresponding to a user request which cannot be executed.

8. The job processing method according to claim 1, further comprising:
allowing a user to select a selection option from a plurality of selection options for determining timing for resuming the printing operation of the first job; and
enabling the printing of the first job to be resumed automatically after completion of the printing of the second job without receiving a user request, in a case where there is only one user-selectable selection option.

9. The job processing method according to claim 2, further comprising:
enabling the first user request and the second user request via either a user interface unit included in the printing apparatus, or a user interface unit included in an external device which can perform data communication with the printing apparatus.

10. The job processing method according to claim 1, further comprising:
interrupting the printing of a job, in a case where an error occurs at the printing system as the interruption factor.

11. The job processing method according to claim 1, wherein the interruption factor includes at least one of an error at original-document reading unit included in the printing system, or an error relating to sheets necessary for the printing of a job to be processed.

12. A non-transitory computer readable storage medium storing a computer program for causing a computer to carry out the method according to claim 1.

13. A printing system capable of receiving a first job and a second job from an external computer and capable of executing printing of the second job while printing of the first job is being interrupted by occurrence of an interruption factor, the printing system comprising:
a display unit configured to display, in a case where the interruption factor is removed while the printing of the second job is being executed, a screen for receiving a first user request for resuming the printing of the first job which has been interrupted, after completion of the printing of the second job and a second user request for interrupting the printing of the second job and resuming the printing of the first job, which has been interrupted before completion of the printing of the second job; and
a controller configured to resume the printing of the first job after completion of the printing of the second job in a case where the first user request is received by the screen, and to interrupt the printing of the second job before completion of the printing of the second job, and to resume the printing of the first job which has been interrupted before completion of the printing of the second job.

14. The printing system according to claim 13, including a printing apparatus capable of executing the printing of the second job while the printing of the first job is being interrupted.

15. The printing system according to claim 13, including a printing apparatus capable of executing the printing of the second job while the printing of the first job is being interrupted by occurrence of the interruption factor;
wherein the display unit, in a case where the printing of the second job is being executed, and there is a third job in a printing waiting state, displays a screen for receiving a user request for resuming the printing of the first job after completion of both the printing of the second job and the printing of the third job in the printing waiting state;
and wherein the controller resumes the printing of the first job after both the printing of the second job and the printing of the third job, in a case where the user request is received by the screen.

16. The printing system according to claim 13, including a printing apparatus capable of executing the printing of the second job while printing of the first job is being interrupted by occurrence of the interruption factor;

wherein the display unit, in a case where the printing of the second job is being executed, and there is a third job in a printing waiting state, displays a screen for receiving a third user request for resuming the printing of the first job after completion of the printing of the second job and prior to the start of the printing of the third job in the printing waiting state, a fourth user request for resuming the printing of the first job prior to completion of the printing of the second job, and a fifth user request for resuming the printing of the first job after completion of the printing of the second job and after completion of the printing of the third job in the printing waiting state;

wherein the controller resumes the printing of the first job after completion of the printing of the second job and prior to the start of the printing of the third job, in a case where the third user request is received by the screen;

wherein the controller resumes the printing of the first job prior to completion of the printing of the second job in a case where the fourth user request is received by the screen;

and wherein the controller resumes the printing of the first job after completion of the printing of the second job and after completion of the printing of the third job in the printing waiting state, in a case where the fifth user request is received by the screen.

17. The printing system according to claim 15, wherein the display unit allows a user to determine timing for resuming the printing of the first job.

18. The printing system according to claim 13, wherein the display unit allows a user to select a selection option corresponding to a user request from a plurality of selection options for determining timing for resuming the printing of the first job.

19. The printing system according to claim 13, wherein the display unit allows a user to select a selection option corresponding to a user request from a plurality of selection options for determining timing for resuming the printing of the first job;

and wherein the display unit prohibits the user from selecting a selection option corresponding to a user request, which cannot be executed.

20. The printing system according to claim 13, wherein the display unit allows a user to select a selection option from a plurality of selection options for determining timing for resuming the printing of the first job;

and wherein the controller enables the printing of the first job to be resumed automatically after completion of the printing of the second job without receiving a user request, in a case where there is only one user-selectable selection option.

21. The printing system according to claim 14, wherein the printing system receives the first user request and the second user request via either a user interface unit included in the printing apparatus or a user interface unit included in an external device which can perform data communication with the printing apparatus.

22. The printing system according to claim 13, wherein the printing apparatus includes a printing unit configured to print either printing data comprising a job from an original-document reading unit or printing data comprising a job from a computer which can perform data communication with the printing apparatus.

23. The printing system according to claim 13, wherein the printing system interrupts the printing of a job in a case where an error occurs at the printing system as the interruption factor.

24. The printing system according to claim 13, wherein the interruption factor includes at least one of: an error at an original-document reading unit included in the printing system, or an error relating to sheets necessary for the printing of a job to be processed.

25. The printing system according to claim 14, wherein the controller, in a case where the interruption factor is removed, and the second job is a job requiring a specific type of finishing, interrupts the printing of the second job and resumes the printing of the first job;

and wherein the controller, in a case where the interruption factor is removed, and the second job is a job requiring no specific type of finishing, resumes the printing of the first job in the interrupted state after completion of the printing of the second job.

\* \* \* \* \*